United States Patent
Oshima et al.

(10) Patent No.: US 9,262,954 B2
(45) Date of Patent: Feb. 16, 2016

(54) VISIBLE LIGHT COMMUNICATION SIGNAL DISPLAY METHOD AND APPARATUS

(71) Applicant: PANASONIC CORPORATION, Osaka (JP)

(72) Inventors: Mitsuaki Oshima, Kyoto (JP); Koji Nakanishi, Osaka (JP); Hideki Aoyama, Osaka (JP); Koji Aoto, Hyogo (JP); Toshiyuki Maeda, Hyogo (JP); Akira Shiokawa, Osaka (JP); Akihiro Ueki, Osaka (JP); Takashi Suzuki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/141,833

(22) Filed: Dec. 27, 2013

(65) Prior Publication Data

US 2014/0205136 A1    Jul. 24, 2014

Related U.S. Application Data

(60) Provisional application No. 61/907,467, filed on Nov. 22, 2013, provisional application No. 61/896,874, filed on Oct. 29, 2013, provisional application No. 61/746,315, filed on Dec. 27, 2012.

(30) Foreign Application Priority Data

| Dec. 27, 2012 | (JP) | ................. | 2012-286339 |
| May 24, 2013 | (JP) | ................. | 2013-110445 |
| Sep. 30, 2013 | (JP) | ................. | 2013-203349 |
| Oct. 29, 2013 | (JP) | ................. | 2013-224801 |
| Nov. 22, 2013 | (JP) | ................. | 2013-242338 |
| Nov. 22, 2013 | (JP) | ................. | 2013-242407 |

(51) Int. Cl.
*G06K 9/00* (2006.01)
*G06K 9/36* (2006.01)
(Continued)

(52) U.S. Cl.
CPC ............... *G09G 3/20* (2013.01); *G06T 1/0085* (2013.01); *G06T 11/00* (2013.01); *H04B 10/116* (2013.01); *H04N 3/00* (2013.01); *G09G 2370/18* (2013.01)

(58) Field of Classification Search
None
See application file for complete search history.

(56) References Cited

U.S. PATENT DOCUMENTS

| 5,734,328 A | 3/1998 | Shinbori |
| 5,765,176 A | 6/1998 | Bloomberg |

(Continued)

FOREIGN PATENT DOCUMENTS

| AU | 2007253450 | 11/2007 |
| EP | 1912354 | 4/2008 |

(Continued)

OTHER PUBLICATIONS

International Search Report, mailed Mar. 11, 2014, in International (PCT) Application No. PCT/JP2013/007675.

(Continued)

*Primary Examiner* — Matthew Bella
*Assistant Examiner* — Jose M Torres
(74) *Attorney, Agent, or Firm* — Greenblum & Bernstein, P.L.C.

(57) ABSTRACT

A visible light communication signal display method of displaying (i) an image represented by video signals and (ii) an image obtained by encoding visible light communication signals includes: encoding at least part of the visible light communication signals to generate an encoded image; generating a plurality of sub-images which correspond to respective partial images obtained by dividing the encoded image and each of which (i) includes a corresponding one of the partial images and (ii) except for the corresponding partial image, is an image having a substantially uniform luminance value lower than or equal to a predetermined luminance value; and displaying, in a video display period, the image represented by the video signals, and displaying the sub-images in time series in a communication period different from the video display period.

23 Claims, 37 Drawing Sheets

(51) Int. Cl.

| | | |
|---|---|---|
| G09G 3/20 | (2006.01) | |
| H04B 10/116 | (2013.01) | |
| G06T 1/00 | (2006.01) | |
| H04N 3/00 | (2006.01) | |
| G06T 11/00 | (2006.01) | |
| G09G 3/16 | (2006.01) | |
| G09G 3/34 | (2006.01) | |
| G09G 3/36 | (2006.01) | |

(56) References Cited

U.S. PATENT DOCUMENTS

| | | | |
|---|---|---|---|
| 5,974,348 | A | 10/1999 | Rocks |
| 6,347,163 | B2 | 2/2002 | Roustaei |
| 6,933,956 | B2 | 8/2005 | Sato et al. |
| 7,308,194 | B2 | 12/2007 | Iizuka et al. |
| 7,415,212 | B2 | 8/2008 | Matsushita et al. |
| 7,502,053 | B2 | 3/2009 | Kagawa et al. |
| 7,570,246 | B2 | 8/2009 | Maniam et al. |
| 7,715,723 | B2 | 5/2010 | Kagawa et al. |
| RE42,848 | E | 10/2011 | Sato et al. |
| 8,093,988 | B2 | 1/2012 | Takene et al. |
| 8,264,546 | B2 | 9/2012 | Witt |
| 8,331,724 | B2 | 12/2012 | Rhoads |
| 8,334,901 | B1 | 12/2012 | Ganick et al. |
| RE44,004 | E | 2/2013 | Sato et al. |
| 8,451,264 | B2 | 5/2013 | Yamaguchi et al. |
| 8,493,485 | B2 | 7/2013 | Hirose |
| 8,550,366 | B2 | 10/2013 | Myodo et al. |
| 8,571,217 | B2 | 10/2013 | Ishii et al. |
| 8,587,680 | B2 | 11/2013 | Okumura et al. |
| 8,594,840 | B1 | 11/2013 | Chiappetta et al. |
| 8,634,725 | B2 | 1/2014 | Jang et al. |
| 8,648,911 | B2 | 2/2014 | Okumura |
| 8,720,779 | B2 | 5/2014 | Asami |
| 8,749,470 | B2 * | 6/2014 | Furihata et al. ............... 345/102 |
| 8,823,852 | B2 | 9/2014 | Yamada et al. |
| 8,908,074 | B2 | 12/2014 | Oshima et al. |
| 8,913,144 | B2 | 12/2014 | Oshima et al. |
| 8,922,666 | B2 | 12/2014 | Oshima et al. |
| 8,965,216 | B2 | 2/2015 | Oshima et al. |
| 2002/0167701 | A1 | 11/2002 | Hirata |
| 2003/0026422 | A1 | 2/2003 | Gerheim et al. |
| 2003/0058262 | A1 | 3/2003 | Sato et al. |
| 2003/0076338 | A1 | 4/2003 | Hashimoto |
| 2003/0171096 | A1 * | 9/2003 | Ilan et al. ............... 455/3.06 |
| 2004/0101309 | A1 | 5/2004 | Beyette, Jr. et al. |
| 2004/0125053 | A1 * | 7/2004 | Fujisawa ............... 345/76 |
| 2004/0161246 | A1 | 8/2004 | Matsushita et al. |
| 2005/0018058 | A1 | 1/2005 | Aliaga et al. |
| 2005/0190274 | A1 | 9/2005 | Yoshikawa et al. |
| 2006/0056855 | A1 * | 3/2006 | Nakagawa et al. ............ 398/183 |
| 2006/0171360 | A1 | 8/2006 | Kim et al. |
| 2006/0239675 | A1 | 10/2006 | Iizuka et al. |
| 2006/0242908 | A1 | 11/2006 | McKinney |
| 2007/0024571 | A1 | 2/2007 | Maniam et al. |
| 2007/0058987 | A1 | 3/2007 | Suzuki |
| 2007/0070060 | A1 | 3/2007 | Kagawa et al. |
| 2007/0092264 | A1 | 4/2007 | Suzuki et al. |
| 2008/0018751 | A1 | 1/2008 | Kushida |
| 2008/0023546 | A1 | 1/2008 | Myodo et al. |
| 2008/0044188 | A1 | 2/2008 | Kagawa et al. |
| 2008/0055041 | A1 | 3/2008 | Takene et al. |
| 2008/0063410 | A1 | 3/2008 | Irie |
| 2008/0180547 | A1 | 7/2008 | Hirose |
| 2008/0205848 | A1 | 8/2008 | Kobayashi |
| 2008/0290988 | A1 | 11/2008 | Crawford |
| 2008/0297615 | A1 | 12/2008 | Kagawa et al. |
| 2009/0052902 | A1 | 2/2009 | Shinokura |
| 2009/0066689 | A1 | 3/2009 | Yamaguchi et al. |
| 2009/0129781 | A1 | 5/2009 | Irie et al. |
| 2009/0135271 | A1 | 5/2009 | Kurane |
| 2010/0034540 | A1 | 2/2010 | Togashi |
| 2010/0107189 | A1 | 4/2010 | Steelberg et al. |
| 2010/0116888 | A1 | 5/2010 | Asami |
| 2010/0315395 | A1 | 12/2010 | Kang et al. |
| 2011/0007160 | A1 * | 1/2011 | Okumura ............... 348/143 |
| 2011/0007171 | A1 | 1/2011 | Okumura et al. |
| 2011/0025730 | A1 | 2/2011 | Ajichi |
| 2011/0063510 | A1 * | 3/2011 | Lee et al. ............... 348/563 |
| 2011/0064416 | A1 | 3/2011 | Rajagopal et al. |
| 2011/0227827 | A1 | 9/2011 | Solomon et al. |
| 2011/0229147 | A1 | 9/2011 | Yokoi |
| 2011/0243325 | A1 | 10/2011 | Ishii et al. |
| 2011/0299857 | A1 | 12/2011 | Rekimoto |
| 2012/0076509 | A1 | 3/2012 | Gurovich et al. |
| 2012/0080515 | A1 | 4/2012 | van der Merwe |
| 2012/0133815 | A1 | 5/2012 | Nakanishi et al. |
| 2012/0155889 | A1 * | 6/2012 | Kim et al. ............... 398/193 |
| 2012/0220311 | A1 | 8/2012 | Rodriguez et al. |
| 2012/0224743 | A1 | 9/2012 | Rodriguez et al. |
| 2012/0281987 | A1 | 11/2012 | Schenk et al. |
| 2012/0328302 | A1 | 12/2012 | Iizuka et al. |
| 2013/0141555 | A1 | 6/2013 | Ganick et al. |
| 2013/0170695 | A1 | 7/2013 | Anan et al. |
| 2013/0201369 | A1 | 8/2013 | Hirose |
| 2013/0251374 | A1 | 9/2013 | Chen et al. |
| 2013/0251375 | A1 | 9/2013 | Ozaki et al. |
| 2013/0271631 | A1 | 10/2013 | Tatsuzawa et al. |
| 2013/0272717 | A1 | 10/2013 | Deguchi et al. |
| 2013/0329440 | A1 | 12/2013 | Tsutsumi et al. |
| 2013/0330088 | A1 | 12/2013 | Oshima et al. |
| 2013/0335592 | A1 | 12/2013 | Yamada et al. |
| 2013/0337787 | A1 | 12/2013 | Yamada et al. |
| 2014/0037296 | A1 | 2/2014 | Yamada et al. |
| 2014/0117074 | A1 | 5/2014 | Kim |
| 2014/0184883 | A1 | 7/2014 | Shimamoto |
| 2014/0184914 | A1 | 7/2014 | Oshima et al. |
| 2014/0185860 | A1 | 7/2014 | Oshima et al. |
| 2014/0186026 | A1 | 7/2014 | Oshima et al. |
| 2014/0186047 | A1 | 7/2014 | Oshima et al. |
| 2014/0186048 | A1 | 7/2014 | Oshima et al. |
| 2014/0186049 | A1 | 7/2014 | Oshima et al. |
| 2014/0186050 | A1 | 7/2014 | Oshima et al. |
| 2014/0186052 | A1 | 7/2014 | Oshima et al. |
| 2014/0186055 | A1 | 7/2014 | Oshima et al. |
| 2014/0192185 | A1 | 7/2014 | Oshima et al. |
| 2014/0192226 | A1 | 7/2014 | Oshima et al. |
| 2014/0204129 | A1 | 7/2014 | Oshima et al. |
| 2014/0207517 | A1 | 7/2014 | Oshima et al. |
| 2014/0212145 | A1 | 7/2014 | Oshima et al. |
| 2014/0212146 | A1 | 7/2014 | Oshima et al. |
| 2014/0232896 | A1 | 8/2014 | Oshima et al. |
| 2014/0232903 | A1 | 8/2014 | Oshima et al. |
| 2014/0286644 | A1 | 9/2014 | Oshima et al. |
| 2014/0290138 | A1 | 10/2014 | Oshima et al. |
| 2014/0294397 | A1 | 10/2014 | Oshima et al. |
| 2014/0294398 | A1 | 10/2014 | Oshima et al. |
| 2014/0307155 | A1 | 10/2014 | Oshima et al. |
| 2014/0307156 | A1 | 10/2014 | Oshima et al. |
| 2014/0307157 | A1 | 10/2014 | Oshima et al. |
| 2014/0376922 | A1 | 12/2014 | Oshima et al. |
| 2015/0030335 | A1 | 1/2015 | Son et al. |
| 2015/0050027 | A1 | 2/2015 | Oshima et al. |

FOREIGN PATENT DOCUMENTS

| | | |
|---|---|---|
| EP | 2503852 | 9/2012 |
| JP | 07-200428 | 8/1995 |
| JP | 2002-144984 | 5/2002 |
| JP | 2002-290335 | 10/2002 |
| JP | 2003-179556 | 6/2003 |
| JP | 2003-281482 | 10/2003 |
| JP | 2004-072365 | 3/2004 |
| JP | 2004-306902 | 11/2004 |
| JP | 2005-160119 | 6/2005 |
| JP | 2006-020294 | 1/2006 |
| JP | 2006-092486 | 4/2006 |
| JP | 2006-121466 | 5/2006 |
| JP | 2006-227204 | 8/2006 |
| JP | 2006-319545 | 11/2006 |
| JP | 2006-340138 | 12/2006 |
| JP | 2007-019936 | 1/2007 |
| JP | 2007-036833 | 2/2007 |

(56) References Cited

FOREIGN PATENT DOCUMENTS

| | | |
|---|---|---|
| JP | 2007-043706 | 2/2007 |
| JP | 2007-049584 | 2/2007 |
| JP | 2007-060093 | 3/2007 |
| JP | 2007-082098 | 3/2007 |
| JP | 2007-096548 | 4/2007 |
| JP | 2007-124404 | 5/2007 |
| JP | 2007-189341 | 7/2007 |
| JP | 2007-201681 | 8/2007 |
| JP | 2007-221570 | 8/2007 |
| JP | 2007-228512 | 9/2007 |
| JP | 2007-248861 | 9/2007 |
| JP | 2007-295442 | 11/2007 |
| JP | 2007-312383 | 11/2007 |
| JP | 2008-015402 | 1/2008 |
| JP | 2008-033625 | 2/2008 |
| JP | 2008-057129 | 3/2008 |
| JP | 2008-124922 | 5/2008 |
| JP | 2008-187615 | 8/2008 |
| JP | 2008-252466 | 10/2008 |
| JP | 2008-252570 | 10/2008 |
| JP | 2008-282253 | 11/2008 |
| JP | 2008-292397 | 12/2008 |
| JP | 2009-88704 | 4/2009 |
| JP | 2009-130771 | 6/2009 |
| JP | 2009-206620 | 9/2009 |
| JP | 2009-212768 | 9/2009 |
| JP | 2009-232083 | 10/2009 |
| JP | 2009-538071 | 10/2009 |
| JP | 2009-290359 | 12/2009 |
| JP | 2010-103746 | 5/2010 |
| JP | 2010-117871 | 5/2010 |
| JP | 2010-152285 | 7/2010 |
| JP | 2010-226172 | 10/2010 |
| JP | 2010-232912 | 10/2010 |
| JP | 2010-258645 | 11/2010 |
| JP | 2010-268264 | 11/2010 |
| JP | 2010-278573 | 12/2010 |
| JP | 2010-287820 | 12/2010 |
| JP | 2011/023819 | 2/2011 |
| JP | 2011-29871 | 2/2011 |
| JP | 2011-250231 | 12/2011 |
| JP | 2011-254317 | 12/2011 |
| JP | 2012-010269 | 1/2012 |
| JP | 2012-043193 | 3/2012 |
| JP | 2012-95214 | 5/2012 |
| JP | 2012-169189 | 9/2012 |
| JP | 2012-205168 | 10/2012 |
| JP | 2012-244549 | 12/2012 |
| JP | 2013-042221 | 2/2013 |
| JP | 2013-197849 | 9/2013 |
| JP | 2013-223043 | 10/2013 |
| JP | 2013-223047 | 10/2013 |
| JP | 2013-223209 | 10/2013 |
| JP | 2013-235505 | 11/2013 |
| JP | 5393917 | 1/2014 |
| JP | 5395293 | 1/2014 |
| JP | 5405695 | 2/2014 |
| JP | 5521125 | 6/2014 |
| JP | 5541153 | 7/2014 |
| WO | 94/26063 | 11/1994 |
| WO | 96/36163 | 11/1996 |
| WO | 03/036829 | 5/2003 |
| WO | 2005/001593 | 1/2005 |
| WO | 2006/013755 | 2/2006 |
| WO | 2007/004530 | 1/2007 |
| WO | 2007/032276 | 3/2007 |
| WO | 2007/135014 | 11/2007 |
| WO | 2008/133303 | 11/2008 |
| WO | 2009/113415 | 9/2009 |
| WO | 2009/113416 | 9/2009 |
| WO | 2009/144853 | 12/2009 |
| WO | 2010/071193 | 6/2010 |
| WO | 2011/034346 | 3/2011 |
| WO | 2011/086517 | 7/2011 |
| WO | 2011/155130 | 12/2011 |
| WO | 2012/026039 | 3/2012 |
| WO | 2012/120853 | 9/2012 |
| WO | 2012/123572 | 9/2012 |
| WO | 2013/171954 | 11/2013 |
| WO | 2013/175803 | 11/2013 |

OTHER PUBLICATIONS

Written Opinion of the International Searching Authority (including English language translation thereof), mailed Mar. 11, 2014, in International (PCT) Application No. PCT/JP2013/007675.

International Search Report, mailed Feb. 25, 2014, in International Application No. PCT/JP2013/006895.

Written Opinion of the International Search Authority, mailed Feb. 25, 2014, in International Application No. PCT/JP2013/006895 (English Language Translation).

Office Action, mailed Jan. 29, 2014, in corresponding U.S. Appl. No. 13/902,393.

Office Action, mailed on Jun. 20, 2014, for the corresponding U.S. Appl. No. 14/087,635.

Office Action, mailed on May 22, 2014, for the corresponding U.S. Appl. No. 14/087,645.

Office Action, mailed Nov. 8, 2013, in the corresponding U.S. Appl. No. 13/902,436.

Office Action, mailed on Apr. 14, 2014, in related U.S. Appl. No. 13/911,530.

Office Action, mailed on Apr. 16, 2014, in related U.S. Appl. No. 13/902,393.

Office Action, mailed on Aug. 4, 2014, in related U.S. Appl. No. 14/210,688.

Office Action, mailed on Feb. 4, 2014, in related U.S. Appl. No. 13/911,530.

Office Action, mailed on Jul. 2, 2014, in related U.S. Appl. No. 14/087,619.

Office Action, mailed on Jul. 2, 2014, in related U.S. Appl. No. 14/261,572.

Office Action, mailed on Jul. 29, 2014, in related U.S. Appl. No. 14/087,639.

Office Action, mailed on Aug. 5, 2014, in related U.S. Appl. No. 13/902,393.

Office Action, mailed on Aug. 5, 2014, in related U.S. Appl. No. 13/911,530.

Office Action, mailed on Aug. 8, 2014, in related U.S. Appl. No. 14/315,509.

International Search Report, mailed Feb. 4, 2014, in International Application No. PCT/JP2013/006858.

International Search Report, mailed Feb. 4, 2014, in International Application No. PCT/JP2013/006861.

International Search Report, mailed Feb. 4, 2014, in International Application No. PCT/JP2013/006863.

International Search Report, mailed Feb. 10, 2014, in International Application No. PCT/JP2013/006859.

International Search Report, mailed Feb. 10, 2014, in International Application No. PCT/JP2013/006860.

International Search Report, mailed Feb. 18, 2014, in International Application No. PCT/JP2013/006871.

International Search Report, mailed Jun. 18, 2013, in International Application No. PCT/JP2013/003319.

Written Opinion of the International Searching Authority, mailed Jun. 18, 2013, in International Application No. PCT/JP2013/003319 (English language translation).

International Search Report, mailed Feb. 4, 2014, in International Application No. PCT/JP2013/006857.

Written Opinion of the International Search Authority, mailed Feb. 4, 2014, in International Application No. PCT/JP2013/006857 (English language translation).

Takao Nakamura et al., "Fast Watermark Detection Scheme from Analog Image for Camera-Equipped Cellular Phone", IEICE Transactions, D-II, vol. J87-D-II, No. 12, pp. 2145-2155, Dec. 2004 (with English language translation).

(56) References Cited

OTHER PUBLICATIONS

Dai Yamanaka et al., "An investigation for the Adoption of Subcarrier Modulation to Wireless Visible Light Communication using Imaging Sensor", The Institute of Electronics, Information and Communication Engineers IEICE Technical Report, Jan. 4, 2007, vol. 106, No. 450, pp. 25-30 (with English language translation).
International Search Report, mailed Jun. 18, 2013, in International Application No. PCT/JP2013/003318.
Written Opinion of the International Searching Authority, mailed Feb. 4, 2014, in International Application No. PCT/JP2013/006894 (English language translation).
International Search Report, mailed Feb. 10, 2014, in International Application No. PCT/JP2013/006869.
International Search Report, mailed Feb. 10, 2014, in International Application No. PCT/JP2013/006870.
Written Opinion of the International Searching Authority, mailed Feb. 10, 2014, in International Application No. PCT/JP2013/006870 (English language translation).
International Search Report, mailed Mar. 11, 2014, in International Application No. PCT/JP2013/007709.
Written Opinion of the International Searching Authority, mailed Mar. 11, 2014, in International Application No. PCT/JP2013/007709 (English language translation).
International Search Report, mailed Feb. 10, 2014, in International Application No. PCT/JP2013/007708.
International Search Report, mailed Feb. 10, 2014, in International Application No. PCT/JP2013/007684.
International Search Report, mailed Feb. 4, 2014, in International Application No. PCT/JP2013/006894.
Written Opinion of the International Searching Authority, mailed Feb. 18, 2014, in International Application No. PCT/JP2013/006871 (English language translation).
Written Opinion of the International Searching Authority, mailed Feb. 4, 2014, in International Application No. PCT/JP2013/006858 (English language translation).
Written Opinion of the International Searching Authority, mailed Feb. 10, 2014, in International Application No. PCT/JP2013/006860 (English language translation).
Written Opinion of the International Searching Authority, mailed Feb. 4, 2014, in International Application No. PCT/JP2013/006861 (English language translation).
Written Opinion of the International Searching Authority, mailed Feb. 10, 2014, in International Application No. PCT/JP2013/006869 (English language translation).
Office Action, mailed Aug. 25, 2014, in related U.S. Appl. No. 13/902,215.
Office Action, mailed Sep. 18, 2014, in related U.S. Appl. No. 14/142,372.
Office Action, mailed Oct. 1, 2014, in related U.S. Appl. No. 14/302,913.
Office Action, mailed Oct. 14, 2014, in related U.S. Appl. No. 14/087,707.
Gao et al., "Understanding 2D-BarCode Technology and Applications in M-Commerce-Design and Implementation of a 2D Barcode Processing Solution", IEEE Computer Society 31st Annual International Computer Software and Applications Conference (COMPSAC 2007), Aug. 2007.
U.S. Appl. No. 14/315,509, filed Jun. 26, 2014.
U.S. Appl. No. 14/315,867, filed Jun. 26, 2014.
U.S. Appl. No. 14/315,792, filed Jun. 26, 2014.
U.S. Appl. No. 14/315,732, filed Jun. 26, 2014.
U.S. Appl. No. 14/302,966, filed Jun. 12, 2014.
U.S. Appl. No. 14/302,913, filed Jun. 12, 2014.
U.S. Appl. No. 14/142,413, filed Dec. 27, 2013.
U.S. Appl. No. 14/142,372, filed Dec. 27, 2013.
International Search Report, mailed Feb. 3, 2015, in International Application No. PCT/JP2014/006448.
Extended European Search Report, mailed May 21, 2015, from the European Patent Office in related European Patent Application No. 13793716.5.
Extended European Search Report, mailed Jun. 1, 2015, from the European Patent Office in related European Patent Application No. 13793777.7.
Jiang Liu et al., "Foundational Analysis of Spatial Optical Wireless Communication Utilizing Image Sensor", Imaging Systems and Techniques (IST), 2011 IEEE International Conference on Imaging Systems and Techniques, IEEE, May 17, 2011, pp. 205-209, XP031907193.
USPTO Office Action, mailed Jun. 23, 2015, in related U.S. Appl. No. 14/142,413.
Christos Danakis et al., "Using a CMOS Camera Sensor for Visible Light Communication", 2012 IEEE Globecom Workshops, U.S., Dec. 3, 2012, pp. 1244-1248.
USPTO Office Action, mailed Nov. 21, 2014, in related U.S. Appl. No. 14/261,572.
Japan Office Action, mailed Jul. 28, 2015, for Japanese Patent Application No. 2015-129247.
USPTO Office Action, mailed Jan. 30, 2015, in related U.S. Appl. No. 14/539,208.
USPTO Office Action, mailed Mar. 6, 2015, in related U.S. Appl. No. 14/087,707.
Extended European Search Report, mailed Nov. 10, 2015, in related European Application No. 13869757.8.
Extended European Search Report, mailed Nov. 10, 2015, in related European Application No. 13868814.8.
Extended European Search Report, mailed Nov. 10, 2015, in related European Application No. 13868307.3.
Extended European Search Report, mailed Nov. 10, 2015, in related European Application No. 13868118.4.
Extended European Search Report, mailed Nov. 10, 2015, in related European Application No. 13867350.4.
Extended European Search Report, mailed Nov. 23, 2015, in related European Application No. 13867905.5.
Extended European Search Report, mailed Nov. 23, 2015, in related European Application No. 13866705.0.

\* cited by examiner

FIG. 9
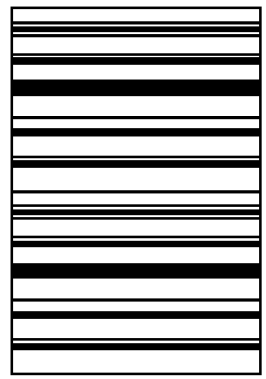
(a)
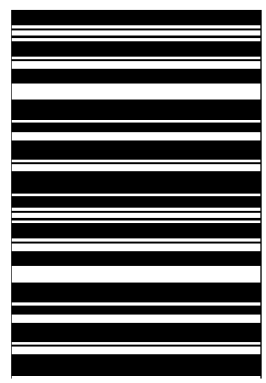
(b)
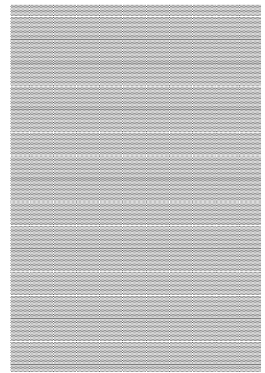
(c)

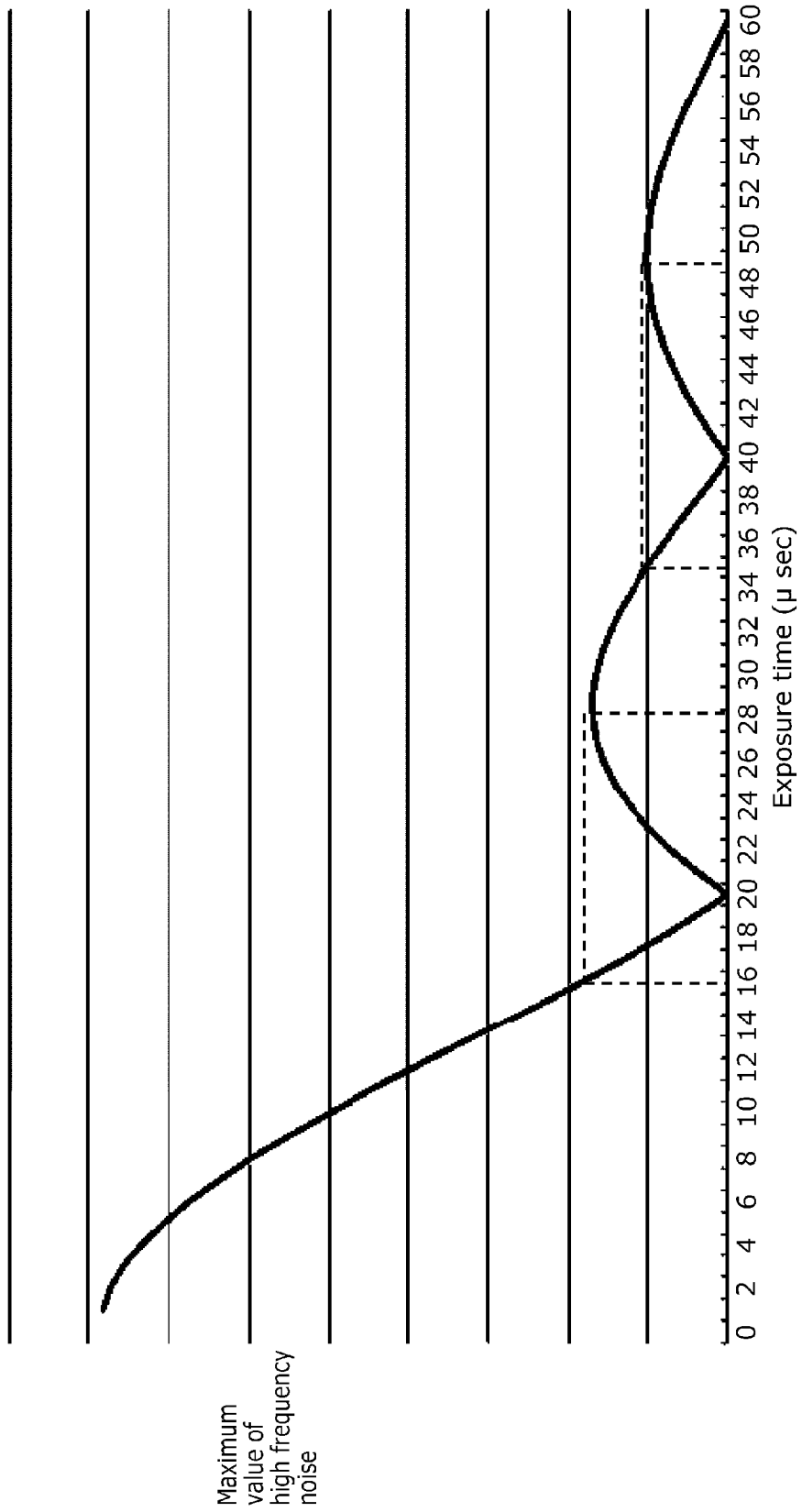

VISIBLE LIGHT COMMUNICATION SIGNAL DISPLAY METHOD AND APPARATUS

CROSS REFERENCE TO RELATED APPLICATION

The present application claims the benefit of U.S. Provisional Patent Application No. 61/746,315 filed on Dec. 27, 2012, U.S. Provisional Patent Application No. 61/896,874 filed on Oct. 29, 2013, U.S. Provisional Patent Application No. 61/907,467 filed on Nov. 22, 2013, Japanese Patent Application No. 2012-286339 filed on Dec. 27, 2012, Japanese Patent Application No. 2013-110445 filed on May 24, 2013, Japanese Patent Application No. 2013-203349 filed on Sep. 30, 2013, Japanese Patent Application No. 2013-224801 filed on Oct. 29, 2013, Japanese Patent Application No. 2013-242338 filed on Nov. 22, 2013, and Japanese Patent Application No. 2013-242407 filed on Nov. 22, 2013. The entire disclosures of the above-identified applications, including the specifications, drawings and claims are incorporated herein by reference in their entirety.

FIELD

The present disclosure relates to a visible light communication signal display method for transmitting given information by visible light communication in a manner that mixes the given information into video which is being displayed on a display apparatus, and relates to the display apparatus.

BACKGROUND

Communication techniques using visible light have been proposed. For example, as in Patent Literatures (PTLs) 1 and 2, there are proposals on a video display apparatus including a display, a projector, etc., to superimpose visible light communication information on normal video to be displayed and then display resultant video.

In addition, there are the digital watermark technology applied to printed materials, and techniques of displaying QR codes (registered trademark), barcodes, or the like, in images and using encoded signals thereof to spread information to the Internet world though imaging devices such as mobile phones, smart phones, or digital cameras.

However, in these techniques, video signals are displayed by way of driving each pixel and controlling a backlight, and as a part of the control on the backlight, the visible light communication signals are encoded and superimposed. Thus, these techniques can be applied only to video display devices which display video by controlling the two systems.

Another devised method is, for example, superimposing information on an entire image inconspicuously like watermark and decoding the superimposed information on a receiver side, that is, transmitting and receiving, in or without synchronization with video, information different from the video (e.g., information relevant to the video), using a video display apparatus. There has also been an approach that, as in press release 1, separates information quickly with use of an existing typical reception device although some deterioration is seen in video.

CITATION LIST

Patent Literature

[Patent Literature 1] Japanese Unexamined Patent Application Publication No. 2007-43706

[Patent Literature 2] Japanese Unexamined Patent Application Publication No. 2009-212768

SUMMARY

Technical Problem

However, the conventional visible light communication requires further improvements.

Solution to Problem

A display apparatus according to an aspect of the present disclosure is a visible light communication signal display method of displaying (i) an image represented by video signals and (ii) an image obtained by encoding visible light communication signals, and includes: encoding at least part of the visible light communication signals to generate an encoded image; generating a plurality of sub-images which correspond to respective partial images obtained by dividing the encoded image and each of which (i) includes a corresponding one of the partial images and (ii) except for the corresponding one of the partial images, is an image having a substantially uniform luminance value lower than or equal to a predetermined luminance value; and displaying, in a video display period, the image represented by the video signals, and displaying the sub-images in time series in a communication period different from the video display period.

It is to be noted that these general and specific aspects may be implemented using a system, a method, an integrated circuit, a computer program, or a computer-readable recording medium such as CD-ROM, or any combination of systems, methods, integrated circuits, computer programs, and recording media.

Additional benefits and advantages of the disclosed embodiments will be apparent from the Specification and Drawings. These benefits and/or advantages may be individually obtained by the various embodiments and features of the Specification and Drawings, which need not all be provided in order to obtain one or more of such benefits and/or advantages.

Advantageous Effects

According to the present disclosure, further improvements can be made on the visible light communication.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 9 schematically illustrates other display examples of the encoded image according to Embodiment 1.

FIG. 10 illustrates the relation between high frequency noise of light source luminance and exposure time according to Embodiment 1.

DESCRIPTION OF EMBODIMENTS

Figure 1:
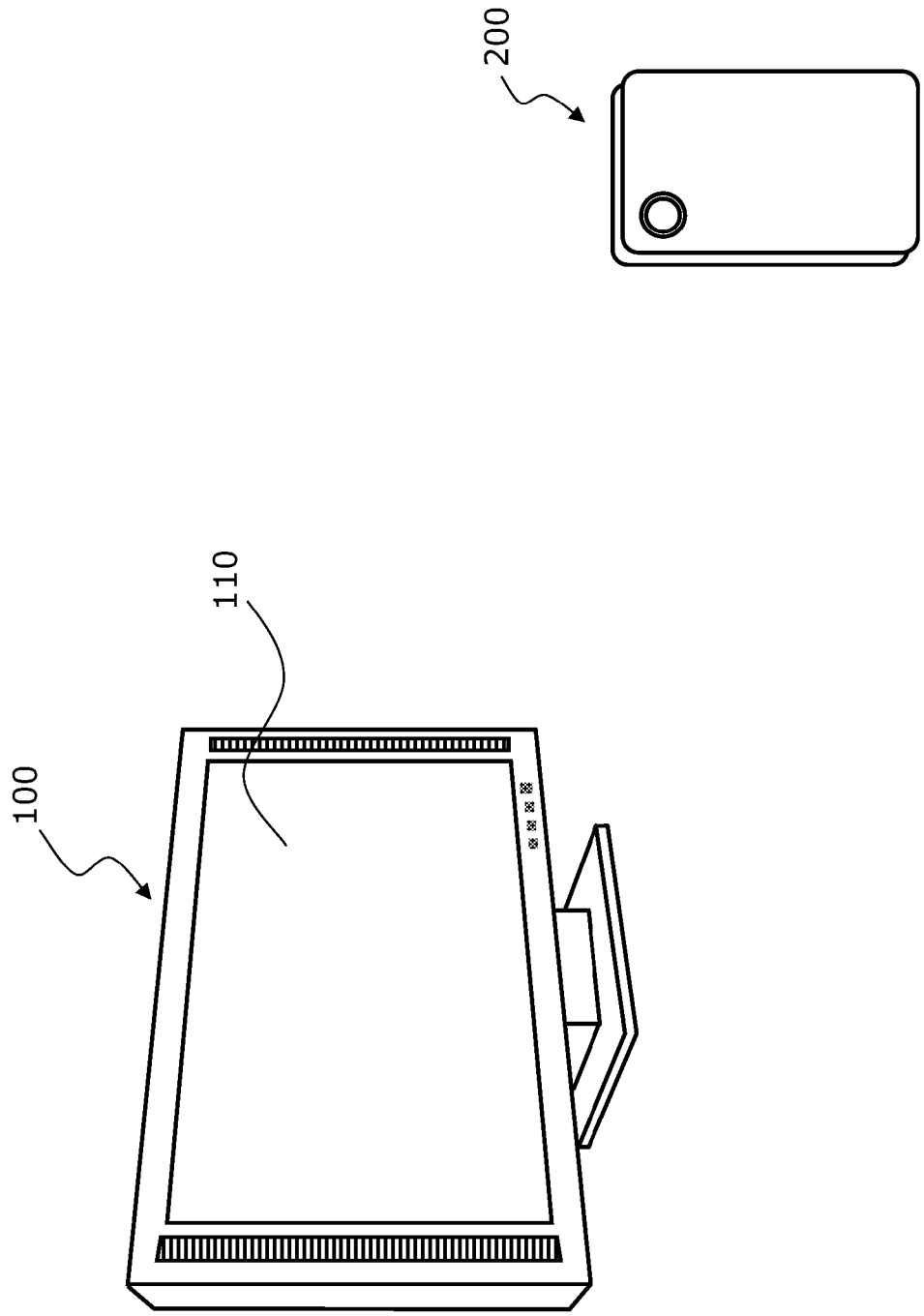
FIG. 1 schematically illustrates an example of a visible light communication system according to Embodiment 1.

The following describes embodiments in detail with reference to the drawings as appropriate. Descriptions which are more detailed than necessary may, however, be omitted. For example, detailed descriptions on already well-known matters and overlapping descriptions on substantially the same configurations may be omitted. The reason for this is to avoid the following description becoming unnecessarily redundant, thereby helping those skilled in the art easily understand it.

It is to be noted that the Applicants provide the appended drawings and the following description to help those skilled in the art fully understand the present disclosure and do not intend to thereby restrict the subject matter recited in the Claims.

(Development into Invention)

There is a method of superimposing visible light communication signals by way of flickering a backlight as disclosed in PTL 1. In this method, the visible light communication signals cannot be transmitted during a period of time in which the backlight is off. During the period in which the visible light communication signals cannot be transmitted, there is no other way but to perform communication with reduced image quality so as not to cause an error in signal transmission.

Furthermore, in a recent video display apparatus, particularly, in the field of a liquid-crystal display, a projector using liquid crystals, etc., a technique called backlight scanning is adopted to improve image quality. The backlight scanning is a technique to divide a display surface into regions and control light emission of backlights so that the backlights in the respective regions resulting from the division are sequentially turned on on a regular basis. Furthermore, the video display apparatus using liquid crystals takes a measure such as limiting turning on backlights according to image signals, in order to improve its deteriorating moving picture properties.

Thus, when visible light communication using backlights is applied to such a video display apparatus, it is difficult to concurrently achieve the improvement of the moving picture properties and the visible light communication using modulation of the backlights.

Meanwhile, in other video display apparatuses, for example, not only a projector of a type in which a digital mirror device (hereinafter referred to as DMD) is mounted, an organic electro-luminescence (EL) display, and a plasma display, but also a video display apparatus using the cathode ray tube (CRT), it is impossible to transmit video signals with other signals superimposed thereon through the approach as disclosed by the PTL 1 or 2. In addition, there are the digital watermark technology applied to printed materials, and a method to display QR codes (registered trademark), barcodes, or the like, in images and obtain, using encoded signals thereof, information from video signals and furthermore, spread the obtained information to the Internet world though imaging devices such as mobile phones, smartphones, or digital cameras. These methods, however, have limitations, such as the restriction on the size of a field of view and the requirement to increase the focus level to a certain level, and thus involve a problem that image recognition takes time. Accordingly, dedicated video signals must be continuously output for at least a few seconds, for example, which is not good enough for general use. It is to be noted that the field of view indicates a screen size in the present disclosure.

Thus, according to the present disclosure, encoded signals are mixed into video signals only for a very short period of time, and this is repeated in certain cycles. Furthermore, an imaging device including an image sensor of a sequential exposure type is used to achieve synchronization. With this, a display apparatus, a reception device, a visible light communication system, and a signal transfer method are described which can transmit information of visible light communication as inserted into image information, without the need of extreme concerns on the field of view, the distance to the video display apparatus, and so on, for a relatively short length of time that is one second at the longest, and moreover, without significant disturbance to the video signals, that is, without drastic reduction in image quality. In addition, as to projectors, a technique for projecting images on a structure or the like which is not a simple flat surface, other than a screen, is described.

A visible light communication signal display method according to an aspect of the present disclosure is a visible light communication signal display method of displaying (i) an image represented by video signals and (ii) an image obtained by encoding visible light communication signals, and includes: encoding at least part of the visible light communication signals to generate an encoded image; generating a plurality of sub-images which correspond to respective partial images obtained by dividing the encoded image and each of which (i) includes a corresponding one of the partial images and (ii) except for the corresponding one of the partial images, is an image having a substantially uniform luminance value lower than or equal to a predetermined luminance value; and displaying, in a video display period, the image represented by the video signals, and displaying the sub-images in time series in a communication period different from the video display period.

Thus, the encoded image can be divided into plural sub-images and displayed properly.

For example, it may be that in the encoding, part of the visible light communication signals is encoded to generate the encoded image, and other part of the visible light communication signals is encoded into timings at which the sub-images are displayed, and in the displaying, the sub-images are displayed in time series at the timings in the communication period.

By doing so, in addition to the encoded image, the timing at which the sub-images are displayed can be used in signal transmission. This makes it possible to increase the amount of data that is transmitted by visible light communication.

For example, it may be that in the generating, a plurality of reversed images are further generated which correspond to the respective partial images are further generated and each of which (i) includes a reversed partial image obtained by reversing luminance of a corresponding one of the partial images and (ii) except for the reversed partial image, is an image having a substantially uniform luminance value lower than or equal to a predetermined luminance value, and in the displaying, the reversed images are further displayed in time series in the communication period.

By doing so, it is possible to reduce the occurrence of recognition of the encoded image.

For example, it may be that in the encoding, part of the visible light communication signals is encoded to generate the encoded image, and other part of the visible light communication signals is encoded into a sequence in which the sub-images are displayed, and in the displaying, the sub-images are displayed in time series in the sequence in the communication period.

By doing so, in addition to the encoded image, the sequence in which the sub-images are displayed can be used in signal transmission. This makes it possible to increase the amount of data that is transmitted by visible light communication.

For example, it may be that in the displaying, in the communication period, a black image having a substantially uniform luminance value lower than or equal to a predetermined luminance value is displayed between the sub-images, and a length of time that the black image is displayed is 30 microseconds or more.

By doing so, it is possible to display video from which the signals can be properly received by the reception device.

For example, the length of time that the black image is displayed may be 100 microseconds or more.

By doing so, it is possible to display video from which the signals can be properly received by the reception device.

For example, in the displaying, a length of time that each one of the sub-images is displayed may be 200 microseconds or less.

By doing so, it is possible to display video from which the signals can be properly received by the reception device.

For example, in the displaying, a length of time that each one of the sub-images is displayed may be 10 microseconds or more.

By doing so, it is possible to display video from which the signals can be properly received by the reception device.

Furthermore, a visible light communication signal display method according to an aspect of the present disclosure is a visible light communication signal display method of displaying (i) an image represented by video signals and (ii) an image for transmitting visible light communication signals, and includes: encoding at least part of the visible light communication signals into a pattern for dividing a basic image; dividing the basic image into a plurality of sub-images according to the pattern; and displaying, in a video display period, the image represented by the video signals, and displaying, in time series in a communication period different from the video display period, a reversed image obtained by reversing luminance of the basic image, and the sub-images.

This allows visible light communication in which the division pattern for dividing the basic image is used in signal transmission. Furthermore, when the reversed image is displayed, the reception device can identify a position on the pattern for the basic image using the reversed image. This allows for the visible light communication even when video is displayed on a structure or the like which is not a simple flat surface other than a screen.

For example, the image for transmitting the visible light communication signals may include the basic image and the sub-images.

For example, it may be that in the encoding, part of the visible light communication signals is encoded to generate the pattern, and other part of the visible light communication signals is encoded into timings at which the sub-images are displayed, and in the displaying, the sub-images are displayed in time series at the timings in the communication period.

By doing so, in addition to the division pattern, the timing at which the sub-images are displayed can be used in signal transmission. This makes it possible to increase the amount of data that is transmitted by visible light communication.

For example, it may be that in the encoding, a pattern that corresponds to the at least part of the visible light communication signals is selected from a plurality of the patterns, each for dividing the basic image into a same number of the sub-images, to encode the at least part of the visible light communication signals into the pattern, and the patterns include a pattern in which the sub-images include an all-black image having a substantially uniform luminance value lower than or equal to a predetermined luminance value.

This makes it possible to not only increase the number of patterns, but also facilitate conversion between patterns and signals.

For example, in the encoding, a pattern that corresponds to the at least part of the visible light communication signals may be selected from a plurality of the patterns for dividing the basic image into a different number of the sub-images, to encode the at least part of the visible light communication signals into the pattern.

This makes it possible to reduce the occurrence of unnecessary images being displayed.

For example, in the dividing, the sub-images may be generated which correspond to respective partial images obtained by dividing the basic image and each of which (i) includes a corresponding one of the partial images and (ii) except for the corresponding one of the partial images, is an image having a substantially uniform luminance value lower than or equal to a predetermined luminance value.

Thus, the basic image can be divided into plural sub-images and displayed properly.

For example, it may be that in the encoding, part of the visible light communication signals is encoded to generate the pattern, and other part of the visible light communication signals is encoded into a sequence in which the sub-images are displayed, and in the displaying, the sub-images are displayed in time series in the sequence in the communication period.

By doing so, in addition to the division pattern, the sequence in which the sub-images are displayed can be used in signal transmission. This makes it possible to increase the amount of data that is transmitted by visible light communication.

For example, it may be that in the encoding, part of the visible light communication signals is encoded to generate the pattern, and other part of the visible light communication signals is encoded into the basic image.

By doing so, in addition to the division pattern, image content can be used in signal transmission. This makes it possible to increase the amount of data that is transmitted by visible light communication.

For example, it may be that in the displaying, in the communication period, a black image having a substantially uniform luminance value lower than or equal to a predetermined luminance value is displayed between the sub-images, and a length of time that the black image is displayed is 30 microseconds or more.

By doing so, it is possible to display video from which the signals can be properly received by the reception device.

For example, the length of time that the black image is displayed may be 100 microseconds or more.

By doing so, it is possible to display video from which the signals can be properly received by the reception device.

For example in the displaying, a length of time that each one of the sub-images is displayed may be 200 microseconds or less.

By doing so, it is possible to display video from which the signals can be properly received by the reception device.

For example, in the displaying, a length of time that each one of the sub-images is displayed may be 10 microseconds or more.

By doing so, it is possible to display video from which the signals can be properly received by the reception device.

Furthermore, a display apparatus according to an aspect of the present disclosure is a display apparatus which displays (i) an image represented by video signals and (ii) an image obtained by encoding visible light communication signals, and includes: an encoding unit configured to encode at least part of the visible light communication signals to generate an encoded image; a dividing unit configured to generate a plurality of sub-images which correspond to respective partial images obtained by dividing the encoded image and each of which (i) includes a corresponding one of the partial images and (ii) except for the corresponding one of the partial images, is an image having a substantially uniform luminance value lower than or equal to a predetermined luminance value; and a display unit configured to display, in a video display period, the image represented by the video signals, and display the sub-images in time series in a communication period different from the video display period.

Thus, the display apparatus is capable of dividing the encoded image into plural sub-images and displaying the sub-images properly.

Furthermore, a display apparatus according to an aspect of the present disclosure is a display apparatus which displays (i) an image represented by video signals and (ii) an image for transmitting visible light communication signals, and includes: an encoding unit configured to encode at least part of the visible light communication signals into a pattern for dividing a basic image; a dividing unit configured to divide the basic image into a plurality of sub-images according to the pattern; and a display unit configured to display, in a video display period, the image represented by the video signals, and display, in time series in a communication period different from the video display period, a reversed image obtained by reversing luminance of the basic image, and the sub-images.

This allows visible light communication in which the division pattern for dividing the basic image is used in signal transmission. Furthermore, when the reversed image is displayed, the reception device can identify a position on the pattern for the basic image using the reversed image. This allows for the visible light communication even when video is displayed on a structure or the like which is not a simple flat surface other than a screen.

Furthermore, a display apparatus according to an aspect of the present disclosure is a display apparatus capable of displaying an image in a time section of one frame or a shorter length based on a frequency of a video signal and includes: a display surface which outputs video; a display control unit configured to cause the display surface to output the video based on the video signal; a communication signal control unit configured to obtain a display image through encoding and transformation based on a visible light communication signal; and a video signal control unit configured to output the display image based on the visible light signal for a predetermined duration of one frame or less for the display video signal, wherein a time axis of the visible light communication signal is encoded and displayed in a direction in which the display surface is present, an image including a striped image displayed as a map obtained by shifting it a certain length in a direction perpendicular thereto is inserted to normal video signals and displayed for a short duration of one frame or less, resultant video is captured by an image sensor of a sequential exposure type, and during a period in which the image including the striped image is repeatedly displayed, exposure data is repeatedly overwritten while sequential exposure continues, and at a stage where the striped image is recognized by the image sensor, the overwriting of the exposure data is stopped, and at a stage where a set of the exposure data of the striped image is obtained, the obtained data of the striped image is decoded to obtain the visible light communication signal. Furthermore, by using an image indicating the magnitude of a signal in an identifier (header) portion of the signal, the present disclosure enables even application of signal communication using striped images to a technique called projection mapping etc., in which images are projected on a structure other than a flat surface such as a screen, while such application used to be difficult to achieve.

It is to be noted that these general and specific aspects may be implemented using a system, a method, an integrated circuit, a computer program, or a computer-readable recording medium such as CD-ROM, or any combination of systems, methods, integrated circuits, computer programs, and recording media.

It is to be noted that each of the embodiments described below shows a specific example of the present disclosure. The numerical values, shapes, materials, structural elements, the arrangement and connection of the structural elements, steps, the processing order of the steps etc., shown in the following embodiments are mere examples and do not restrict the present disclosure. Furthermore, among the structural elements in the following embodiments, structural elements not recited in the independent claims each indicating the broadest concept are described as arbitrary structural elements.

Embodiment 1

FIG. 1 schematically illustrates an example of a video display system which enables visible light communication according to Embodiment 1.

A display apparatus 100 is, for example, a liquid-crystal display apparatus, and is capable of displaying video on a display unit 110. Furthermore, the video displayed on this display unit 110 includes a visible light communication signal superimposed thereon which indicates information on the video. By capturing the video displayed on the display unit 110, a reception device 200 receives the visible light communication signal transmitted from the display unit 110 of the display apparatus 100. The reception device 200 is, for example, a smartphone which incorporates an image sensor of the sequential exposure type. This allows a user to receive, for example, information regarding the video that is being displayed on the display apparatus 100.

It is to be noted that although Embodiment 1 cites a liquid-crystal display apparatus as an example of the display apparatus, the display apparatus may be display equipment, such as an organic EL display apparatus or a plasma display apparatus, or a display apparatus of a projection type, such as a projection display apparatus or a projector.

Furthermore, although a smartphone is cited as an example of the reception device, it is sufficient that the reception device is an electronic device in which an image sensor of a type that is capable of sequential exposure is mounted. For example, the reception device may be a digital still camera or the like.

Figure 2:
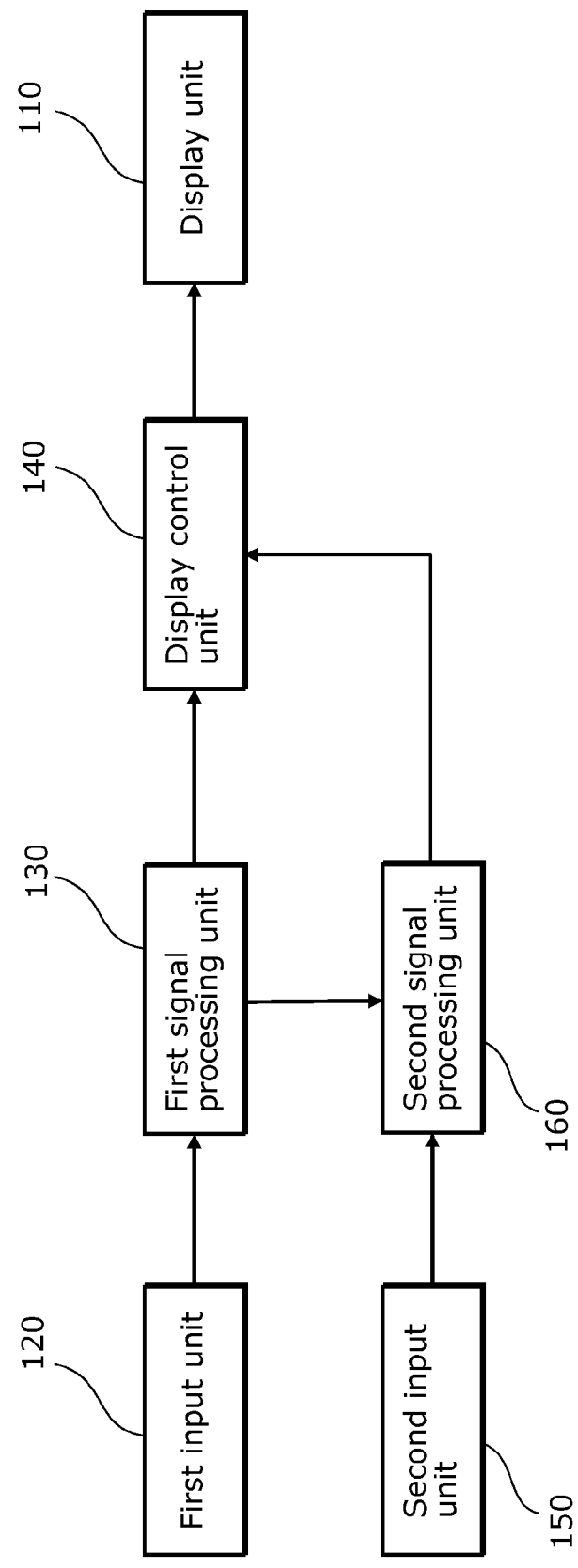
FIG. 2 is a block diagram illustrating a schematic configuration of the video display apparatus according to Embodiment 1.

FIG. 2 is a block diagram illustrating an example of a schematic configuration of the display apparatus 100 according to Embodiment 1. As illustrated in FIG. 2, the display apparatus 100 includes a display unit 110, a first input unit 120, a first signal processing unit 130, a display control unit 140, a second input unit 150, and a second signal processing unit 160.

The first input unit 120 receives a video signal regarding video which is to be displayed on the display unit 110 from broadcast waves, a video recorder, a video player, a PC, or the like, through an antenna cable, a video signal line such as a composite cable, an HDMI (registered trademark) cable, or a PJ link cable, or a LAN cable etc., and transmits the received video signal to the first signal processing unit 130. It is to be noted that the video recorder or the video player may use signals stored on various recording media.

The first signal processing unit 130 performs, on the received video signal, common image processing such as a decoding process, and then, divides each frame into a plurality of sub-frames. The first signal processing unit 130 transmits, to the display control unit 140 and the second signal processing unit 160, information indicating the length of the sub-frame, the level of the video signal, a display timing, brightness, and so on.

The second input unit 150 receives, through a dedicated cable, a LAN cable, or the like, a visible light communication signal created by a PC or the like. It is to be noted that the visible light communication signal may be superimposed on part of the broadcast waves and input to the second input unit 150 through the antenna cable. Furthermore, the second input unit 150 may receive a video signal of recorded broadcast, or a video signal on which the visible light communication signal created separately by a PC or the like has been superimposed, from a video recorder or a video player through as an HDMI (registered trademark) cable, a PJ link cable, or the like. The video recorder or the video player may use signals stored on various recording media. In addition, other than the method of receiving the signal from outside, there is a method of obtaining information from a sever through the Internet or the like by using information embedded in the display apparatus, such as ID of the display apparatus, and using this information. The second input unit 150 transmits the received signal to the second signal processing unit 160. Hereafter, one group of a series of data of the visible light communication signal will be referred to as one block.

The second signal processing unit 160 creates a modulated signal of the visible light communication signal received from the second input unit 150 and creates an encoded image based on the modulated signal. Encoding of the visible light communication signal may be encoding compliant with JEITA-CP1222 or 1223 or may be encoding compliant with a standard such as IEEE-P802.15.7. It is only necessary to use a reception device which supports the encoding used. Other encoding methods, for example, Manchester coding or the like, may be used for modulation. Furthermore, although the following describes the case where binary encoding is performed, ternary or higher-order encoding is also possible as the fact that the tone representation can be directly used is taken into consideration. Thus, it is possible to transmit an amount of information not less than twice the amount of information transmitted in the case of binary encoding.

Furthermore, the second signal processing unit 160 determines, based on information regarding brightness, etc., of video included in the video signal received from the first signal processing unit 130, which sub-frame among sub-frames forming one frame or among a plurality of frames the encoded image is to be inserted into. For example, the second signal processing unit 160 selects a sub-frame included in a frame in which an image is displayed with relatively high brightness, and inserts the encoded image therein. Furthermore, the second signal processing unit 160 may select a sub-frame in which an image is displayed with relatively high brightness, and insert the encoded image therein.

The second signal processing unit 160 may set a sub-frame to be inserted in a frame or may select as sub-frame in which an image is displayed with relatively high brightness on the display unit 110, and insert the encoded image therein. Furthermore, when the tones are represented using weighted sub-frames, there is a case where error diffusion, etc., has expanded the width of the tone representation. In this case, when a sub-frame with less weight is used in the representation, it may be that a period in which the error diffusion, etc., does not cause fluctuation in luminance and the lit-up state continues is selected, and the encoded image is displayed in the selected period.

Furthermore, regarding displaying of normal video, a usable display method is to correct, using another sub-field, the increase and decrease in luminance which are caused by displaying the encoded image of the visible light communication signal so that a viewer can view the video as continuous video without a feeling of strangeness.

It is to be noted that, instead of selecting an existing sub-frame, a time section in which normal video is displayed and a time section in which the encoded image is displayed may be set within one frame. Also in this case, a frame in which images are displayed with relatively high brightness on the display unit 110 may be selected as a frame in which the encoded image is to be displayed.

Furthermore, in the case where a position or a time section in which the encoded image is to be inserted has been determined in advance, the second signal processing unit 160 does not need to perform the process for determining a sub-frame or a time section in which the encoded image is to be inserted. In this case, it is sufficient that the encoded image is inserted in a predetermined sub-frame or time section and displayed.

Furthermore, the length of time for which the encoded image is displayed is desired to be as short as possible but depends largely on the performance of the reception device, which will be described in detail hereinbelow.

The second signal processing unit 160 transmits, to the display control unit 140, the generated encoded image and display timing information indicating a sub-frame or time section in which the encoded image is to be inserted.

According to the display timing information received from each of the first signal processing unit 130 and the second signal processing unit 160, the display control unit 140 inserts, into the video signal received from the first signal processing unit 130, the encoded image received from the second signal processing unit 160. It is to be noted that when the response speed for video and so on are taken into consideration, it is desired that the display control unit 140 display images with use of an element capable of performing switching, such as a solid semiconductor element, as will be described hereinbelow. The display unit 110 displays the video signal received from the display control unit 140.

Figure 3:
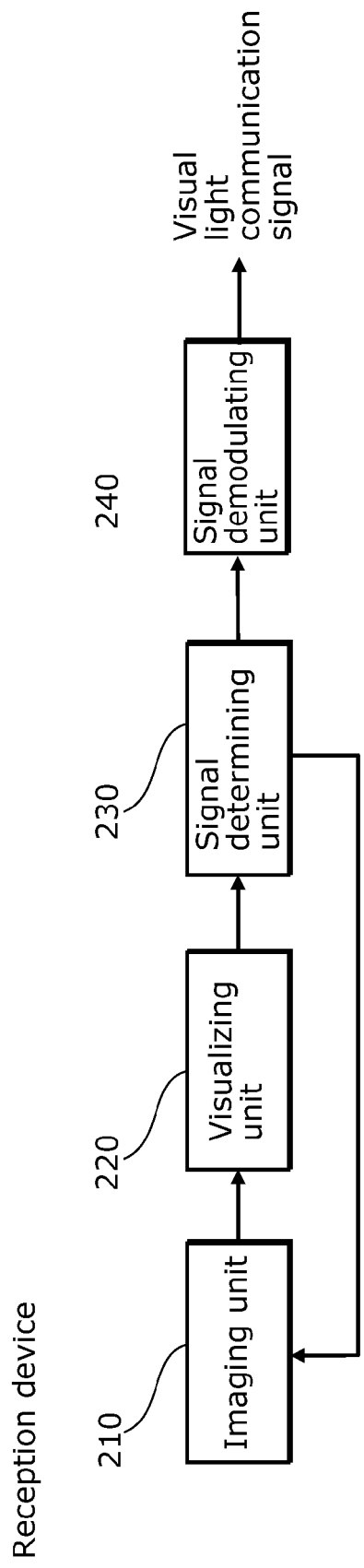
FIG. 3 is a block diagram illustrating a schematic configuration of a reception device according to Embodiment 1.

FIG. 3 is a block diagram illustrating a configuration example of the reception device 200 according to Embodiment 1.

As illustrated in FIG. 3, the reception device 200 includes an imaging unit 210, a visualizing unit 220, a signal determining unit 230, and a signal demodulating unit 240.

The imaging unit 210 captures an image displayed on the display unit 110. The imaging unit 210 includes an image sensor of the sequential exposure type, for example. Following the start of capturing an image, the image sensor performs sequential exposure on a per row basis and stores data of the captured image into a buffer (not illustrated). There are some image sensors which perform sequential exposure on a per row basis, on a per exposure element basis, for every group containing a predetermined number of plural elements, and so on, all of which are handled in the same manner and aim to obtain data arranged horizontally in images.

The visualizing unit 220 transforms the data of an image captured by the imaging unit 210 and stored in the buffer, into a bit map in which luminance of each pixel is represented two-dimensionally, and outputs the bit map to the signal determining unit 230 as video.

The signal determining unit 230 determines whether or not the video received from the visualizing unit 220 includes the encoded image. Firstly, the signal determining unit 230 determines the size of data in one block using repeated data and searches for the header portion of the data, thereby determining whether or not the encoded data is included therein. When determining that the received video includes the encoded image inserted, the signal determining unit 230 outputs the received video to the signal demodulating unit 240 and instructs the imaging unit 210 to stop the imaging operation. On the other hand, when the signal determining unit 230 determines that the received signal does not include the encoded image inserted, the imaging unit 210 further repeats the sequential exposure while writing data of the captured image over the data stored in the buffer. Here, the signal determining unit 230 does nothing. In the case where the determination that video including the encoded image inserted is input is not made even after the imaging operation for a predetermined period of time, the imaging unit 210 stops the imaging operation. It is to be noted that the signal determining unit 230 may return a signal indicating an error in this case.

The signal demodulating unit 240 retrieves the encoded image from the video provided by the signal determining unit 230 and demodulates the encoded image into an original visible light communication signal. Specifically, the signal demodulating unit 240 decodes the binary data and stores the resultant data into a memory as the visible light communication signal.

Next, the encoded image obtained by forming the visible light communication signal into an image is described.

Figure 4:
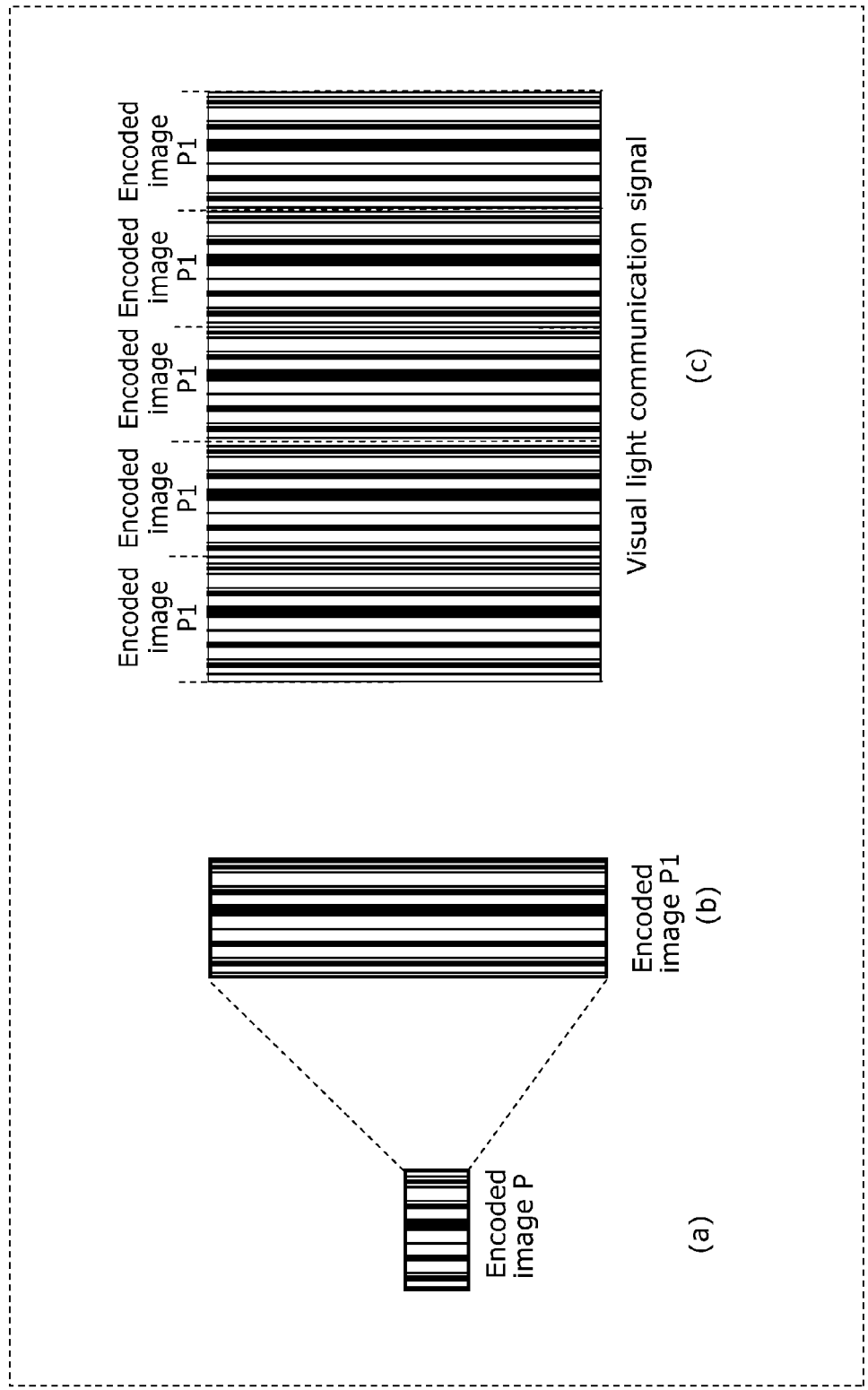
FIG. 4 schematically illustrates an example of an encoded image of a visible light communication signal according to Embodiment 1.

FIG. 4 illustrates an example of the encoded image. FIG. 4 illustrates, in (a), an encoded image P obtained by encoding the visible light communication signal in one block. The visible light communication signal is represented by way of displaying brightness and darkness in the horizontal direction. The encoded image P in (a) of FIG. 4 is vertically extended, as in (b) of FIG. 4, to the vicinity of both ends of the screen, resulting in an encoded image P1. Subsequently, as illustrated in (c) of FIG. 4, the encoded image P1 in (b) of FIG. 4 is repeatedly placed five times in the horizontal direction, resulting in a final encoded image (the visible light communication image). Here, the number of repetitions in the horizontal direction is determined according to the size of the encoded image in one block and the size of the video.

It is to be noted that the encoded image in one block is extended in order to allow the encoded image to be captured with a large number of exposure lines as will be described later. By doing so, it is possible to improve the reception probability. Furthermore, the reason for the encoded image in one block being repeatedly displayed is to cope with different fields of view which depend on a distance between the display apparatus and the reception device and performance of the imaging unit in the reception device. This means that even if the reception device is not capable of capturing the image of an entirety of the display unit 110, it is possible to obtain the encoded image P1 illustrated in (a) of FIG. 4 by capturing only a part of the encoded image displayed on the display unit 110. Generating the encoded image this way will enable to ease the restrictions in the imaging conditions of the reception device. A larger number of repetitions of the encoded image is more effective to a short-distance imaging operation. Furthermore, assuming that the reception device is capable of capturing the image of the entire screen, there is not always a need to repeat the encoded image.

Figure 5:
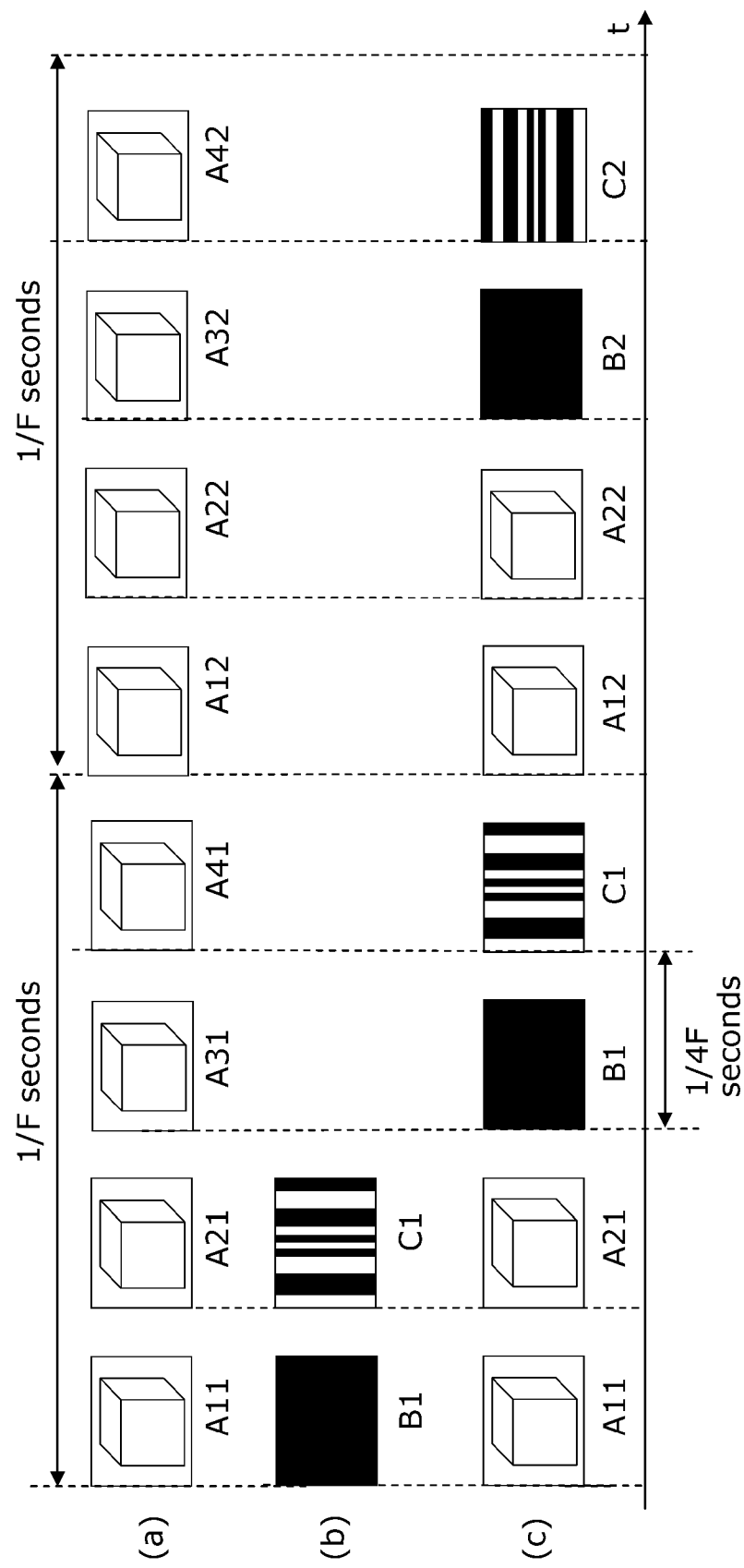
FIG. 5 explains an example in which the encoded image of the visible light communication signal is displayed after inserted into normal video in the display apparatus according to Embodiment 1.

An operation of a visible light communication system according to Embodiment 1 is specifically described below. Firstly, an operation of the display apparatus 100 is described. FIG. 5 explains the operation of the display apparatus according to Embodiment 1. In FIG. 5, the horizontal direction is a time axis.

FIG. 5 illustrates, in (a), images which are output from the first signal processing unit 130; in (b), images which are output from the second signal processing unit 160; and, in (c), images which are output from the display control unit 140.

Firstly, as illustrated in (a) of FIG. 5, four images are output from the first signal processing unit 130 in 1/F seconds. This indicates that the video received by the first input unit 120 is made up of four images per 1/F seconds when displayed. The first signal processing unit 130 transmits, to the display control unit 140, display timing information indicating timings at which four images are displayed in 1/F seconds. Furthermore, the first signal processing unit 130 outputs four images (images A11, A21, A31, A41, etc.) to the display control unit 140 per 1/F seconds. Furthermore, the first signal processing unit 130 transmits, to the second signal processing unit 160, the same display timing information as the display timing information transmitted to the display control unit 140.

Next, as illustrated in (b) of FIG. 5, the second signal processing unit 160 outputs, to the display control unit 140, an all-black image B1 held in advance and an encoded image C1 generated from the visible light communication signal and received from the second input unit 150. In this case, the second signal processing unit 160 determines the images A1x, A2x, A3x, and A4x, as images into which the encoded image is to be inserted, based on brightness, etc., of the images (where x represents the ordinal number of a frame). Furthermore, the second signal processing unit 160 determines that four images are to be displayed in 1/F seconds, as well as insertion of an all-black image Bx as the third image and an encoded image Cx as the fourth image. The second signal processing unit 160 outputs information on the determined display to the display control unit 140 as the display timing information.

Next, as illustrated in FIG. 5, the display control unit 140 determines, according to the received display timing information, timings of displaying the image A received from the first signal processing unit 130, and the all-black image Bx and the encoded image Cx received from the second signal processing unit 160. In this case, the display control unit 140 controls the display unit 110 so that four images are displayed in 1/F seconds. The display control unit 140 controls the display unit 110 so that among the four images, images A11 and A21 transmitted from the first signal processing unit 130 are displayed as the first and second images, the all-black image B1 transmitted from the second signal processing unit 160 is displayed as the third image, and the encoded image C1 transmitted from the second signal processing unit 160 is displayed as the fourth image.

Furthermore, the display control unit 140 performs such control that four images are displayed in next 1/F seconds. In this case, the display control unit 140 controls the display unit 110 so that among the four images, images A12 and A22 are displayed as the first and second images, an all-black image B2 is displayed as the third image, and an encoded image C2 is displayed as the fourth image. In the example of FIG. 5, the encoded image C2 is inserted which is formed by rotating the encoded image C1 in the fourth place 90 degrees and shaping the resultant into the same size as the encoded image C1. In short, upon inserting the encoded image multiple times, the same encoded image may be inserted multiple times, and an image resulting from reversing or rotating the original encoded image may be inserted. This is effective in the adjustment according to the direction, the angle, and the like of the reception device 200 capturing the images. In other words, the image B1 and the image B2 may be the same or different as mentioned above. Likewise, the image C1 and the image C2 may be the same or different.

Furthermore, the images A1x, A2x, A3x, and A4x are displayed at the interval of 1/F seconds, and so are the all-black images Bx and the encoded images Cx.

It is to be noted that depending on video, the encoded image may be displayed once every a certain number of frames or displayed at random, instead of being displayed in sequential frames.

It is to be noted that the sub-frame in this embodiment is not limited to the sub-frame created for tone representation and may also be a sub-frame created for enhancement in image quality, such as what is called quad drive of a liquid-crystal display apparatus, etc.

Figure 6:
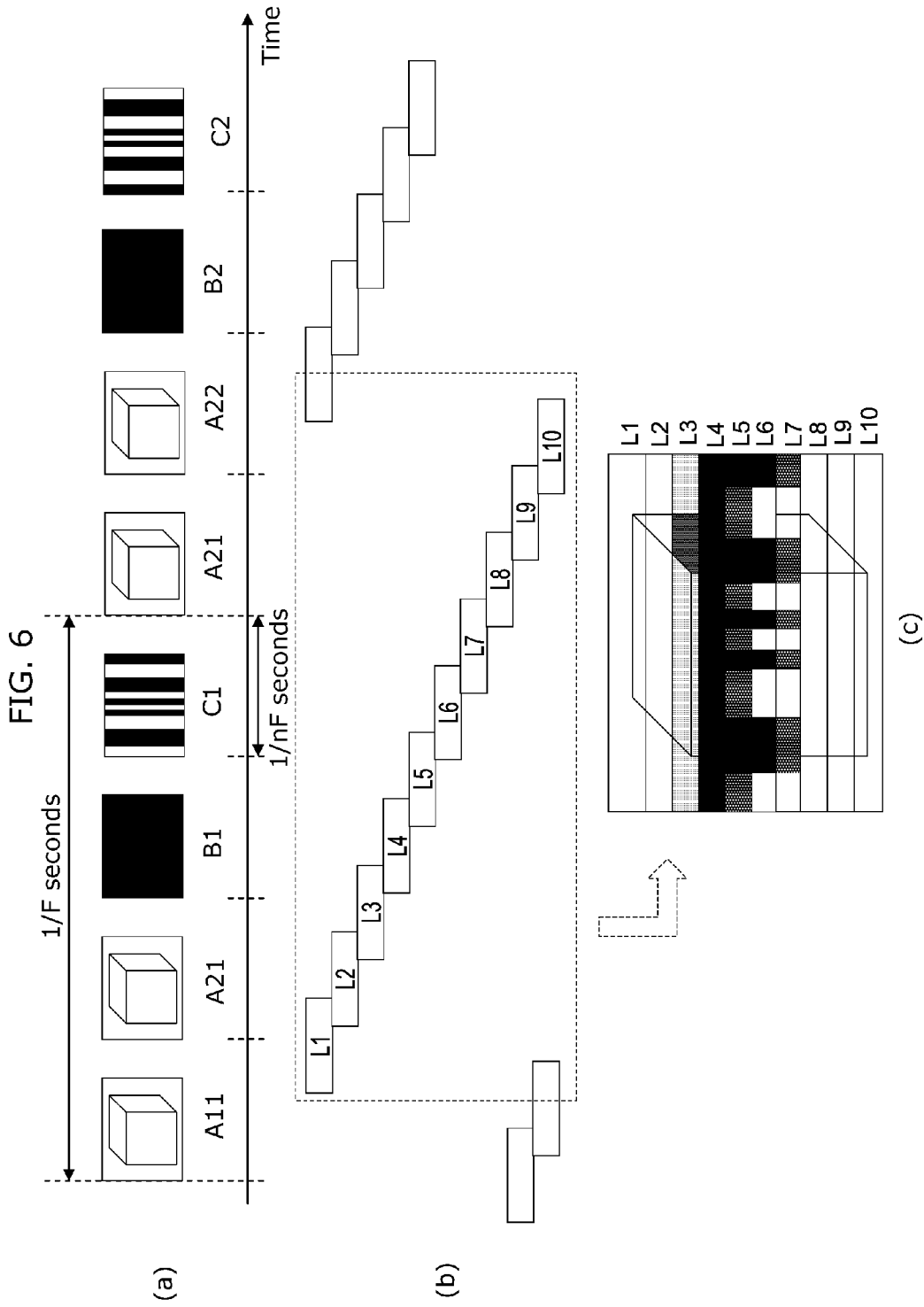
FIG. 6 illustrates an operation of a reception device according to Embodiment 1.

Next, an operation of the reception device 200 is described. FIG. 6 explains the operation of the reception device according to Embodiment 1. In FIG. 6, the horizontal direction is a time axis.

FIG. 6 illustrates, in (a), images which are displayed on the display unit 110 of the display apparatus 100; in (b), exposure time of each exposure line in the imaging unit 210; and, in (c), an image captured by the imaging unit 210.

As illustrated in (a) of FIG. 6, four images are displayed on the display unit 110 every 1/F seconds. In the example of (a) of FIG. 6, the all-black image B1 is displayed as the third image, and the encoded image C1 is displayed as the fourth image, among the four images.

The imaging unit 210 captures video displayed on the display unit 110. In the case where the imaging unit 210 includes an image sensor of the sequential exposure type, the image sensor performs the sequential exposure per unit row and stores data of the captured video into a buffer (not illustrated) following the start of capturing video. A unit of the sequential exposure is referred to as an exposure line because sequential per-line exposure is particularly assumed herein.

In the case of (b) of FIG. 6, the exposure is performed in the sequence of the exposure lines L1, L2, L3, . . . .

It is to be noted that although the image is divided into 10 exposure lines in (b) of FIG. 6 as an example, the number of exposure lines may be other than 10, and the unit of division may be other than lines. The configuration is such that each of the exposure lines overlaps another for a very short length of time, and the exposure is performed with the exposure lines in sequence.

FIG. 6 illustrates, in (c), the image stored in the buffer at the point in time when the imaging with the whole exposure lines is completed. In this case, the beginning of an image in a frame coincides with the beginning of one unit of the imaging, but even when these are different, horizontal stripes are always observed. For example, signals are represented in narrow horizontal stripes from the third line from the top in the captured image in (c) of FIG. 6; when there is such a difference, the horizontal stripes will be found at vertically different positions in the image. Therefore, there is no particular need for timing control, resulting in the reception device not being required to obtain any trigger signal from somewhere. In the case of (c) of FIG. 6, the encoded image is captured with the exposure line L6.

The visualizing unit 220 transforms the data of an image captured by the imaging unit 210 and stored in the buffer, into a bit map in which luminance of each pixel is represented two-dimensionally, and outputs the bit map to the signal determining unit 230 as video.

The signal determining unit 230 determines whether or not the video received from the visualizing unit 220 includes the encoded image. In the case of FIG. 6, the signal determining unit 230 receives the video in (c) of FIG. 6 and determines that the encoded image has been inserted into the exposure line L6 among the exposure lines L1 to L10, outputs the received video to the signal demodulating unit 240, and instructs the imaging unit 210 to stop the imaging operation.

The signal demodulating unit 240 retrieves, from the video provided by the signal determining unit 230, an image in the exposure line L6 which indicates the encoded image, and decodes the image in the exposure line L6 into an original visible light communication signal.

It is to be noted that these determinations by the signal determining unit 230 are performed in units of received video here, but may be performed per exposure line. In this case, at the point in time of determining that the exposure line L6 includes the encoded image, the signal determining unit 230 may cause the imaging unit 210 to stop its operation, avoiding determination on the exposure line L7 and the following exposure lines.

As illustrated in FIG. 6A, video is made up of F frames per second, and the period in which the encoded image is displayed is part of the length of one frame. The case where this period is ¼ of one frame has been described in the present embodiment. It is to be noted that the display time in which the encoded image is displayed may be other than the ¼ frame, but is desirably ¼ frame or less from the perspective of making it as difficult as possible to recognize the encoded image. Furthermore, this display time is desirably as small in value within the applicable range of the reception device as possible.

With the configuration as above, the display apparatus inserts the encoded image of the visible light communication signal into video for a short period of time. The reception device sets the exposure time to a sufficiently short length to enable capturing of the encoded image. Referring to FIG. 6, when the shutter speed (the exposure time) is sufficiently faster than 1/nF seconds (where n=4 in the case of FIG. 6), any of the exposure lines will correspond to the time in which the encoded image is displayed. Furthermore, it is desired that other images be not inserted during the exposure time of an exposure line. Thus, setting the exposure time less than half the ¼F seconds in the example of FIG. 6 makes it possible to capture images into which other images are never inserted.

As above, the use of the reception device which includes the imaging unit of the sequential exposure type results in no restrictions on the imaging timing. This makes it possible to transmit and receive the visible light signal with a configuration which is simple.

In addition, the relation of (Expression 1) is desirably satisfied regarding the time in which the encoded image is inserted and the scanning speed and exposure time of the imaging unit of the sequential exposure type. This is because the S/N ratio will be extremely decreased when the encoded image is subjected to the exposure together with video before and after the encoded image.

$$\text{Exposure time of 1 exposure line} < 1/(2 \times nF) \quad \text{(Expression 1)}$$

In (Expression 1), n is the number of sub-frames obtained by equally dividing one frame of video, and F is the number of frames which are displayed in one second. Both n and F are positive integers.

Furthermore, considering the length of time in which the encoded image of the visible light communication signal is less likely to be recognized by human eyes as an afterimage, the exposure time of one exposure line is desirably 1 millisecond or less, more desirably 0.2 milliseconds or less. When the common number of frames in video signals at present, F=60, is applied, n>8 is desirable and n>40 is more desirable to satisfy (Expression 1).

The following describes the reason for setting the range desirable as the time in which the encoded image of the visible light communication signal is displayed. This is because the temporal resolution of human eyes is generally said to be approximately 50 milliseconds in terms of time, and an image below this level will be recognized as an afterimage in which the image is mixed up with preceding or succeeding video. Meanwhile, the limit of human eye to notice a difference in luminance varies from person to person, but it is said that most people recognize that there is a difference in luminance when the difference in luminance from adjacent regions is roughly 2%. Accordingly, in order that the inserted encoded image is mixed up with the preceding or succeeding image and not recognized as a difference in luminance, the duration for which the encoded image is displayed is desired to be 2% of 50 milliseconds, that is, less than or equal to 1 millisecond.

Inserting the visible light communication signals to images creates a chromatic difference. It is generally known that a difference between adjacent regions which is recognizable by human eyes is 0.3 in numerical value in chromaticity coordinates. A common video display apparatus represents colors using combinations of three colors of R, G, and B, and when the above is applied to the R, G, and B, the difference is equivalent to 20%. Thus, in order that the encoded image is not recognized as a chromatic difference by human eyes, the duration for which the encoded image is displayed is preferably 0.2 milliseconds or less which is determined by multiplication of the above value. Furthermore, with a common image sensor of the sequential exposure type, an afterimage is left completely as an image unless one frame is divided into two sections in consideration of versatility. Since the use of one frame as it is creates concerns for an adverse effect such as the problem of subliminal stimuli, the required minimum number of frames is determined where n=2. This means that, as a specific numerical value, it is desirable to select a shutter speed (exposure time) lower than 1/480.

Furthermore, a specific approach for outputting the encoded image of the visible light communication signal for a very short period of time from a video device is described. A device which operates fast, such as a plasma display (PDP) and an electroluminescence (EL), is capable of supporting this technique by being controlled with a drive signal. On the other hand, a liquid-crystal display (LCD) or the like is not capable of supporting it, even when only the speed of drive signals is increased, since the response speed of the LCD is slow. However, in the case where an element in which a light-emitting diode (LED) or the like can flicker fast is used in the backlight, it is possible to display the encoded image for a short length of time by turning off the LED. As to a projector, a liquid crystal on silicon (LCOS) or the like which uses liquid crystals can likewise display the encoded image for a short length of time by controlling the light source. Furthermore, in the case of a projector which uses a method of emitting light to a projection object with use of a digital mirror device (DMD) or the like mirror device which is capable of being driven fast, it is possible to display the encoded image for a short length of time by controlling the DMD. It is also possible to shorten the display time through a control on the light source, meaning that these can be combined to further shorten the display time.

It is to be noted that although the case where the visible light communication signals are aligned in the horizontal direction is described in Embodiment 1, this is not the only example. In the case where the visible light communication signals are aligned in the horizontal direction, the encoded image has vertical stripes. Therefore, unless the imaging unit 210 of the reception device 200 captures images through the sequential exposure in the vertical direction on a per horizontal direction basis, it is not possible to obtain the encoded image of the visible light communication signals.

Furthermore, capturing an image with the reception device tilted at an angle of a certain degree or more results in one group of data, i.e., one block, being not entirely included in the imaging range or results in the orientation being parallel to the stripes of the stripe pattern, which cause a problem that the data cannot be obtained, for example.

Figure 7:
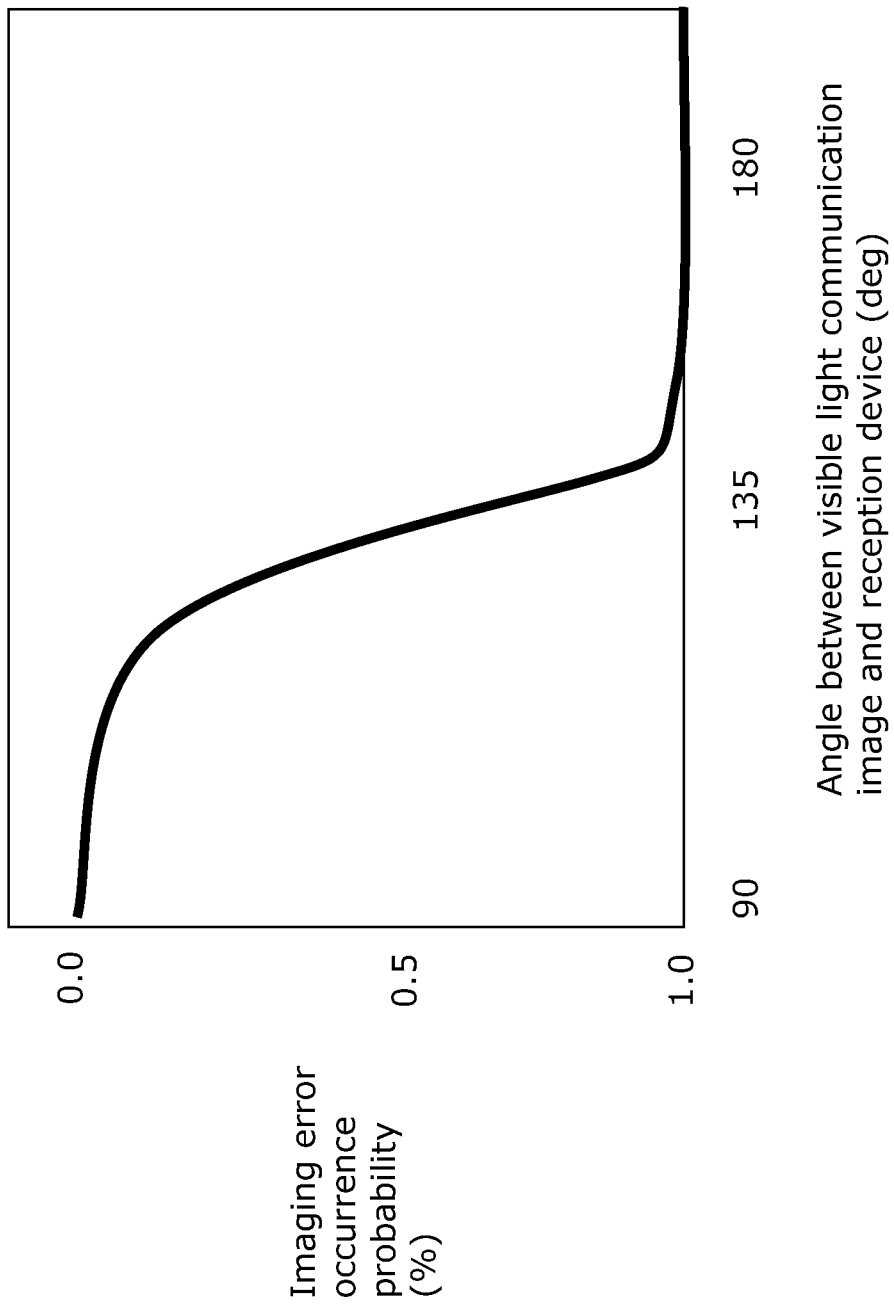
FIG. 7 illustrates an example of a relation of an angle between the encoded image and the reception device with an imaging error occurrence probability according to Embodiment 1.

FIG. 7 illustrates an example of a relation of an angle between the encoded image and the reception device with a reception error occurrence probability.

As illustrated in FIG. 7, the relation of the stripe pattern of the encoded image, the angle of the reception device, and the reception error (imaging error) occurrence probability represents the form of substantially the cosine law. The field of view obtained with one exposure line of the reception device changes according to the cosine law as the angle changes. Accordingly, the range of data of an image that can be captured becomes smaller, and when the range of data of an image that can be captured with one exposure line decreases in size to the area substantially equivalent to that of one block, the error recognition probability increases abruptly.

FIG. 7 illustrates a result of when the encoded image which has data of 4 blocks stored for the entire screen is used and the reception device captures the encoded image from such a position that the reception device can capture substantially the entire screen. As illustrated in FIG. 7, it can be seen that, with an angle up to approximately 135 degrees (in the case where the reception device is tilted at 45 degrees upon capturing the image), it is possible to obtain data without problems. The angle from which the error occurrence probability changes abruptly depends on how many blocks of data are stored for the entire screen or at what distance the encoded image is captured, that is, from which position the encoded image is captured, meaning what size the encoded image appears to have on the entire screen. Furthermore, since it will also be theoretically impossible to obtain data when the screen and the reception device are perpendicular to each other, it is conceivable that, depending on in which orientation (vertically or horizontally) a viewer places the reception device, there will be a situation in which the visible light communication signal is unable to be received at all. To solve such troubles, the encoded images may be arranged vertically or obliquely or with a pattern in which a vertical portion and a horizontal portion are reversed.

Figure 8:
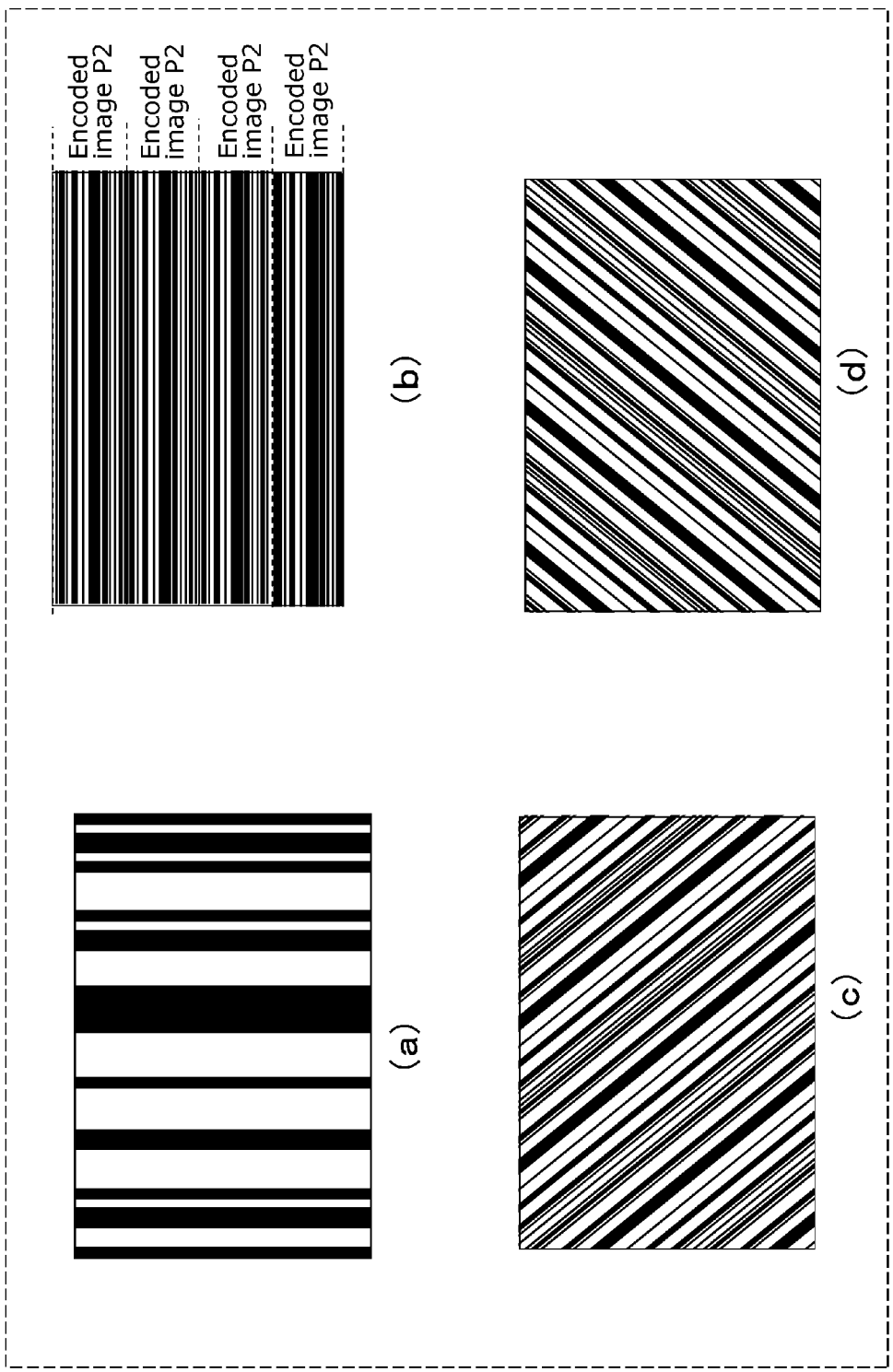
FIG. 8 illustrates other generation examples of the encoded image according to Embodiment 1.

FIG. 8 illustrates, in (a), an example in which only one encoded image illustrated in FIG. 4 is displayed on the entire screen. With such a design, the restrictions based on the size of the encoded image in the captured images will be eased, so that the visible light communication signal can be received from a location far from the display surface of the display unit 110. FIG. 8 illustrates, in (b), an image in which the encoded image P2 has horizontal stripes and is repeatedly vertically displayed four times. In this case, the reception is possible when the exposure lines of the reception device are in a substantially vertical direction. FIG. 8 illustrates, in (c), an example of the encoded image which has stripes obliquely aligned at approximately 45 degrees on the entire screen. FIG. 8 illustrates, in (d), an example of the encoded image which has stripes obliquely aligned at approximately 45 degrees on the entire screen in the opposite direction to those in (c).

Furthermore, each of the images illustrated in FIG. 4 and FIG. 8 or an image resulting from rotating each of these images certain degrees has advantages and disadvantages; therefore, an image may be used in which such images are arbitrarily rotated and combined according to application.

Moreover, in the case of being temporally repeatedly displayed, these images may be changed sequentially or at random on a per frame basis according to application.

It is to be noted that with a display apparatus in which a period during which not the entire screen is displayed at the same time is present, such as a liquid-crystal display apparatus which performs backlight scanning, the communication probability can be expected to improve with the use of a stripe pattern having vertical stripes. On the other hand, in a common liquid-crystal display apparatus, since the scanning is performed in the vertical direction, it is desirable to apply horizontal stripes, that is, (b) of FIG. 4.

Furthermore, the luminance level of the all-black image that is an image whose overall luminance level is low does not need to match that of a black part in the encoded image, that is, the luminance of a part with low luminance. However, in consideration of sensitivity for receiving the visible light communication signal, the luminance of the all-black image is desirably as low as possible.

As a result of inserting (a) and (b) of FIG. 9 in a predetermined period, an image of a single color having average luminance is recognized as in (c) of FIG. 9. Therefore, the above two black-white reversed images may be used as one set for two respective sections obtained by dividing the subframe or time section which is included in one frame and in which the encoded image is displayed. Furthermore, a combination of colors may be used which have a complementary relationship with each other, such as red (R) and cyan (C) in the system of three primary colors, i.e., R, G, and B. In other words, two colors having a complementary relationship may be used as a combination of reversed images as in the case of black and white.

In this embodiment, the visible light communication signal is encoded and then output as image data; in order to clearly show the boundaries of blocks in the data, a frame-like image signal, which is never included in a normal encoded signal, may be inserted before or after signals of the block. In this case, it may be that, when the reception device succeeds in recognizing two or more frame-like image signals, the reception device determines that signals of one block have been obtained, and uses such frame-like image signals to determine the size of signals of one block in an image.

FIG. 10 illustrates the relation between high frequency noise of light source luminance, such as surround lighting, and exposure time. The longer the exposure time relative to the cycle of high frequency noise, the lesser the impact of the high frequency noise on the captured image, which makes it easier to estimate the light source luminance. When the exposure time is an integral multiple of the cycle of high frequency noise, the impact of the high frequency noise is absent, which makes the reception of the visible light communication signal easiest. The main cause of the high frequency noise originates from a switching power circuit. Since the length of its cycle is 20 microseconds or less in many switching power supplies for lighting, setting the exposure time to 20μ seconds or more will make it possible to easily estimate the light source luminance.

It is to be noted that although the display which displays video, namely, the display apparatus 100, is given as an example in this embodiment, the display apparatus 100 may be a device which projects video, such as a projector. Furthermore, although a smartphone is given as an example of the reception device 200 that is an electronic device which receives the visible light communication signal, the reception device 200 is not limited to the smartphone and may be a digital still camera and the like as long as the reception device 200 is an electronic device which includes an image sensor of a type capable of sequential exposure.

Next, the tone representation in displayed video is described. This content is a matter of course for those skilled in the art and is, therefore, explained briefly. In PDPs, each frame is divided into weighted sub-fields so that combinations of lighting and non-lighting of the sub-fields represent tones. Some LCDs also divide each frame into weighted sub-fields as in the case of the PDPs, and some LCDs adjust the luminance of each color by simply controlling the length of time for which the shutter is open within each frame, and thereby represent tones. Many organic EL displays also use either one of the above driving methods.

Meanwhile, a projector using liquid crystals or a projector using LCOS uses the same or like tone representation method as the liquid-crystal display. On the other hand, a projector using DMD represents tones by adjusting, for each frame, the length of time for beams of light to be projected from the light source of each color toward the projection lens, using an element in which mirrors capable of rapidly switching the direction of light from the light source between the projection lens and the damper are two-dimensionally arrayed for the number of pixels. The DMD projector divides each frame into a larger number of time sections, converts the video signal into a control signal for DMD, and projects video through the projection lens.

Thus, recent video display apparatuses which display video signals control the light emission time of RGB or primary colors including other colors than RGB within each frame to display video. This means that it is not difficult in principle to insert an image in a time section no more than one frame.

Although the method of repeatedly displaying one image for a certain period of time has been described as the method of displaying the encoded image, an image with black and white reversed may be displayed continuously after the image example illustrated in FIG. 4 or FIG. 8. Here, since only an averaged image from two images is recognized by human eyes, the occurrence of recognition of stripe pattern is further reduced. In other words, a fully uniform image at the averaged gray level, obtained by synthesizing two images, is recognized by human eyes, which only leads to somewhat decreased contrast. The white and black representation is not limited to the 100% level and the 0% level and may be one level with relatively high luminance and one level with relatively low luminance. It is to be noted that when this difference in level is high, the restrictions on the reception device and so on are eased while the averaged luminance of signals is higher, which causes negative effects such as decreased contrast and increased conspicuity of the encoded image; therefore, it is desirable to select a level which is appropriate from a comprehensive perspective.

As to the white and black representation, the white may be represented by displaying all the RGB colors, but a color other than white may be used to lower the luminance of a high luminance portion of the stripes. It may likewise be that the black means low luminance and is, therefore, represented using all the RGB colors or is not black which represents the meaning of a non-display state. Moreover, although it has been assumed that the stripe pattern is created using a high luminance portion and a low luminance portion, this may be represented as a stripe pattern with R and G stripes or the like which shows a combination separable by color. However, in this case, a reception device mounted with an image sensor and software capable of RGB separation needs to be used at the time of capturing an image.

Furthermore, although the image sensor of the reception device needs to complete a series of signals in one image according to this embodiment, it may be possible that, when the amount of information is large, information is written in the header portion of the encoded signal as to, for example, whether or not the encoded signal is a signal obtained by dividing the information into a plurality of signals due to the amount being large and in which section the encoded signal is present out of a plurality of sections obtained by such dividing. As a specific example, it becomes possible to divide the above information into images by using the preamble and type of the standard JEITA-CP1222. It goes without saying that the method of the division, how to output the divided signals, and how to store such divided information into an image are not limited to this example. Furthermore, there is a method of repeatedly displaying the encoded image to transmit the visible light signal without fail, and in this method, it may be that one image resulting from the division, which is based on the visible light communication signal, is repeatedly displayed, and then, a succeeding image resulting from the division is repeatedly displayed. There is also a method of sequentially displaying images based on a series of signals resulting from the division, and repeatedly displaying these images as one set. Out of these methods, a method may be selected according to the size of the amount of information, the type of normal video signals, and so on.

Embodiment 2

As above, Embodiment 1 has been described as an example of the implementation in the present disclosure. However, without limitations to the above, the present disclosure is applicable to embodiments obtained through changes, replacement, addition, omission, etc., to the above embodiment as appropriate. Furthermore, it is possible to make a new embodiment by combining the structural elements described in the above Embodiment 1.

Thus, other embodiments are collectively described below.

In Embodiment 1, as an example of the encoded image which is displayed, an example has been described in which an encoded image is vertically extended and repeatedly positioned several times in the horizontal direction. However, the position example is not limited to this example.

FIG. 8 illustrates other generation examples of the encoded image.

FIG. 8 illustrates, in (a), an example in which the encoded image P in (a) of FIG. 4 is extended to the entire screen and displayed. With such a design, the restrictions based on the pixel size of the captured image will be eased, so that the reception from a location far from the display unit 110 becomes possible.

FIG. 8 illustrates, in (b), an image in which an encoded image P2 obtained by horizontally extending the encoded image P in (a) of FIG. 4 rotated 90 degrees is repeatedly displayed four times in the vertical direction. In this case, the signals can be received when the exposure lines of the reception device are in a substantially vertical direction.

FIG. 8 illustrates, in (c), an example of the encoded image which results from the encoded image P in (a) of FIG. 4 being tilted at approximately 45 degrees counterclockwise and extended to the entire screen. This figure illustrates, in (d), an example of the encoded image which results from the encoded image P being tilted at approximately 45 degrees clockwise.

The arrangements in (a) to (d) of FIG. 8 can be used as basic forms and combined together to provide various arrangements. Moreover, in the case where the encoded image is temporally repeatedly displayed, the displaying of the image may be changed in display sequence or at random according to application.

It is to be noted that with a display apparatus in which a period during which not the entire screen is displayed at the same time is present, such as a liquid-crystal display apparatus which performs backlight scanning, the communication probability can be expected to improve with the use of a stripe pattern having vertical stripes. On the other hand, in a common liquid-crystal display apparatus, since the scanning is performed in the vertical direction, it is desirable to apply an image having horizontal stripes as illustrated in (b) of FIG. 4. Furthermore, although four images are displayed for 1/F seconds and as the fourth image, the image obtained by encoding the visible light communication signal is displayed in Embodiment 1, this is not the only example. For example, it may be that the encoded image is displayed only for a corresponding period and an image from a normal video signal is displayed for the other periods. In this case, the video signal will change for the encoded image inserted, but this may be dealt with by correction of a signal of another part of the video signal within one frame.

It may also be that a signal processed in the normal video processing unit is transmitted as it is to the display control unit and thus displayed. Moreover, another applicable method is to ignore all the video signals in the corresponding one frame except the encoded image and display black or gray with a certain tone together with preceding or succeeding video, to emphasize only that signal to the reception device.

Furthermore, although an all-black image is displayed before the encoded image in Embodiment 1, this is not always necessary because this aims to avoid capturing the encoded image mixed with the image of the video signal. However, since the insertion of such an all-black image eases the restrictions on the performance of the reception device, an all-black image may be inserted in a certain period of time.

Furthermore, an all-black image is inserted only before the encoded image in Embodiment 1, but may be inserted after the all-black image. Moreover, an all-black image may be inserted both before and after the encoded image. In this case, time which also includes time for the all-black images on the preceding and succeeding positions replaces the above time in which the encoded image of the visible light communication signal is inserted.

Furthermore, the all-black image is not limited to an image whose overall luminance level is 0%. The luminance level of the all-black image is not limited to 0% as long as the luminance across the entire surface thereof is at a low level. Furthermore, its luminance level does not need to match that of a black part in the encoded image, that is, the luminance of a part with low luminance. However, in consideration of sensitivity for receiving the visible light communication signal, the luminance of an image whose overall luminance level is low is desirably as low as possible.

Furthermore, as to the encoded image, a method of repeatedly displaying one image for a certain period of time has been described, but the encoded image illustrated in (a) of FIG. 9 and the encoded image in (b) of FIG. 9 in which black and white in the encoded image in (a) of FIG. 9 are reversed may be displayed continuously as illustrated in FIG. 9. By doing so, only an averaged image from the two images will be recognized by human eyes as illustrated in (c) of FIG. 9, which further reduces the occurrence of recognition of stripe pattern and only leads to somewhat decreased contrast. The white and black representation is not limited to the 100% level and the 0% level and may be a level with relatively high luminance and a level with relatively low luminance. Furthermore, when the difference in luminance level is high, the restrictions on the reception device and so on are eased while the averaged luminance of signals is higher, which causes negative effects such as decreased contrast and increased conspicuity of the encoded image; therefore, it is desirable to select a level which is good from a comprehensive perspective. It may also be that a sub-frame or time section in which the encoded image is displayed within one frame is divided into two sections so that the above black-white reversed images are respectively displayed therein as two images in one set.

As to the white and black representation, the white may be represented by displaying all the RGB colors, but a color other than white may be used to lower the luminance of a high luminance portion of the stripes. It may likewise be that the black means low luminance and is, therefore, represented using all the RGB colors or is not black which represents the meaning of a non-display state. Moreover, although it has been assumed that the stripe pattern is created using a high luminance portion and a low luminance portion, this may be represented as a stripe pattern with R and G stripes or the like which shows a combination separable by color. Furthermore, a combination of colors which have a complementary relationship with each other, such as R and C, may be used. In other words, two colors having a complementary relationship may be used as a combination of reversed images as in the case of black and white. In this case, a reception device mounted with an image sensor and software capable of RGB separation needs to be used at the time of capturing an image.

In addition, when repeatedly displayed, the stripe pattern may be made less conspicuous by scrolling that is little-by-little movement on the screen, and the encoded image may be divided into two or more regions in each of which the scrolling is performed. In this case, the scrolling in two or more regions may be different in direction, speed, etc., and may be performed in synchronization with each other.

Furthermore, in Embodiment 1, the visible light communication signal is encoded and then output as image data; in order to clearly show the boundaries of blocks in the data, a frame-like image signal, which is never included in a normal encoded signal, may be inserted before or after signals of the block. In this case, it may be that, when the reception device succeeds in recognizing two or more frame-like image signals, the reception device determines that signals of one block have been obtained, and uses such frame-like image signals to determine the size of signals of one block in an image.

Furthermore, although the image sensor of the reception device needs to complete a series of signals in one image according to Embodiment 1, it may be possible that, when the amount of information is large, information is written in the header portion of the encoded signal as to, for example, whether or not the encoded signal is a signal obtained by dividing the information into a plurality of signals due to the amount being large and in which section the encoded signal is present out of a plurality of sections obtained by such dividing. As a specific example, it becomes possible to divide the above information into images by using the preamble and type of the standard JEITA-CP1222. It goes without saying that the method of the division, how to output the divided signals, and how to store such divided information into an image are not limited to this example. Furthermore, there is a method of repeatedly displaying the encoded image to transmit the visible light signal without fail, and in this method, it may be that one image resulting from the division, which is based on the visible light communication signal, is repeatedly displayed, and then, a succeeding image resulting from the division is repeatedly displayed. There is also a method of sequentially displaying images based on a series of signals resulting from the division, and repeatedly displaying these images as one set. Out of these methods, a method may be selected according to the size of the amount of information, the type of normal video signals, and so on.

Furthermore, the exposure time may be controlled in consideration of high frequency noise of light source luminance such as surround lighting.

FIG. 10 illustrates the relation between exposure time and high frequency noise of light source luminance, such as surround lighting, of when the cycle of high frequency noise is 20 microseconds. The longer the exposure time relative to the cycle of high frequency noise, the lesser the impact of the high frequency noise on the captured image, which makes it easier to estimate the light source luminance. When the exposure time is an integral multiple of the cycle of high frequency noise, the impact of the high frequency noise is absent, which makes the reception of the visible light communication signal easiest. The main cause of the high frequency noise originates from a switching power circuit, and since the length of its cycle is 20 microseconds or less in many switching power supplies for lighting, setting the exposure time to 20μ seconds or more will make it possible to easily estimate the light source luminance.

Furthermore, an embodiment may be possible in which the encoded image is embedded in part of the screen for normal video. In this case, only a limited part of the screen can be used to receive the visible light signal, which imposes restrictions on the relation between the reception device and the screen. On the other hand, this can be solved by displaying, in the video signal, an image for guiding the reception device to turn toward the limited part of the screen. Furthermore, although a method of inserting the encoded image with reduced conspicuity has been described in Embodiment 1, the measures devised to make the stripe pattern of the signals less conspicuous may be reduced because the region is limited here. Of course, the method which leads to reduced conspicuity may be preferentially adopted, which is, however, optional. Furthermore, it may be that the duration for which the encoded image is displayed is set to sequential durations or a relatively long length of time rather than the very short length of time (such as 1 millisecond or less, desirably 0.2 milliseconds or less) and the encoded image is received in the same or like manner as above. In this case, the reception error probability will decrease significantly, with the result that the restrictions such as repetitive transmission are eased.

It is to be noted that although the display which displays video, namely, the display apparatus 100, is given as an example in this embodiment, the display apparatus 100 may be a device which projects video, such as a projector.

Furthermore, in the case where the encoded image is recognizable by human eyes such as a case where the frame in which the encoded image is displayed is sequential or a relatively long length of time, the imaging unit included in the reception device may be an image sensor, such as CCD, and does not need to be the image sensor of the sequential exposure type.

(Encoding Example with Increased Signal Amount for Common Display Apparatuses)

The foregoing describes the methods of outputting the encoded image, in which the encoded signal alone is output and displayed, a combination of brightness-darkness reversed images of the encoded image is output and displayed, and the encoded image is divided before being output and displayed. Here, the display apparatus divides an original encoded image into images on the basis of each line in the bright state and outputs the images, as well as setting timings at which the images are output. The reception device detects which part in a frame divided in time series the image is displayed, and uses the detection result in combination with original signals to increase the amount of signals to be transmitted.

Figure 11A:
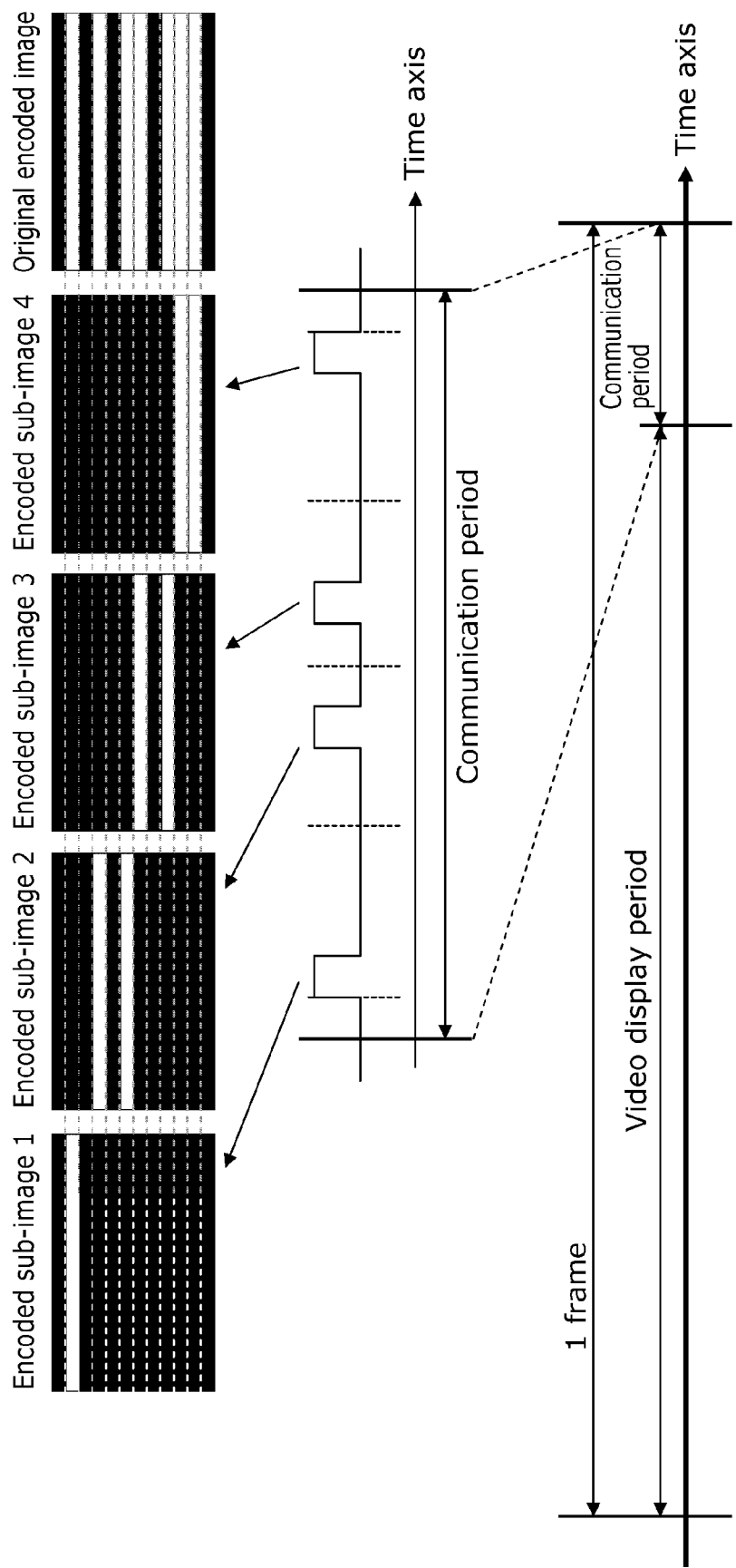
FIG. 11A schematically illustrates a transmitting method according to Embodiment 2 in which the encoded image is divided and signals are transmitted according to a lighting timing.

FIG. 11A schematically illustrates an example of such operation. The rightmost image is the original encoded image, which is divided by the display apparatus into, for example, four encoded sub-images. In this example, the encoded image has 12 vertically-stacked bright and dark horizontal lines. Encoded sub-images 1 to 4 each includes a different region of three lines which corresponds to co-located respective three lines in the original encoded image. A bright part is bright and a dark part is dark in the region, and the remaining area is represented as dark lines. The encoded sub-images are displayed at timings indicated in the square wave along the time axis which is illustrated in the lower part of this figure. The time axis of the square wave is sectioned into four sections by vertical dashed lines; in each of these four sections, a corresponding one of the encoded sub-images is displayed.

Here, the number of sub-images is not limited to four and may be any number. For example, the encoded image may be divided into three encoded sub-images. In this case, each of the encoded sub-images includes four lines of the encoded image. Vertical lines indicating display timing frames define three sections (not illustrated).

Furthermore, each of the sections for displaying the encoded sub-images is divided into four sub-sections. For example, in the case of FIG. 11A, the first encoded sub-image 1, the next encoded sub-image 2, the encoded sub-image 3, and the last encoded sub-image 4 are displayed in, out of the four sub-sections, the first sub-section, the third sub-section, the second sub-section, and the fourth section, respectively. Thus, there are four patterns of the timing at which each of the encoded sub-images is lit up, that is, the first to fourth sub-sections. This means that this timing can be used as signals in two bits. Therefore, as compared to the case where the encoded image having 12 lines is simply output, the amount of signals can be increased by eight bits in total for the four encoded sub-images.

It goes without saying that the amount of signals can be increased further when the number of encoded sub-images is increased or the number of patterns of the timing at which each of the encoded sub-images is displayed is increased (there are four sub-sections in the case of FIG. 11A). On the other hand, an increase in the number of encoded sub-images or the number of display timing patterns leads to a shorter duration for which the encoded sub-image is displayed, with the result that the reception device is subject to more severe restrictions.

Figure 11B:
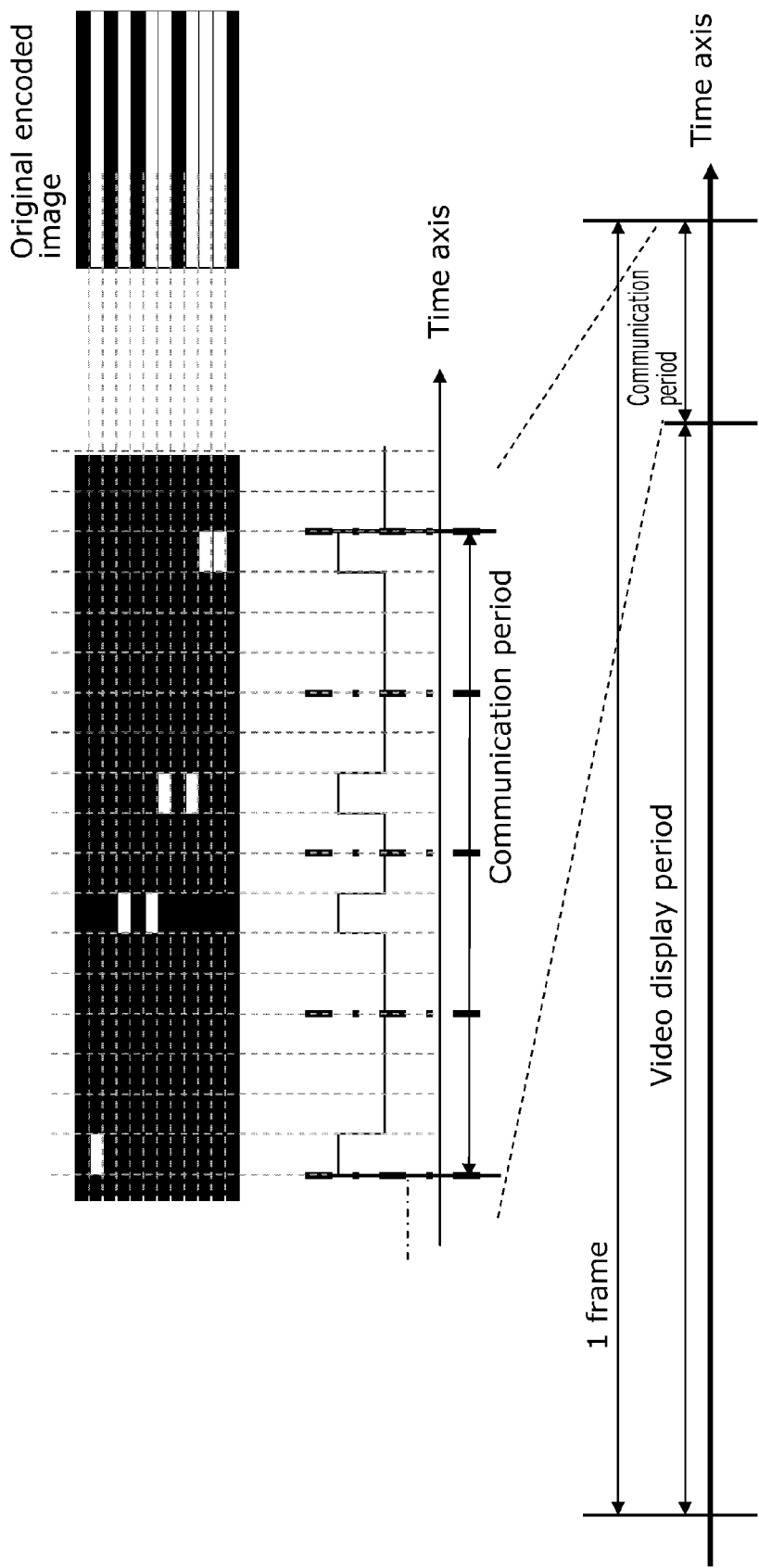
FIG. 11B schematically illustrates a transmitting method according to Embodiment 2 in which the encoded image is divided and signals are transmitted according to a lighting timing.

FIG. 11B virtually illustrates the case where the encoded image displayed in the above method is captured. Here, since the direction of time axis for the sequential exposure is the horizontal direction, horizontally striped images are obtained sequentially in the vertical direction. Since an increase in the number of encoded sub-images in the time direction leads to a narrower horizontal width of the captured image in FIG. 11B, the imaging unit is required to be capable of detecting this part. Furthermore, the luminous part reduced in area leads to a lower threshold value beyond which a part is determined to be the bright part during image processing, resulting in higher susceptibility to noise.

In order to receive signals from sub-images each of which is luminous for a short length of time determined by dividing each time section into a large number of sub-sections, the reception device needs a high response speed. Furthermore, in order to determine brightness and darkness from short-term light emission or image projection captured, a difference in luminance that allows the bright and dark lines to be distinguished from each other is necessary. In particular, when external light comes in, a decrease in the S/N ratio depending on an environment such as brightness gives a significant impact on bright part discrimination, which makes it hard to extremely increase the number of encoded sub-images. Ultimately, the requirements on the reception device are about up to which length one pulse width of the square wave can be shortened without causing problems, rather than what combinations should be set including the number of encoded sub-images. For example, when the frequency in JEITA CP-1222, i.e., 9.6 kHz, is applied, approximately 10 kHz, that is, a pulse width around 100μ seconds, can lead to problem-free signal reception. Moreover, depending on an environment, even when the pulse width is shortened to a level of around a few times as much as the above, specifically, four times, i.e., 38.4 kHz or around 25μ seconds corresponding to a frequency of around 40 kHz, the signals can be received.

Furthermore, the encoded image is mixed into video when output. This means that the longer the period allocated for outputting of the encoded image is, the lower the luminance ratio of the video signals to the whole is, resulting in video signals having reduced contrast. At the point where the period in which the encoded image can be inserted in one frame reaches around 10% of the whole, the contrast of the video signals decreases abruptly. Therefore, for normal video signals of 60 frames per second, the limit of the duration that the encoded image is displayed is 10% of 16.6 milliseconds, that is, around 1.66 milliseconds, and the duration is desirably no more than half of the limit, that is, around 0.833 milliseconds.

Furthermore, for example, in the case where the encoded sub-images happen to be displayed continuously, that is, in the case where a certain encoded sub-image is displayed in the last sub-section and the next encoded sub-image is displayed in the first sub-section, the encoded images are output continuously. In this case, an all-dark period may be provided between two encoded sub-images. To generalize and apply this method, the all-dark period may be provided between every sub-section in which the encoded sub-image is displayed and the next sub-section.

Although the original encoded image is divided into four sub-images here, it may be that the original encoded image is divided into two encoded sub-images from which two brightness-darkness reversed images are created so that the two encoded sub-images and the two brightness-darkness reversed images, that is, four images in total, are displayed likewise at corresponding timings.

Furthermore, although four encoded sub-images are displayed in the sequence of division from the top in FIG. 11A, the display sequence may be different. There are $_4P_4=24$ combinations of four different images to be arranged in sequence. Accordingly, the use of this sequence as a signal allows 24 times more kinds of signal to be transmitted, resulting in that the amount of signals can be expected to increase by about a little more than four bits.

Although the display timing is changed here to increase the amount of signals, it may be that with the timing fixed, only the sequence in which the four encoded sub-images are output is used to increase the amount of signals.

Figure 12:
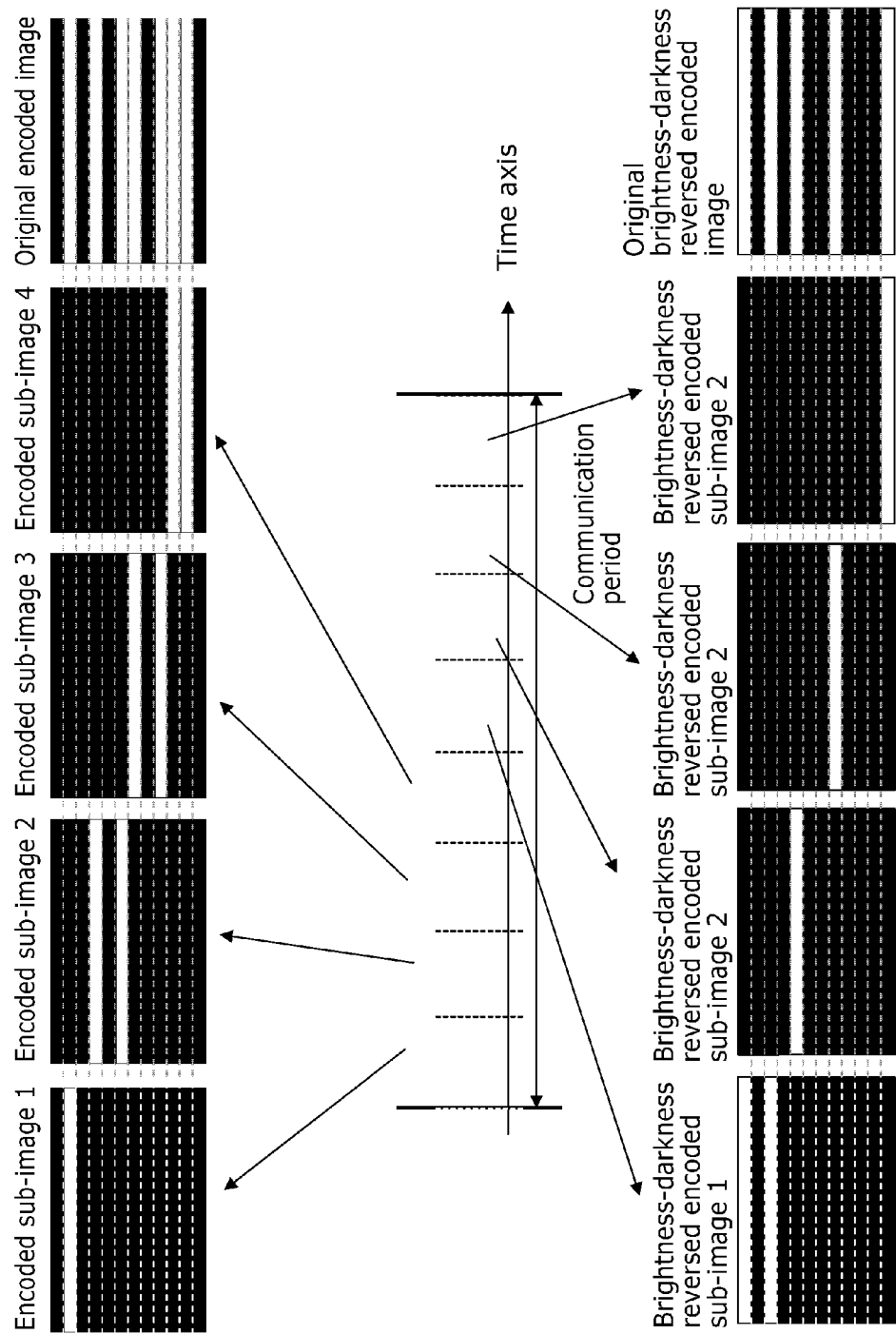
FIG. 12 schematically illustrates a transmitting method according to Embodiment 2 in which the encoded image is divided and signals are transmitted according to a sequence in which sub-images resulting from the division are displayed.

FIG. 12 schematically illustrates another example of the dividing method. The reversed images (brightness-darkness reversed encoded sub-images) illustrated in FIG. 12 each have only its target sub-region reversed in brightness and darkness and the remaining region at a dark level. For example, in the example of FIG. 12, a reversed image 1 has three rows from the top as a target and thus the fourth and following rows displayed in a dark tone, that is, has only the first and third rows displayed in a bright tone. This means that the encoded sub-image and the brightness-darkness reversed encoded sub-image are not precisely reversed in brightness and darkness across the entire regions. When the reversed images are thus created, an image obtained by adding up (calculating a logical sum of) the bright lines of the reversed images matches the reversed image of the original encoded image.

Next, a method of changing the sequence in which the encoded sub-images are output and using the sequence as a signal is described. For example, in the case where a normal encoded image and a reversed image thereof are each divided into four sub-images and eight fixed display timings are set, there are 24 combinations in normal phase and 24 combinations in reverse phase, that is, 576 combinations in total, of the eight images to be lit up in sequence. This means that an increase in signals by a little more than nine bits is possible. Moreover, when the sequence of the eight images may be determined arbitrarily, there are $_8P_8=40320$ combinations of the eight images in sequence, meaning that the amount of signals is expected to increase by about 12 bits. However, since there are cases where an original image and a reversed image thereof are indistinguishable depending on an encoding method, avoiding overlapping may significantly decrease the amount of signals. Without a change in timing, even dividing the communication period into eight sub-periods results in the display time being longer than that in the example of FIG. 11A, enabling a more efficient increase in the amount of signals.

Although the sequence adopted here is that the sub-images of the original encoded image are sequentially output first and the sub-images of the reversed image are sequentially output next, reversed images in pairs may be displayed at adjacent timings in the sequence like an encoded sub-image 1, a brightness-darkness reversed image thereof, an encoded sub-image 2, a brightness-darkness reversed image thereof, and so on. By doing so, it is possible to reduce the visibility of the encoded image. It is to be noted that when the above method is used, there are the above-described 24 combinations and corresponding combinations with the normal and reverse phases replaced, that is, 48 combinations in total, of the sub-images in sequence. This means that the increase in the amount of signals is about four and a half bits at most. Furthermore, although the sub-images may be continuous, an all-black image may be displayed between the sub-images. In other words, a period in which no signal is output may be provided.

(Encoding Example where Projector, Etc., is Applied)

Figure 13:
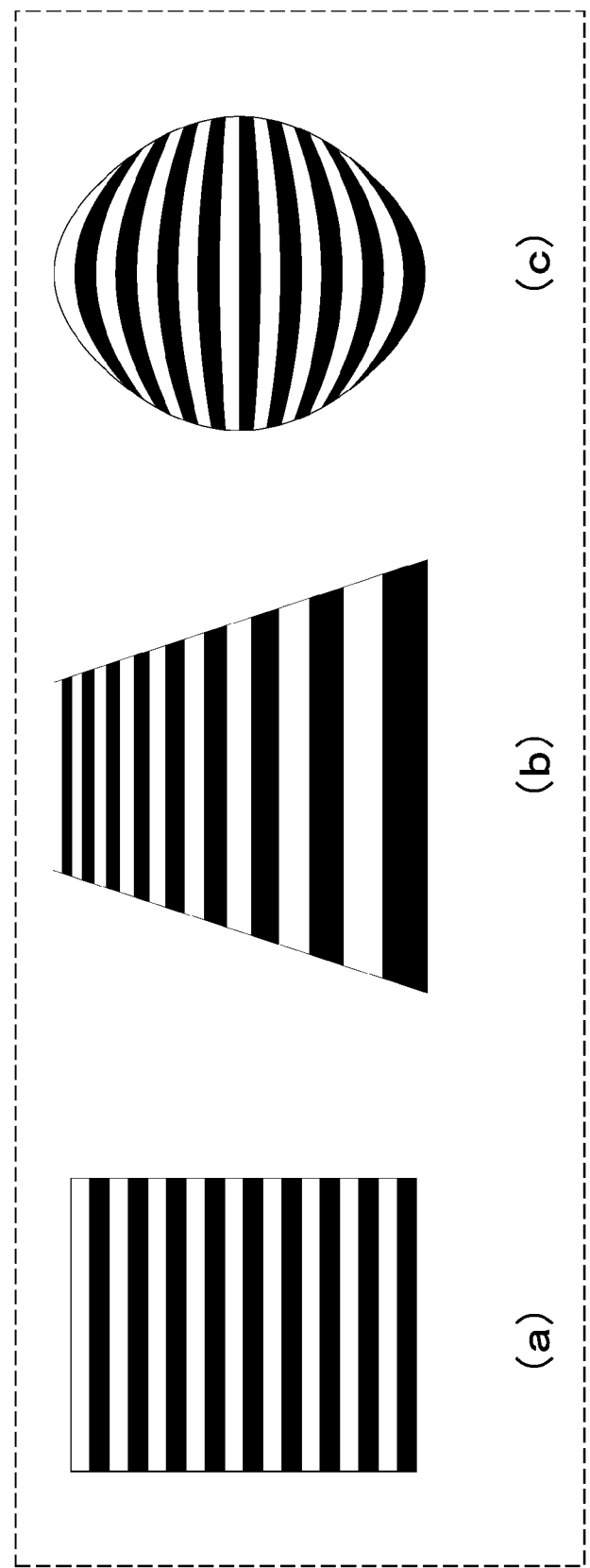
FIG. 13 virtually illustrates encoded images obtained in the case of being projected from the right front and in other projection cases according to Embodiment 2.

With a display apparatus which projects and thereby displays video, such as a projector, the width of one line that is the minimum unit indicating brightness and darkness of the encoded image may vary, for example, due to the shape of a display surface being not fixed and depending on its inclination, etc., according to an installation method or the like. FIG. 13 virtually illustrates (a) a normal case, (b) a case where the image is projected on a flat surface at an angle, and (c) a case where the image is projected on a curved surface. Thus, not only in the case where the display apparatus is installed at an angle, but also in the case where the projection object is curved or the like case, it is conceivable that the width of one line may be not always fixed and vary in the encoded image captured. An example of the encoding process in this case is described below with reference to FIG. 14.

The encoded image has a structure of eight vertically-stacked bright and dark lines which extend laterally, and each of the lines can independently represent brightness or darkness.

Firstly, since the width of one line is different depending on position, it is impossible to uniquely determine the width of one line from data of a captured image. Thus, it is necessary to indicate what width an area at each position in a projected image that corresponds to one line has in a captured image. Information indicating this position (width) of each line is used as a header. The header enclosed by a dashed line in FIG. 14 has a pattern in which brightness and darkness are alternately repeated on a per line basis. It is to be noted that the pattern may be opposite in brightness and darkness from the illustrated pattern.

Figure 14:
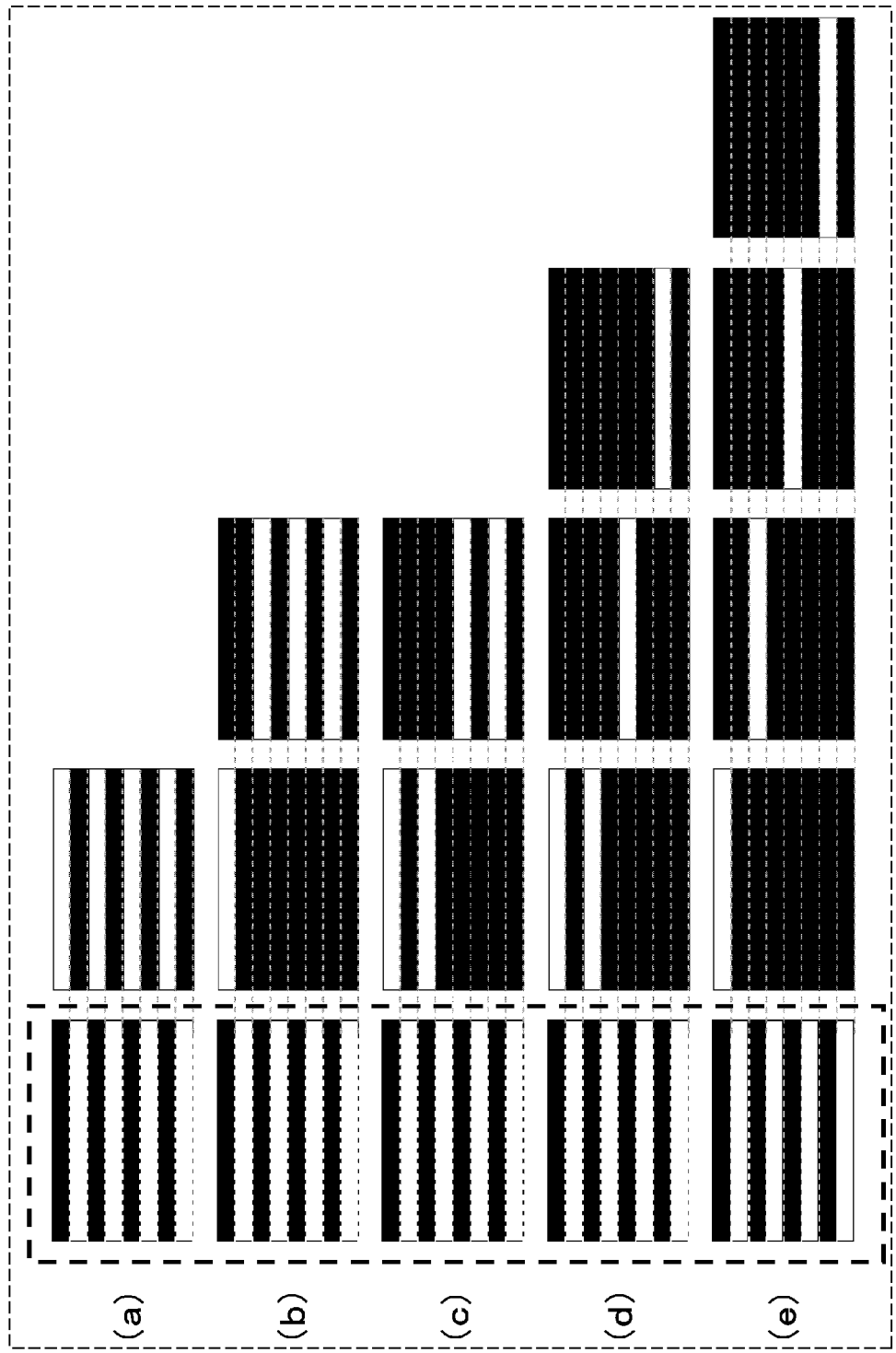
FIG. 14 schematically illustrates examples of image generation for transmitting signals using an encoded image to an object other than a normal screen according to Embodiment 2.

Furthermore, using the patterns for dividing the encoded image, the visible light communication signal is transmitted. For example, patterns as in (a) to (e) of FIG. 14 are used. The following describes the number of patterns to be used to create signals which are to be transmitted.

In (a) of FIG. 14, a brightness-darkness reversed image of the header is provided; as for this pattern, there is only one pattern. The case illustrated in (b) of FIG. 14 is that the image in (a) of FIG. 14 is divided to create a sub-image containing only one white line and a sub-image containing three white lines. In this case, there are four division patterns in which one white line is present in the first image and four division patterns in which one white line is present in the second image, that is, there are eight division patterns in total.

The case illustrated in (c) of FIG. 14 is that the image in (a) of FIG. 14 is divided into two sub-images each containing two white lines. In this case, there are combinations determined by selecting two out of four, that is, there are $_4C_2=6$ patterns. Furthermore, considering all the cases, once the first pattern is selected, the next pattern is only determined by the remaining two lines, meaning that the sequence is determined to be unique; therefore, there are six division patterns.

The case illustrated in (d) of FIG. 14 is that the image in (a) of FIG. 14 is divided to create a sub-image containing two white lines and two sub-images each containing one white line. In this case, when it is fixed that the first image contains two white lines, there are combinations determined by selecting two out of four, that is, there are $_4C_2=6$ patterns. Considering switching between the remaining two patterns, the combinations are doubled, and since the image containing two white lines can be positioned in the first, middle, and last places, that is, in three places, there are ultimately 6×2×3=36 division patterns.

The case illustrated in (e) of FIG. 14 is that the image in (a) of FIG. 14 is divided into four sub-images each containing one white line. In this case, the division pattern is a permutation determined by selecting four out of four, that is, there are $_4P_4=24$ patterns.

This is all the possible cases of the division; there are 75 patterns in total, which are significantly smaller than 128 patterns that are obtained as the amount of transmittable signals in the case where an image containing eight white lines is simply encoded using the 4 PPM or the like. However, considering this notion in combination with the above-described method of dividing the light emission timing into four timings, there are four times more combinations in (a) where the timing of lighting signal video is applied to one image, 16 times more combinations in (b) where the timing is applied to two images, 16 times more combinations in (c), 64 times more combinations in (d), and 256 times more combinations in (e). The sum of these patterns is 8676 patterns, which is less than 13 bits but enables transmission of 12 bits or more information.

It is to be noted that in the case of (a) of FIG. 14 where the image is completely opposite from the header, the signal recognition may be likely to be erroneous; therefore, this case is desirably avoided in the signal encoding process.

Figure 15:
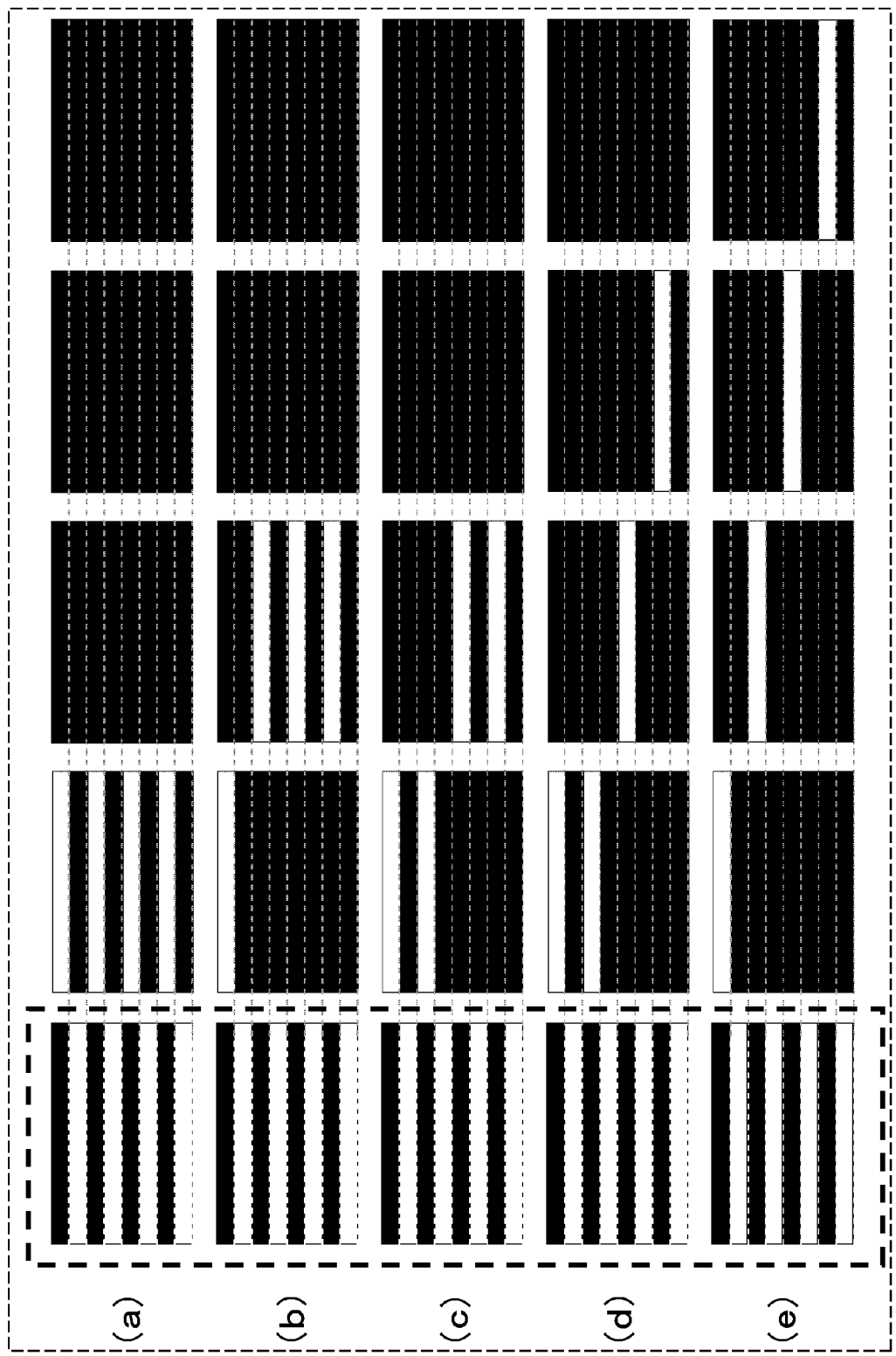
FIG. 15 schematically illustrates other examples of image generation for transmitting signals using an encoded image to an object other than a normal screen according to Embodiment 2.

As a more developed form, it may be that all-black representation is added to the combinations (a) to (e) of FIG. 14 so that time frames for which respective images are displayed are set to be always the same in number as illustrated in FIG. 15. In this case, the reception device distinguishes the type of signals included in each of the fixed time frames and decodes the signals according to their combinations.

In the case of (a) of FIG. 15, the signals are included in one image, and this one image is positioned in one of the four places. Therefore, there are $_4C_1=4$ division patterns. Assume that the display timing is divided into four timings as in FIG. 11A, then there are 16 output patterns.

Likewise, in the case of (b) of FIG. 15, there are $_4C_2=6$ patterns of where black is inserted because the combinations are determined by selecting two places out of the four places, for each of the eight patterns described with reference to FIG. 14. Therefore, there are 48 division patterns, and when the timing selection is added thereto, then there are 768 output patterns.

In the case of (c) of FIG. 15, there are $_4C_2=6$ patterns of where black is inserted because the combinations are determined by selecting two places out of the four places, for each of the six patterns described with reference to FIG. 14. Therefore, there are 36 division patterns, and when the timing selection is added thereto, then there are 576 output patterns.

In the case of (d) of FIG. 15, there are $_4C_1=4$ patterns of where black is inserted because the combinations are determined by selecting one place out of the four places, for each of the 36 patterns described with reference to FIG. 14. Therefore, there are 144 division patterns, and when the timing selection is added thereto, then there are 9216 output patterns.

In the case of (e) of FIG. 15, there is no change from the 24 division patterns described with reference to FIG. 14, and when the timing selection is added thereto, then there are 6144 output patterns.

The sum of all the patterns illustrated in FIG. 15 is 256 patterns, which correspond to the amount of information equivalent to eight bits. Furthermore, when the timing selection is added, then there are 16384 patterns, which are equivalent to 14 bits.

It is to be noted that (a) of FIG. 15 may be excluded because it increases the possibility of erroneous recognition against the header as described above. In this case, without the timing selection, there are 252 patterns, which are equivalent to a little less than eight bits. When the timing selection is added, then there are 16704 patterns, meaning that the amount of information is expected to increase by 14 bits.

It is to be noted that the header may be displayed in a communication period in the same frame as that for the encoded image, or may be displayed in another period. Here, the all-black image may be inserted before, after, or both before and after, the header.

Furthermore, as for the signals increased by the timing control, these may be used to simply increase the amount of information, or the same signals as the encoded signals may be output after encoded and be used for mutual check between these signals and the received signals. In this case, it is also possible to check almost all the signals.

It is to be noted that although the case where there are eight lines is described in this embodiment, an increase in the number of lines leads to an increase in the amount of signals. Also in this case, the same or like method can be applied in the calculation, which is therefore not described in detail here; in the case of 16 lines, there are 65536 patterns, which are equivalent to 16 bits, without the timing selection even when the encoded image is divided into four encoded sub-images. Furthermore, when the timing selection is added, then there are 3334800 patterns, which are equivalent to 21 bits. Thus, it is possible to transmit an amount of signals which substantially depends on the number of lines.

This is because, assume that m is the number of encoded sub-images in the horizontal direction (the time direction) and n is the number of bright lines in the vertical direction, m patterns can be set independently for each n, and all of these patterns are different, meaning that there are always patterns the number of which is m to the power of n without the timing selection. Here, all the patterns can be represented by n-digit number in the base-m system; therefore, in the encoding and decoding processes, it is only required that the n-digit number in the base-m system be converted into a binary number, meaning that these processes can be performed very easily.

Furthermore, although the image in the header contains the same number of bright lines as those in the signal image in the above explanation, providing an odd number of lines makes it possible to avoid the image in the header overlapping the signal image in the case where all the lines are concentrated in a single period of the time division. In addition, the reception device can find the header by just locating a different number of bright lines. Thus, the number of lines is desirably an odd number. Furthermore, considering the conversion into a binary number and so on, the number of bright lines in the signals is desirably an even number; therefore, the number of lines is desirably the number of lines represented by 4k+1 (where k is an integer of 1 or more).

On the other hand, since an increase in the number of encoded sub-images deteriorates the S/N ratio of the signals, and also considering an impact on the timing selection operation, the number of encoded sub-images is desirably set so that the period for which one image is output is approximately 50 to 100μ seconds or more. Furthermore, as to the proportion between the communication period and the video display period, a higher proportion of the communication period means a higher likeliness that image quality deterioration problems such as a reduction in contrast are caused; therefore, this proportion of the communication period needs to be set lower than or equal to a certain value.

(Time Restrictions)

As mentioned above, the exposure time is desirably 20 p seconds or more. Furthermore, it is desired that the entire encoded image be included in one exposure time without fail. Moreover, taking into account also that the timing at which an image display process starts and the timing at which exposure of an exposure line starts may be different, the exposure time is desirably half the above value, that is, 10μ seconds or more. In addition, from the perspective of the visibility through human eyes, the exposure time is desirably set lower than or equal to approximately 0.2 milliseconds as mentioned above.

Figure 16:
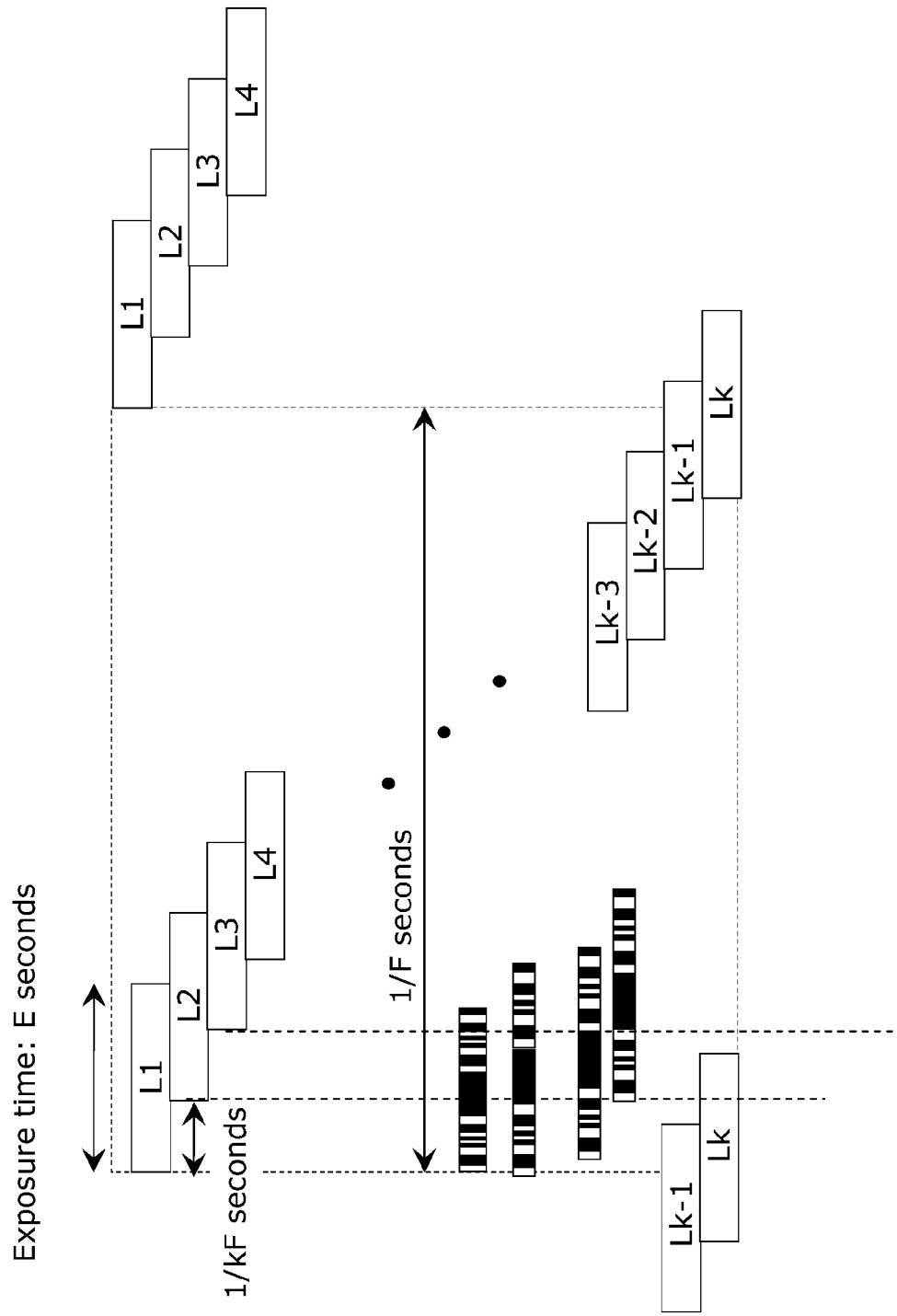
FIG. 16 explains the relation between exposure time and image display time according to Embodiment 2.

With reference to FIG. 16, more detailed description is given. FIG. 16 schematically illustrates the relation between (i) the exposure time of the imaging unit and (ii) the number of exposure lines and the imaging frame rate (which is an indicator showing how many photographs can be taken in one second and the unit of which is frame per second (fps)). Here, assume that the frame rate is common F fps, the number of exposure lines is k lines, and the exposure time is E seconds.

As illustrated in FIG. 16, one frame is 1/F seconds, and exposure of each exposure line sequentially starts 1/kF seconds after exposure of another exposure line. When exposure time E is greater than a value obtained by dividing time of one frame, 1/F, by the number of exposure lines, that is, is longer than 1/kF seconds, a plurality of exposure lines is exposed at a certain point in time. In the common specification at present, F=30 fps or F=60 fps, and the number of exposure lines is 720 or 1080, for example. In other words, this exposure time is longer than the shortest normal exposure time, i.e., approximately one ten-thousandth seconds, and exposure periods of exposure lines often overlap; therefore, overlapping of the exposure periods is taken into account in the following description.

Assume a case where different images of two or more types are displayed continuously in order to transmit two signals. In this case, when there is an overlap in exposure period, it is impossible that only one image is captured with each exposure line.

The following describes the conditions for recognizing that a plurality of images is displayed when a plurality of images is exposed across a plurality of exposure lines. When the display time for an image is less than or equal to E seconds, a plurality of images is exposed with one exposure line. In this case, whether or not an image in a current exposure line corresponds to two or more images can be determined with reference to images in the preceding and succeeding exposure lines. However, when the display time is less than or equal to E seconds, there are cases with a certain probability where no images have been captured with the preceding and succeeding exposure lines, leading to a significant decrease in reception probability.

Meanwhile, when the display time is (E+1/kF) seconds or more, at least one image out of at least continuous images can be exposed without being mixed up with the other image. Furthermore, in the case where three or more different images continue, the display time needs to be set higher than or equal to (E+2/kF) seconds in order that the images other than the images at both ends can be identified likewise. In this case, there are no more than one exposure line with which a plurality of images mixed are exposed, making it possible to reliably distinguish the images. Specifically, in the case of performance of common devices and so on at present which is represented by F=30 fps, k=1080, and E=1/10000 seconds, the display time of one image when different images are displayed continuously is desirably approximately 160μ seconds or more.

The following then describes that the possibility that the images can be identified increases when a black image that is black in entirety (with a tone represented by low luminance) is displayed between one image and another. In the case where the black image is displayed for a very short length of time, that is, less than (1/kF) seconds, there are at least one exposure line with which both the preceding and succeeding different images are exposed. With this exposure line, an integral image will be obtained in which the preceding and succeeding images and the black image are weighted by time. Thus, the black image inserted between different images is preferably displayed for at least (1/kF) seconds. Furthermore, in order that there is at least one exposure line with which each of the signal images preceding and succeeding the black image can be exposed without being mixed up with another image, it is sufficient that the display time of the black image is greater than or equal to the exposure time E seconds. At this time, regardless of the display time of each of the preceding and succeeding signal images, either the signal image is mixed up with the black image or only the signal image is exposed, and there is no exposure line with which the signal images are exposed together. Thus, the display time of the black image inserted is desirably the exposure time E seconds or more.

Furthermore, the case where the display time of the black image is between 1/kF seconds and E seconds is described. In this case, because the condition under which different signal images can be identified with different exposure lines is that there is at least one exposure line with which different signal images are not exposed at the same time as described above, the display time is desirably greater than or equal to (E−(the display time of the black image)) seconds. Specifically, when the display time of the black image is 1/kF seconds or more, the display time of the signal image is desirably (E−1/kF) seconds or more. Furthermore, as the display time of the black image increases, the display time of the signal image may decrease. In other words, the desirable length of the display time of the signal image varies depending on the display time of the black image. Moreover, in the case where the display time of the black image is longer than the exposure time E, this minimum required desirable time is not required for the display time of the signal image.

Subsequently, the exposure time in the case where a combination of two or more signal images is displayed is described with reference to FIG. 16. An image input to the imaging system over exposure periods L1 to Lk of the respective exposure lines is recorded as an image obtained by integrating temporal changes of images in these periods. Therefore, for example, when a signal image is displayed in synchronization with the start of the exposure period L1 so that timings at which different signal images are output are not included in the exposure period L1, a next signal image desirably starts at least after the end of the exposure period L1, that is, after a length of time equivalent to the exposure time E seconds. This is the highest demanded case; it is desired that the interval between the output start points in time of adjacent signal images be at least the exposure time has elapsed. Here, assume that the display time of the signal image is the exposure time or more, the signals may have influence in not only the exposure periods L1 and L2 but also the exposure period L3 corresponding to the display period of the next signal image. For this reason, it is desired that the above requirement, that is, the condition that the interval between the output start points in time of adjacent signal images is the exposure time or more, be satisfied and on top of this, the black image be displayed for no less than a difference (1/kF seconds) between the start points in time of the exposure period L1 and the exposure period L2.

Furthermore, the above example is applied also in the case where the timing at which an image is displayed is used as a signal. For example, 16 periods are provided in which images are likely to be displayed as illustrated in FIG. 11A and FIG. 11B. It is desired that each of these periods be longer than or equal to the exposure time and the black image be displayed for a length of time which is no less than a difference in time between the exposure lines.

On the other hand, in the case of displaying, for example, five images within one communication period as described with reference to FIG. 14, the display time of the signal images is shortened to set the display time of the black image sufficiently long even under the same conditions. Thus, this shows that even in the case illustrated in FIG. 14, there is no problem in applying the above-stated conditions.

Ultimately, considering performance, etc., of devices at present, the display time of the signal image is desirably 160 μ seconds or more in the case where no black image is displayed between the images. Furthermore, in the case where the black image is displayed between the images, the display time of the signal image desirably satisfies at least one of the limits 10μ seconds or more and 200μ seconds or less. The display time of the black image is desirably set to 30μ seconds or more and more desirably set to 100μ seconds or more. By setting the display time within such desirable ranges, the reception probability can be expected to improve, which is an advantageous effect.

From the foregoing, by adopting such a method, the reception device is capable of reliably determining a location which corresponds to each line. Specifically, the reception device is capable of determining which size in the captured image the width of one line is equivalent to, and uses the size of the line at the corresponding location to convert an image with brightness and darkness into a code and convert the timing of signal input into a code. This makes it possible to transmit and receive signals for 12 bits or more by using the encoded image inserted in between the projection images even in a case other than the case where an image is projected on a flat surface. For example, even in the case called projection mapping where a structure or the like is used as a screen, signals can be transmitted and received.

As above, the display apparatus according to the present embodiment performs a visible light communication signal display method of displaying (i) an image represented by video signals and (ii) an image obtained by encoding visible light communication signals.

Figure 17:
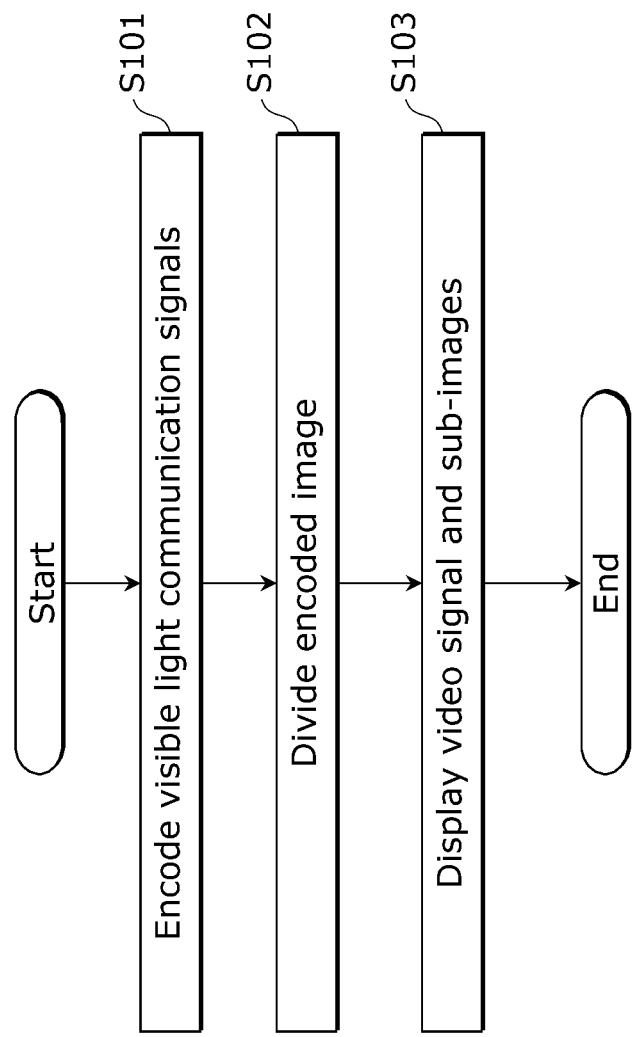
FIG. 17 is a flowchart of the visible light communication signal display method according to Embodiment 2.

Specifically, as illustrated in FIG. 17, an encoding unit (for example, the second signal processing unit 160 in FIG. 2) included in the display apparatus first encodes at least part of the visible light communication signals to generate an encoded image (S101). Specifically, the encoding unit generates an image pattern, illustrated in FIG. 8, etc., which indicates the visible light communication signals, and generates an encoded image which indicates the image pattern. For example, the encoded image is composed of a bright part and a dark part which is darker (with lower luminance) than the bright part.

For example, the encoding unit generates the encoded image by encoding all the visible light communication signals. Alternatively, the encoding unit generates the encoded image by encoding part of the visible light communication signals, and encodes the other part thereof in a different method. Here, the different method is, as described above, (1) a method of encoding the visible light communication signals into timings at which a plurality of sub-images are displayed, (2) a method of encoding the visible light communication signals into a sequence in which a plurality of sub-images are displayed, and (3) a method of encoding the visible light communication signals into division patterns of a plurality of sub-images. It is to be noted that, of these methods, only one method may be performed, and two or three methods may also be performed.

Next, a dividing unit included in the display apparatus (for example, the second signal processing unit 160 in FIG. 2) generates a plurality of sub-images which correspond to respective partial images obtained by dividing the encoded image and each of which (i) includes a corresponding one of the partial images and (ii) except for the corresponding partial image, is a black image (S102). Specifically, each of the sub-images includes the corresponding partial image at the same position as the position thereof in the encoded image. The size of each of the sub-images is the same as the size of the encoded image.

Furthermore, the black image is an image which may not necessarily be completely black (at zero level) but has luminance lower than a predetermined value. Furthermore, the black image may be the same image as the above-mentioned dark part in the encoded image. Specifically, the black image is an image which has a substantially uniform luminance value lower than or equal to a predetermined luminance value. In the case where the division patterns are used in the encoding process, the dividing unit divides the encoded image according to the division patterns determined in Step S101.

In addition, as described above, the dividing unit may further generate, in Step S102, a plurality of reversed images which correspond to the respective partial images and each of which (i) includes a reversed partial image obtained by reversing luminance of a corresponding one of the partial images and (ii) except for the reversed partial image, is a black image. Here, reversing luminance means, for example, switching between the above-mentioned bright and dark parts in the encoded image (the partial image).

Next, a display unit included in the display apparatus (for example, the display control unit 140 and the display unit 110 in FIG. 2) displays, in a video display period, the image represented by the video signals, and displays the sub-images in time series in a communication period different from the video display period (S103). For example, the video display period and the communication period are included in one frame period. Furthermore, in the case where the timings at which the sub-images are displayed or the sequence in which the sub-images are displayed is used in the encoding process, the display unit displays the sub-images at the determined timings or in the determined sequence in time series in the communication period.

Furthermore, as described above, in the case where the reversed images are generated, the display unit displays, in addition to the sub-images, the reversed images in time series.

It is to be noted that in the communication period, the display unit may display a black image between the sub-images. In the case where the reversed images are displayed, a black image may be displayed between the plurality of sub-images and the plurality of reversed images. Here, the black image has the same meaning as stated above, being not necessarily completely black.

In another aspect, the display apparatus according to the present embodiment performs a visible light communication signal display method of displaying (i) an image represented by video signals and (ii) an image for transmitting visible light communication signals.

Figure 18:
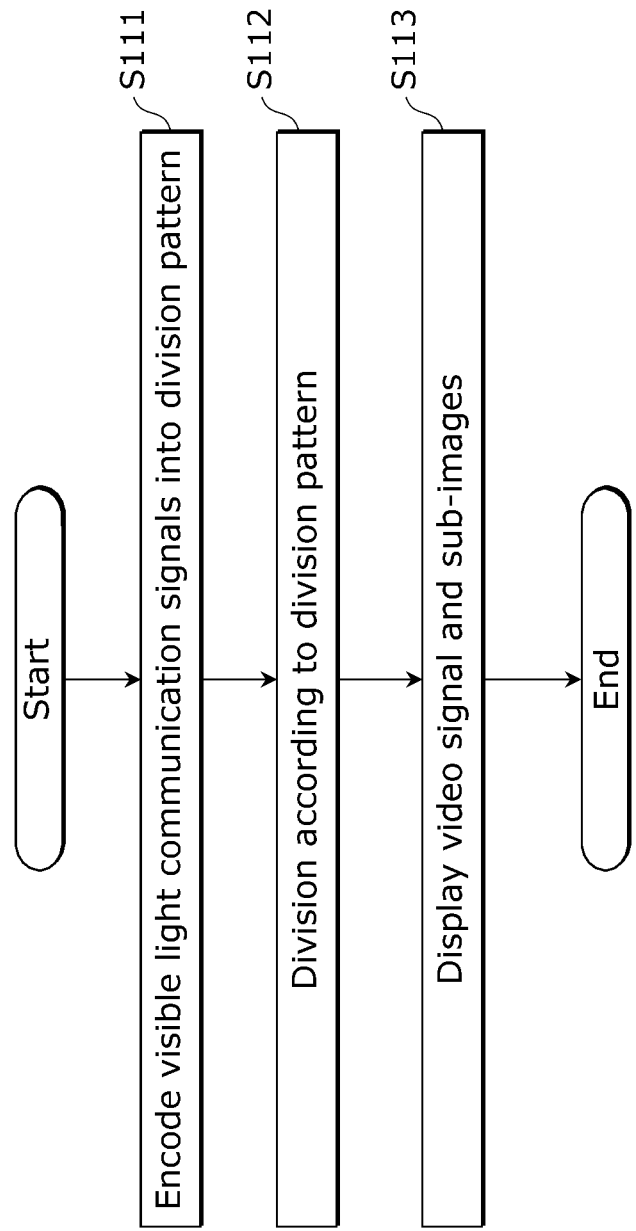
FIG. 18 is a flowchart of the visible light communication signal display method according to Embodiment 2.

As illustrated in FIG. 18, the encoding unit encodes at least part of the visible light communication signals into a pattern for dividing a basic image (S111). The basic image is, for example, composed of a bright part and a dark part which is darker (with lower luminance) than the bright part. Specifically, for example, as illustrated in FIG. 14, the encoding unit selects, from a plurality of patterns for dividing the basic image into a different number of sub-images, a pattern that corresponds to at least part of the visible light communication signals, to encode at least part of the visible light communication signals into the pattern. For example, as illustrated in FIG. 14, the patterns do not include patterns in which the sub-images include an all-black image (an image that is a black image in entirety).

Here, as illustrated in FIG. 15, the encoding unit may select, from a plurality of patterns, each for dividing the basic image into the same number of sub-images, a pattern that corresponds to at least part of the visible light communication signals, to encode at least part of the visible light communication signals into the pattern. For example, as illustrated in FIG. 15, the patterns include a pattern in which the sub-images include the all-black image.

For example, the encoding unit encodes all the visible light communication signals into patterns for dividing the basic image. Alternatively, the encoding unit encodes part of the visible light communication signals into patterns for dividing the basic image, and encodes the other part thereof in a different method. Here, the different method is (1) a method of encoding the visible light communication signals into timings at which a plurality of sub-images are displayed, (2) a method of encoding the visible light communication signals into a sequence in which a plurality of sub-images are displayed, and (3) a method of encoding the visible light communication signals into the encoded image (the basic image). It is to be noted that, of these methods, only one method may be performed, and two or three methods may also be performed.

Thus, the above-mentioned image for transmitting the visible light communication signals include the basic image and the sub-images.

Next, the dividing unit divides the basic image into a plurality of sub-images according to the pattern determined in Step S101 (S112). Specifically, the dividing unit generates a plurality of sub-images which correspond to respective partial images obtained by dividing the basic image and each of which (i) includes a corresponding one of the partial images and (ii) except for the corresponding partial image, is a black image. Here, the black image has the same meaning as stated above, being not necessarily completely black.

Next, the display unit displays, in a video display period, the image represented by the video signals, and displays, in time series in a communication period different from the video display period, the sub-images and a reversed image obtained by reversing luminance of the basic image (S113). Here, reversing luminance means, for example, switching between the above-mentioned bright and dark parts in the basic image. For example, the video display period and the communication period are included in one frame period. Furthermore, in the case where the timings at which the sub-images are displayed or the sequence in which the sub-images are displayed is used in the encoding process, the display unit displays the sub-images at the determined timings or in the determined sequence in time series in the communication period.

It is to be noted that in the communication period, the display unit may display a black image between the reversed image and the plurality of sub-images.

Furthermore, these variations may be combined.

Embodiment 3

The following describes Embodiment 3.
(Observation of Luminance of Light Emitting Unit)

Figure 19:
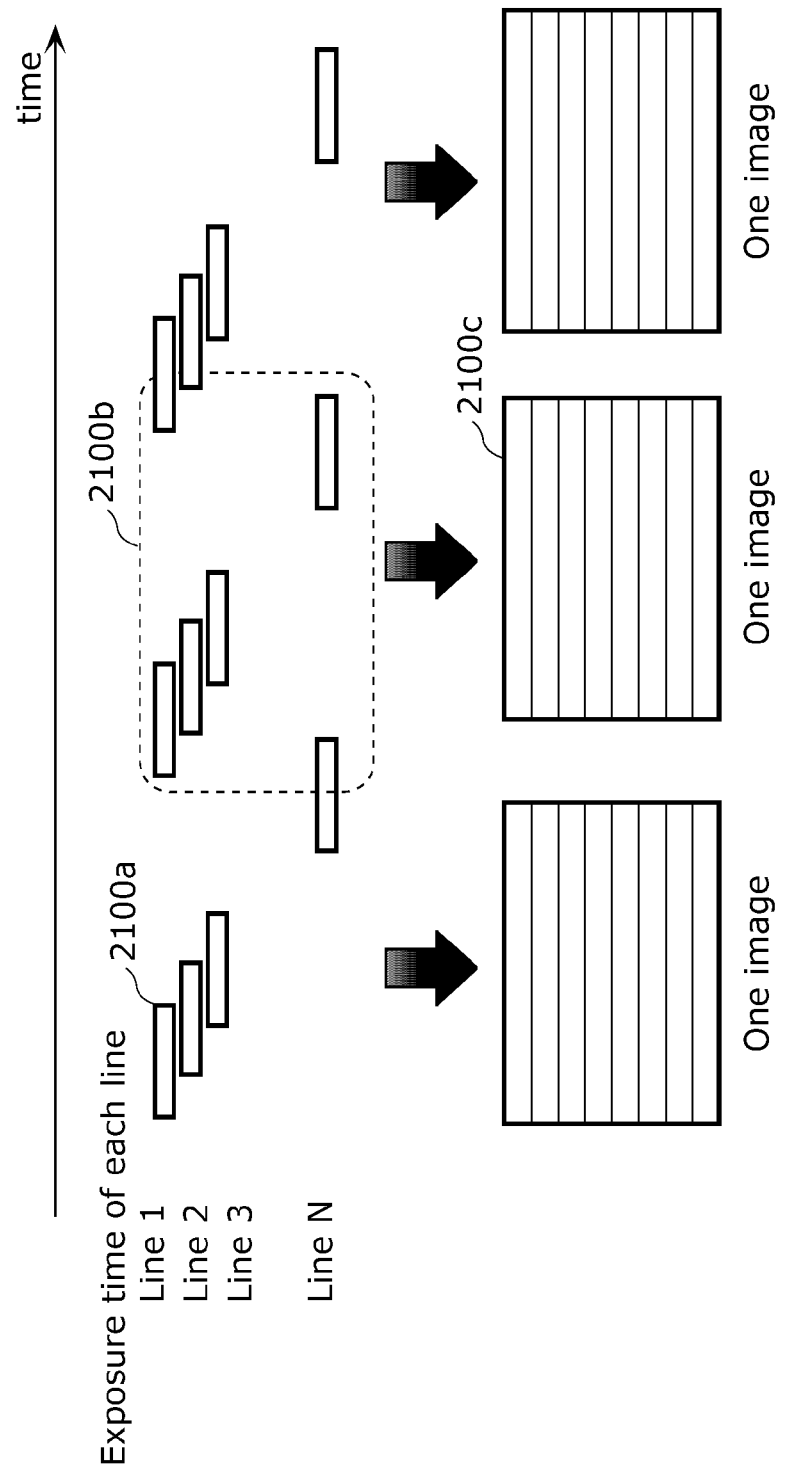
FIG. 19 illustrates an example where imaging elements in one line are exposed at the same time and exposure start time is shifted in the order from the closest line in an imaging operation according to Embodiment 3.

An imaging method is proposed in which, when one image is to be captured, the exposure starts and ends at different points in time for each imaging element instead of exposure of all the imaging elements at the same timing. FIG. 19 illustrates an example where the imaging elements in one line are exposed at the same time, and the exposure start time is shifted in the order from the closest line in an imaging operation. Here, the imaging elements exposed at the same time are referred to as an exposure line, and a line of pixels on an image which corresponds to these imaging elements is referred to as a bright line.

Figure 20:
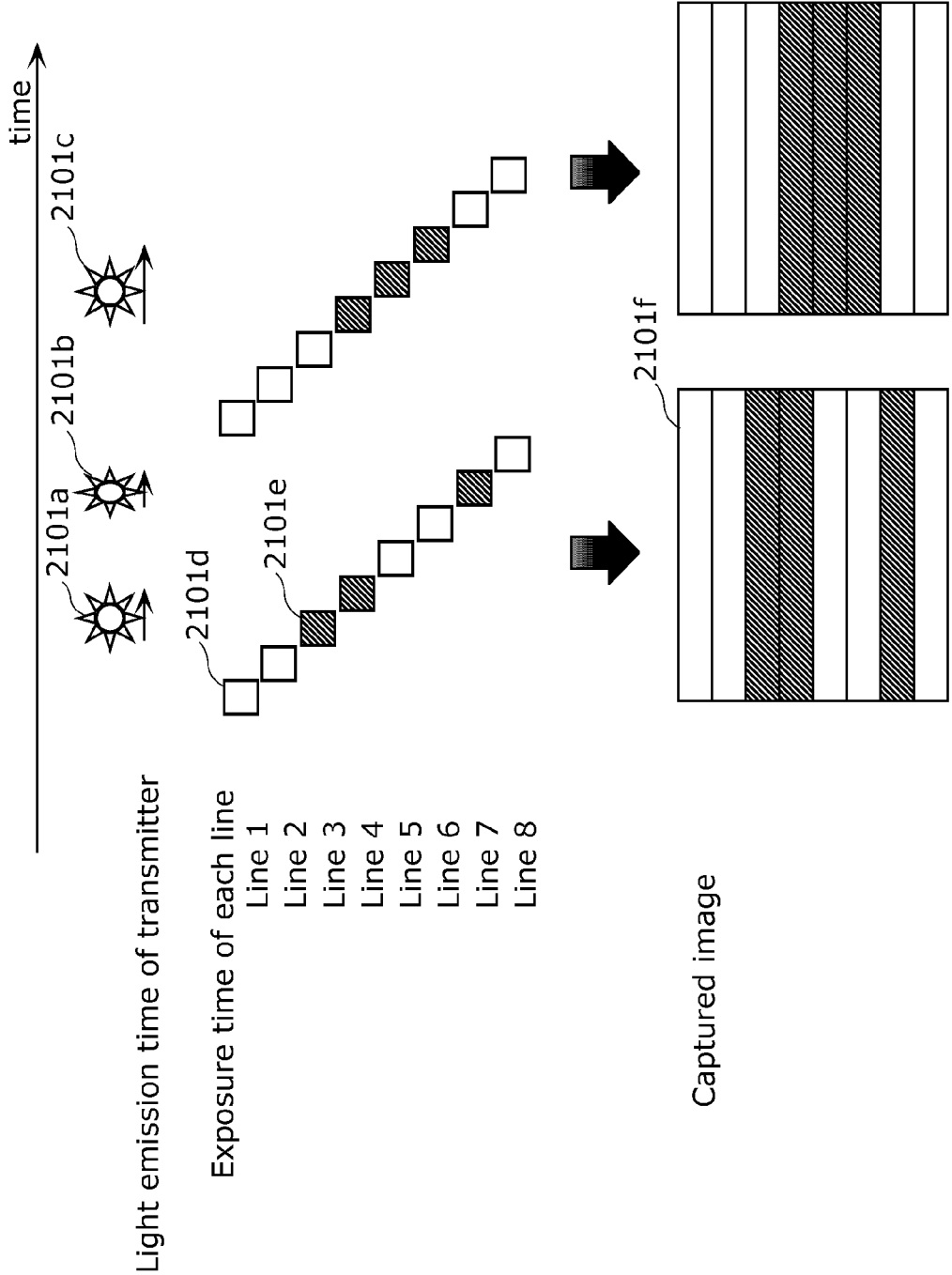
FIG. 20 illustrates a situation where, after the exposure of one exposure line ends, the exposure of the next exposure line starts according to Embodiment 3.

When an image is captured with the imaging elements the entire surfaces of which are illuminated with light from a flickering light source, a bright line (a line of brightness or darkness of pixel values) appears along an exposure line on the captured image as illustrated in FIG. 20. By recognizing this bright line pattern, it is possible to estimate a change in light source luminance at a speed which exceeds the imaging frame rate. This allows communication at a speed higher than or equal to the imaging frame rate by transmitting a signal as the change in light source luminance. In the case where the light source represents the signal with two kinds of luminance values, the lower one of the luminance values is referred to as LOW (LO), and the higher one of the luminance vales is referred to as HIGH (HI). It may be that LOW is a state in which the light source emits no light or in which the light source emits light weaker than in HIGH.

By this method, information transmission is performed at the speed higher than the imaging frame rate.

In the case where the number of exposure lines whose exposure times do not overlap each other is 20 in one captured image and the imaging frame rate is 30 fps, it is possible to recognize a luminance change in a period of 1 millisecond. In the case where the number of exposure lines whose exposure times do not overlap each other is 1000, it is possible to recognize a luminance change in a period of 1/30000 second (about 33 microseconds). Note that the exposure time is set to less than 10 milliseconds, for example.

FIG. 20 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and I is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

Figure 21:
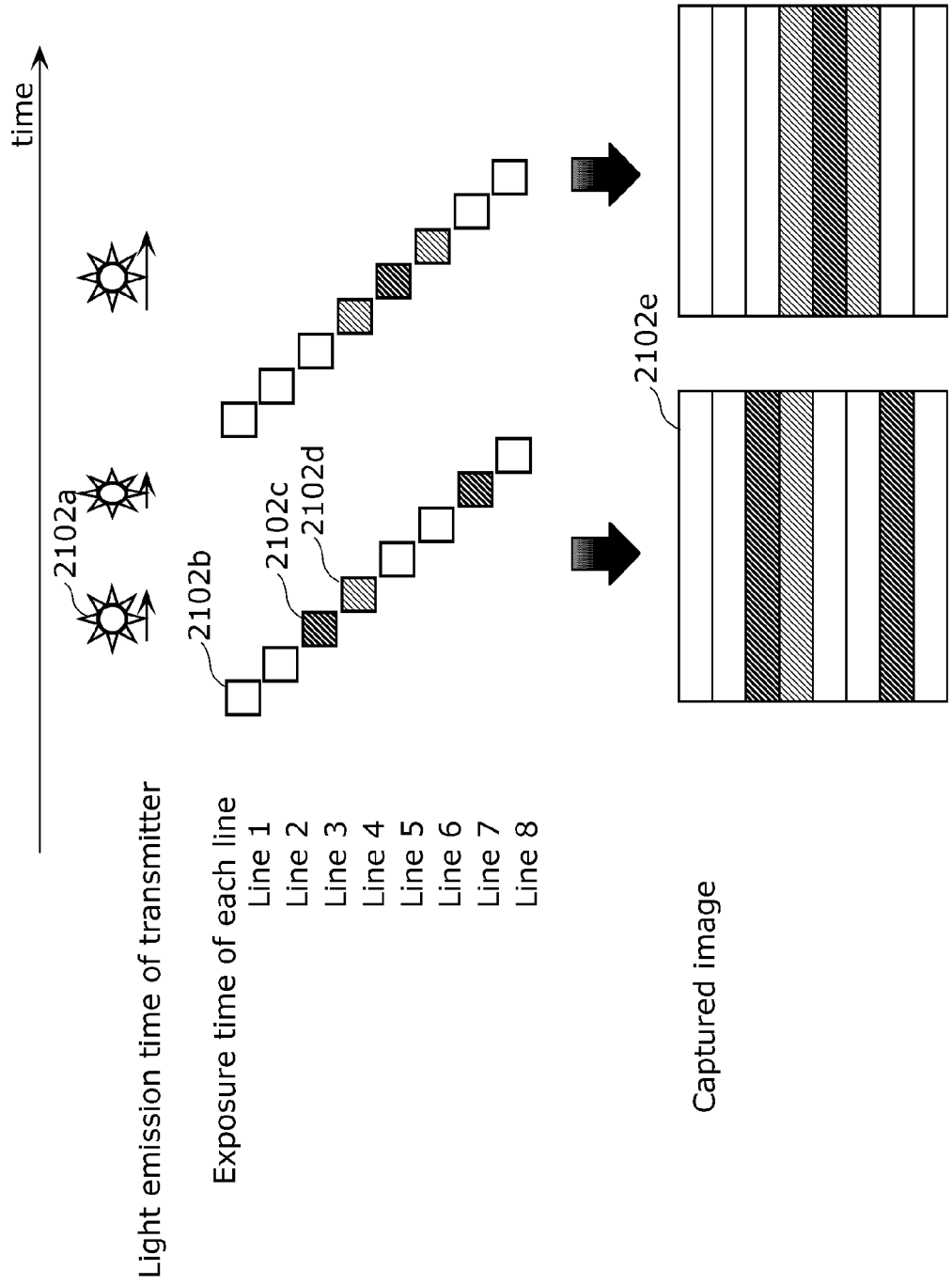
FIG. 21 illustrates a situation where, after the exposure of one exposure line ends, the exposure of the next exposure line starts according to Embodiment 3.

If the exposure state of each exposure line caused by the light emission of the light emitting unit is recognizable in a plurality of levels as illustrated in FIG. 21, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

Figure 22:
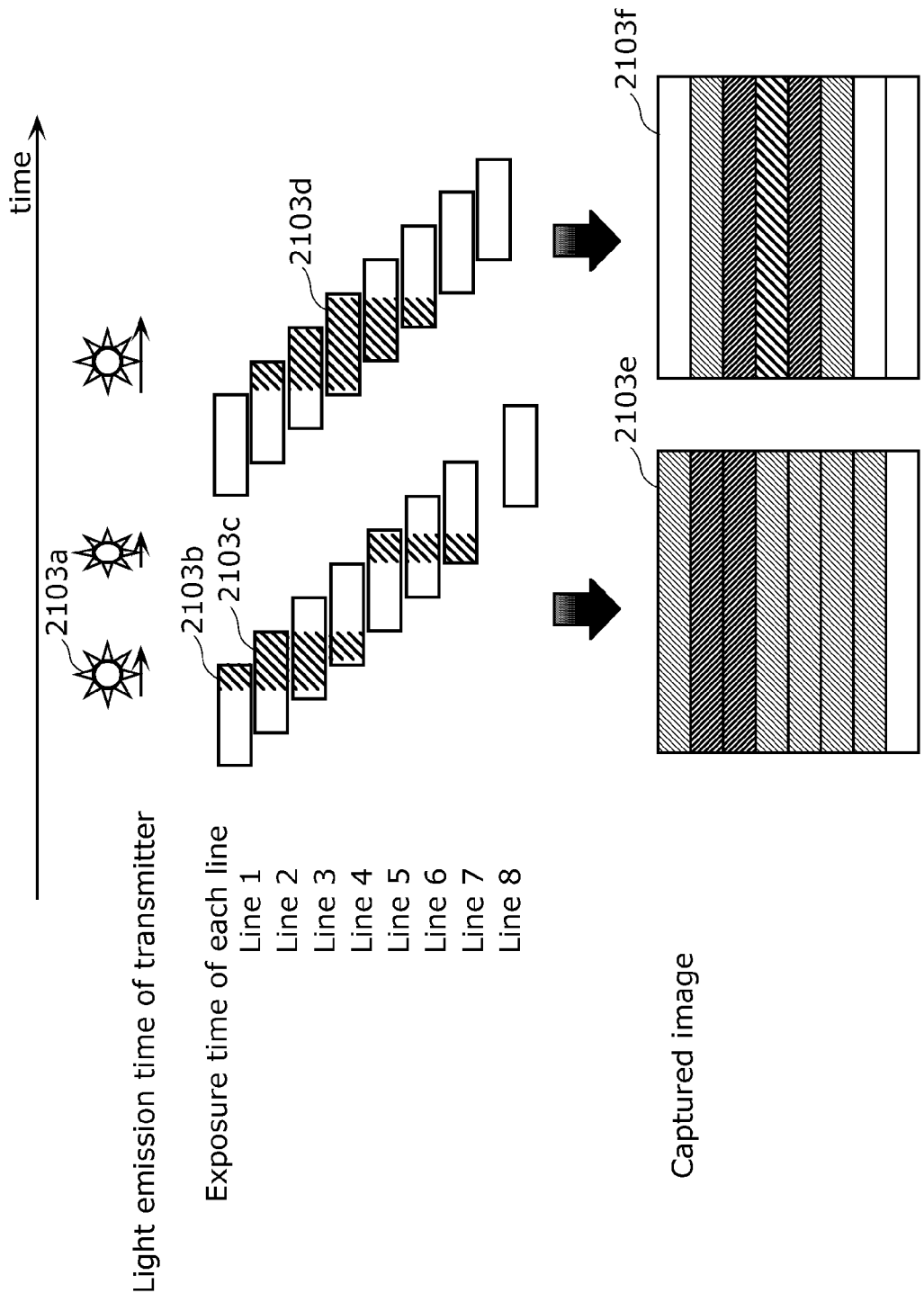
FIG. 22 illustrates a situation where, before the exposure of one exposure line ends, the exposure of the next exposure line starts according to Embodiment 3.

FIG. 22 illustrates a situation where, before the exposure of one exposure line ends, the exposure of the next exposure line starts. Specifically, this configuration is that the exposure times of adjacent exposure lines temporally partially overlap each other. With such a configuration, (1) the number of samples within a predetermined length of time can be set larger as compared to the case where it is not until the end of the exposure time of one exposure line that the exposure of the next exposure line starts. The increased number of samples within the predetermined length of time makes it possible to more appropriately detect a light signal generated by a light transmitter that is a subject. This means that the error rate in detection of the light signal can be reduced. Furthermore, (2) the exposure time of each exposure line can be set longer as compared to the case where it is not until the end of the exposure time of one exposure line that the exposure of the next exposure line starts, with the result that even in the case where the subject is dark, a brighter image can be obtained. In other words, the S/N ratio can be improved. It is to be noted that the configuration does not need to be such that the exposure times of all the adjacent pairs of the exposure lines temporally partially overlap each other, that is, the configuration may be such that the exposure times of part of the adjacent pairs of the exposure lines do not temporally partially overlap each other. With the configuration in which the exposure times of part of the adjacent pairs of the exposure lines do not temporally partially overlap each other, the generation of an intermediate color due to the overlapped exposure times on the imaging screen can be reduced so that a bright line can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

Figure 23:
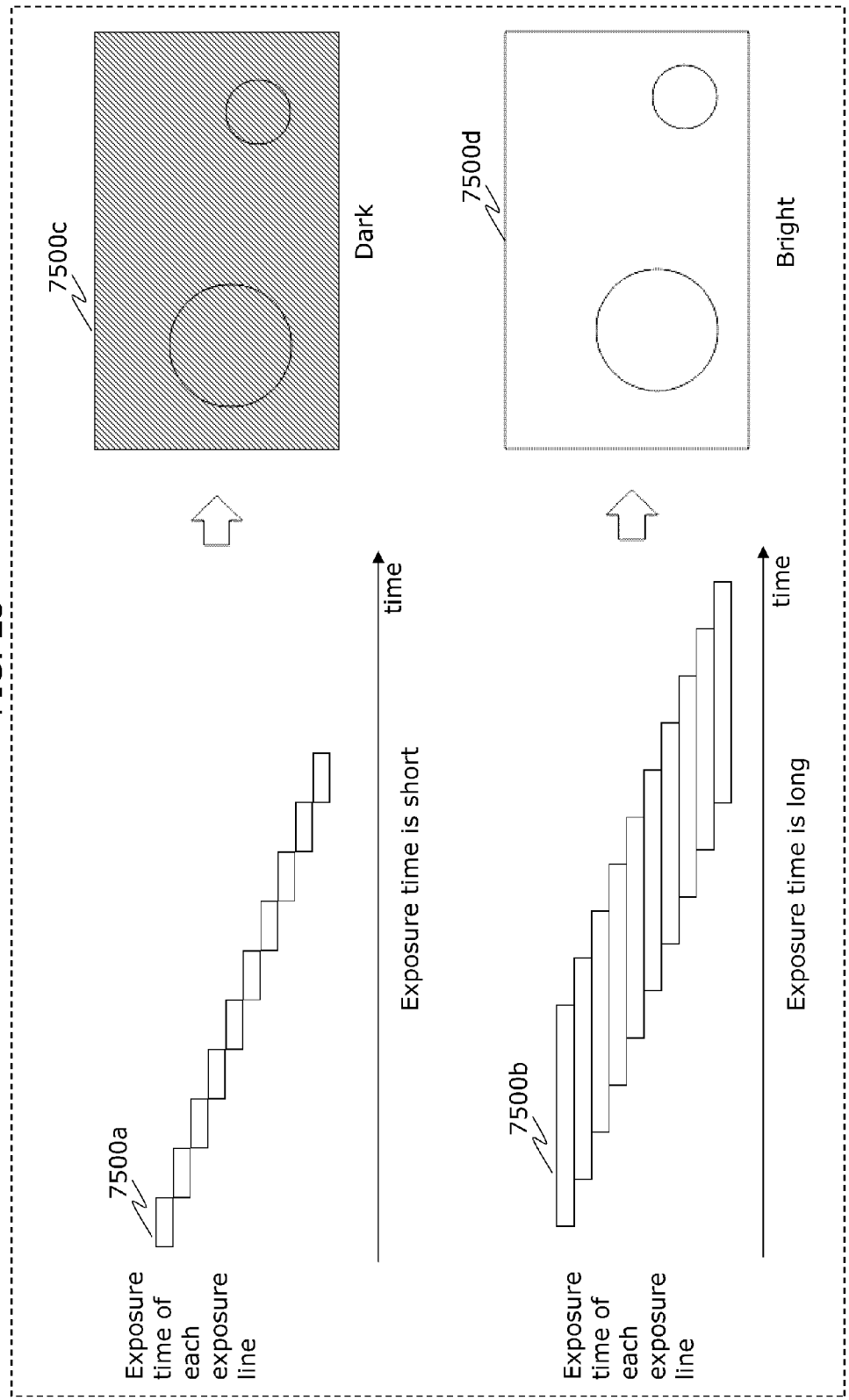
FIG. 23 illustrates the influence of the difference in exposure time in the case where the exposure start time of each exposure line is the same according to Embodiment 3.

FIG. 23 illustrates the influence of the difference in exposure time in the case where the exposure start time of each exposure line is the same. In 7500a, the exposure end time of one exposure line and the exposure start time of the next exposure line are the same. In 7500b, the exposure time is longer than that in 7500a. The structure in which the exposure times of adjacent exposure lines partially overlap each other as in 7500b allows a longer exposure time to be used. That is, more light enters the imaging element, so that a brighter image can be obtained. In addition, since the imaging sensitivity for capturing an image of the same brightness can be reduced, an image with less noise can be obtained. Communication errors are prevented in this way.

Figure 24:
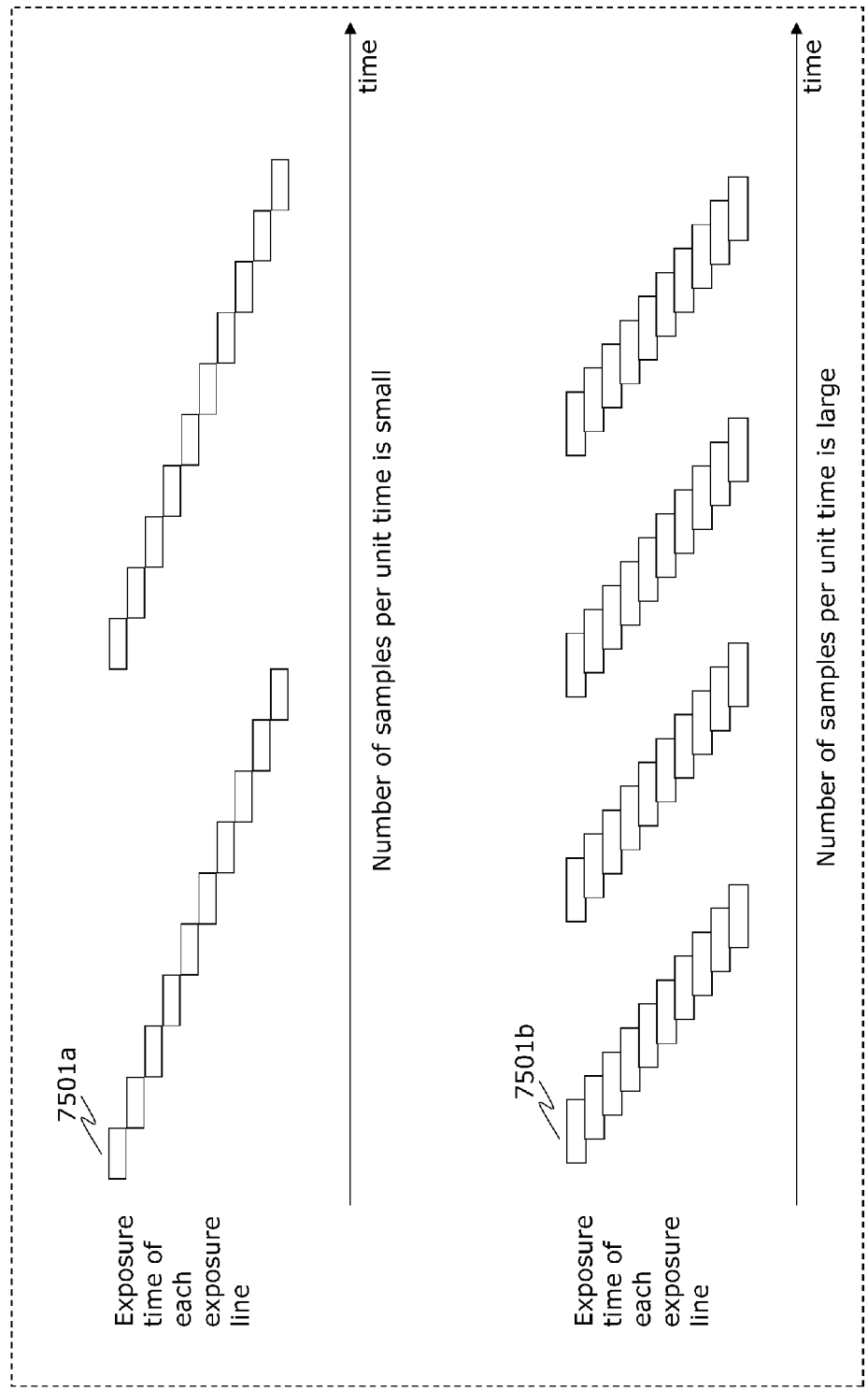
FIG. 24 illustrates the influence of the difference in exposure start time of each exposure line in the case where the exposure time is the same according to Embodiment 3.

FIG. 24 illustrates the influence of the difference in exposure start time of each exposure line in the case where the exposure time is the same. In 7501a, the exposure end time of one exposure line and the exposure start time of the next exposure line are the same. In 7501b, the exposure of one exposure line ends after the exposure of the next exposure line starts. The structure in which the exposure times of adjacent exposure lines partially overlap each other as in 7501b allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIGS. 23 and 24, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to 1/480 second enables an appropriate bright line pattern to be generated. Here, it is necessary to set (exposure time)<1/8×f, where f is the frame frequency. Blanking during imaging is half of one frame at the maximum. That is, the blanking time is less than or equal to half of the imaging time. The actual imaging time is therefore ½f at the shortest. Besides, since 4-value information needs to be received within the time of ½f, it is necessary to at least set the exposure time to less than 1/(2f×4). Given that the normal frame rate is less than or equal to 60 frames per second, by setting the exposure time to less than or equal to 1/480 second, an appropriate bright line pattern is generated in the image data and thus fast signal transmission is achieved.

Figure 25:
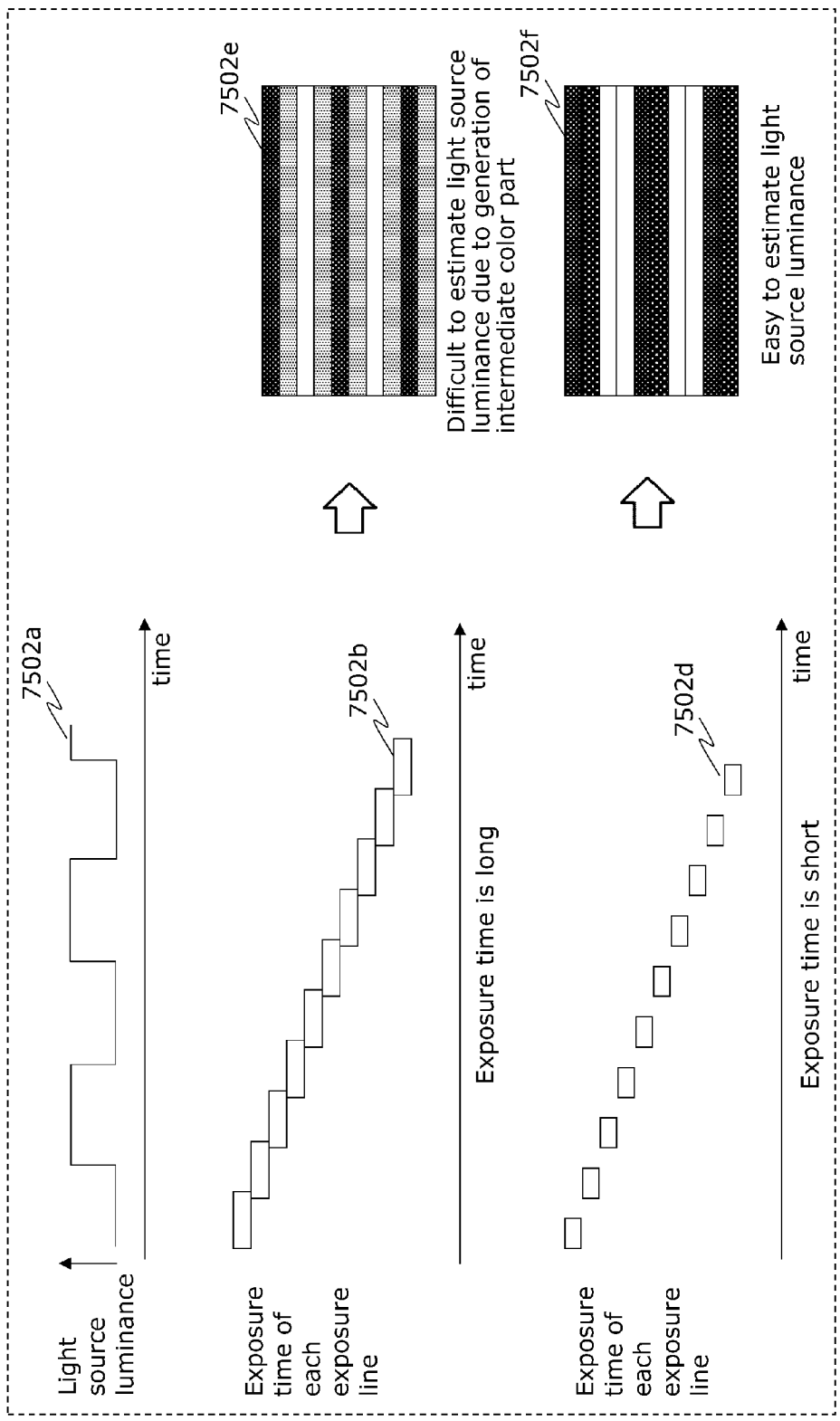
FIG. 25 illustrates the advantage of using a short exposure time in the case where each exposure line does not overlap another in exposure time according to Embodiment 3.

FIG. 25 illustrates the advantage of using a short exposure time in the case where each exposure line does not overlap in exposure time. In the case where the exposure time is long, even when the light source changes in luminance in a binary fashion as in 7502a, an intermediate-color part tends to appear in the captured image as in 7502e, making it difficult to recognize the luminance change of the light source. By providing a predetermined non-exposure vacant time (predetermined wait time) $t_{D2}$ from when the exposure of one exposure line ends to when the exposure of the next exposure line starts as in 7502d, however, the luminance change of the light source can be recognized more easily. That is, a more appropriate bright line pattern can be detected as in 7502f. The provision of the predetermined non-exposure vacant time is possible by setting a shorter exposure time $t_E$ than the time difference $t_D$ between the exposure start times of the exposure lines, as in 7502d. In the case where the exposure times of adjacent exposure lines partially overlap each other in the normal imaging mode, the exposure time is shortened from the normal imaging mode so as to provide the predetermined non-exposure vacant time. In the case where the exposure end time of one exposure line and the exposure start time of the next exposure line are the same in the normal imaging mode, too, the exposure time is shortened so as to provide the predetermined non-exposure time. Alternatively, the predetermined non-exposure vacant time (predetermined wait time) $t_{D2}$ from when the exposure of one exposure line ends to when the exposure of the next exposure line starts may be provided by increasing the interval $t_D$ between the exposure start times of the exposure lines, as in 7502g. This structure allows a longer exposure time to be used, so that a brighter image can be captured. Moreover, a reduction in noise contributes to higher error tolerance. Meanwhile, this structure is disadvantageous in that the number of samples is small as in 7502h, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure vacant time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures.

Figure 26:
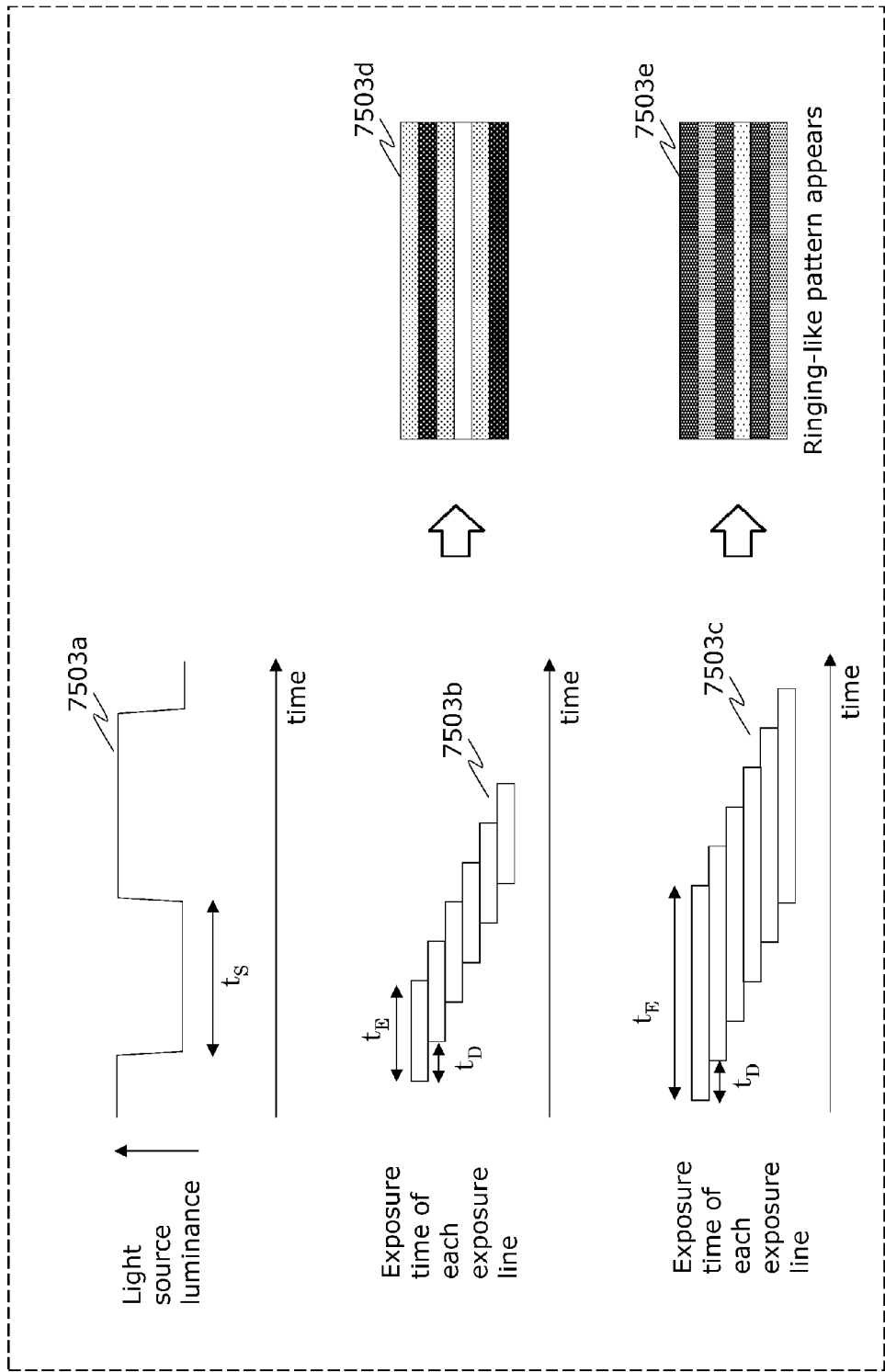
FIG. 26 illustrates the relation between the minimum change time of light source luminance, the exposure time, the time difference between the exposure start times of the exposure lines, and the captured image according to Embodiment 3.

FIG. 26 illustrates the relation between the minimum change time $t_S$ of light source luminance, the exposure time $t_E$, the time difference $t_D$ between the exposure start times of the exposure lines, and the captured image. In the case where $t_E + t_D < t_S$, imaging is always performed in a state where the light source does not change from the start to end of the exposure of at least one exposure line. As a result, an image with clear luminance is obtained as in 7503d, from which the luminance change of the light source is easily recognizable. In the case where $2t_E > t_S$, a bright line pattern different from the luminance change of the light source might be obtained, making it difficult to recognize the luminance change of the light source from the captured image.

Figure 27:
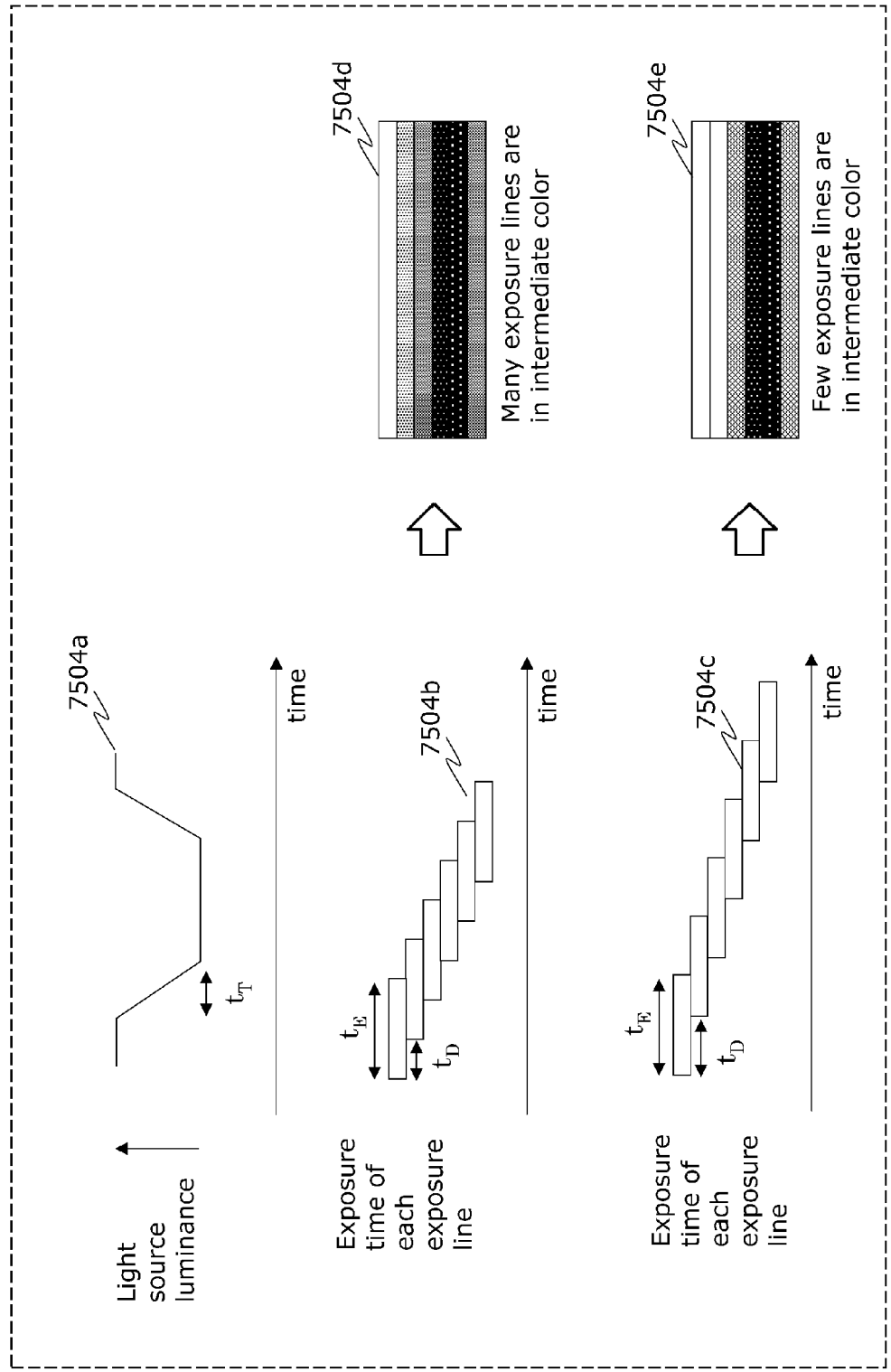
FIG. 27 illustrates the relation between the transition time of light source luminance and the time difference between the exposure start times of the exposure lines according to Embodiment

FIG. 27 illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D > t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

Figure 28:
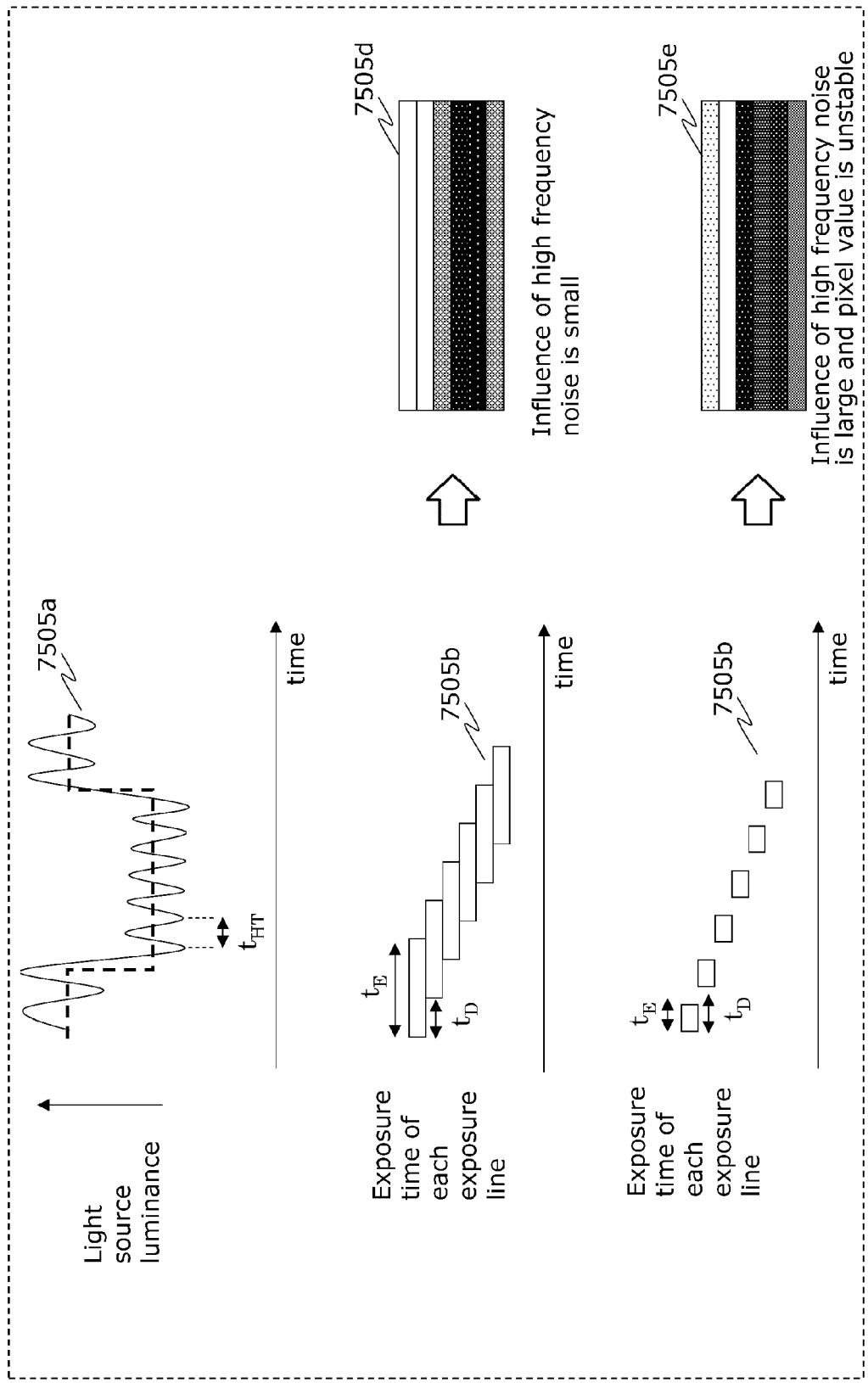
FIG. 28 illustrates the relation between high frequency noise of light source luminance and the exposure time according to Embodiment 3.

FIG. 28 illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E > t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

Figure 29:
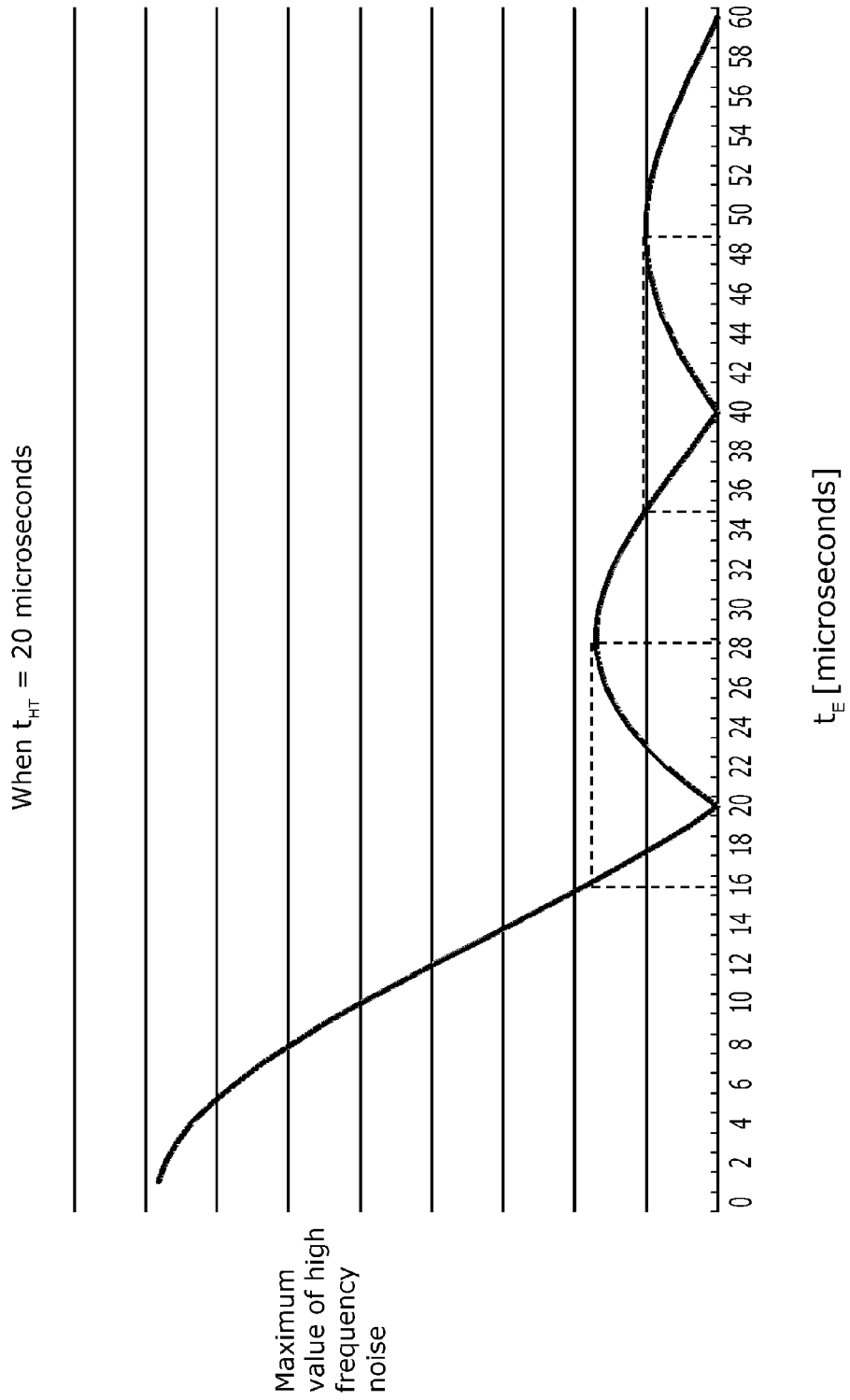
FIG. 29 is a graph representing the relation between the exposure time and the magnitude of high frequency noise of light source luminance when the high frequency noise is 20 microseconds according to Embodiment 3.

FIG. 29 is a graph representing the relation between the exposure time $t_E$ and the magnitude of high frequency noise when the high frequency noise $t_{HT}$ of light source luminance is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

Figure 30:
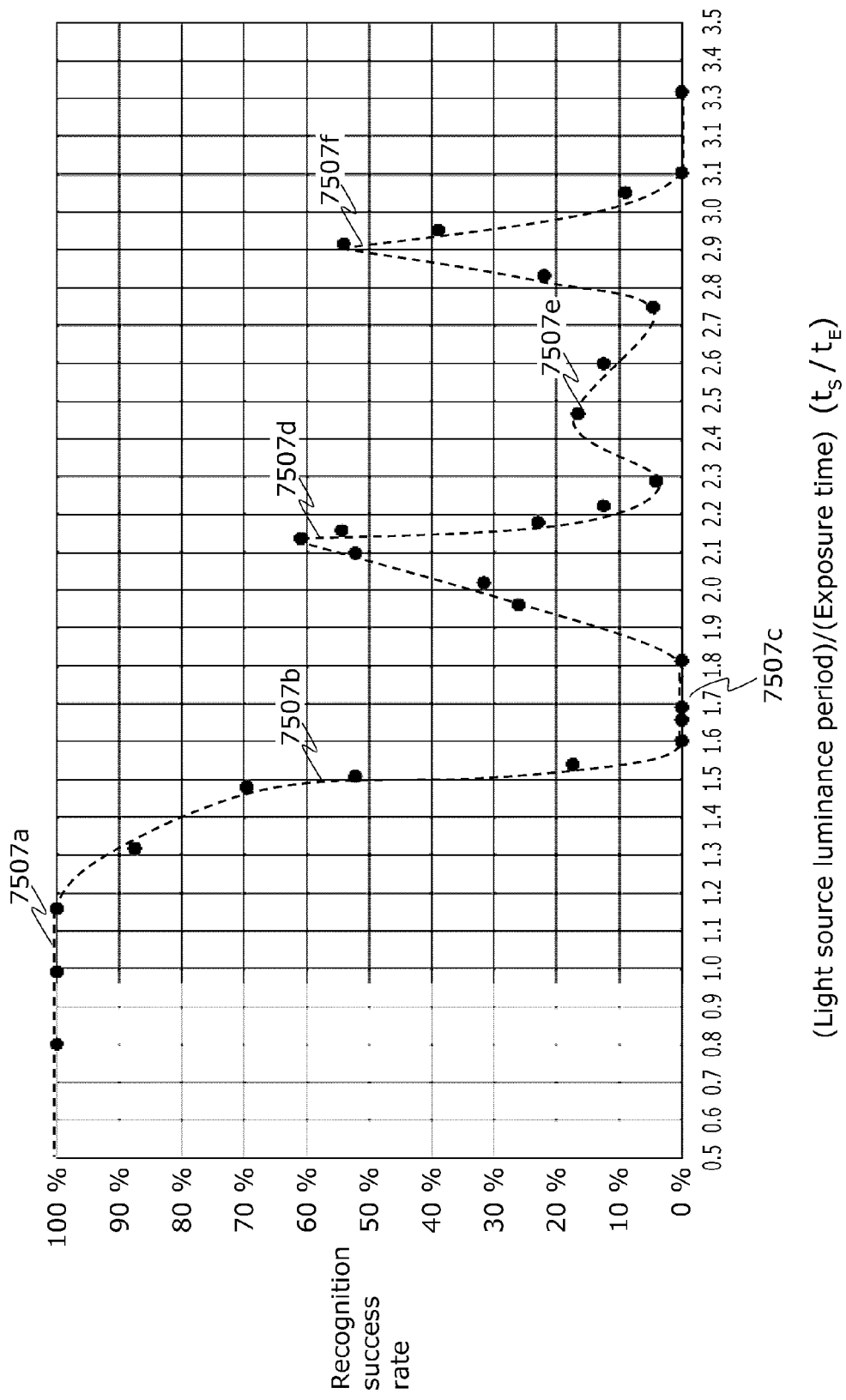
FIG. 30 illustrates the relation between the exposure time $t_E$ and the recognition success rate according to Embodiment 3.
Figure 31:
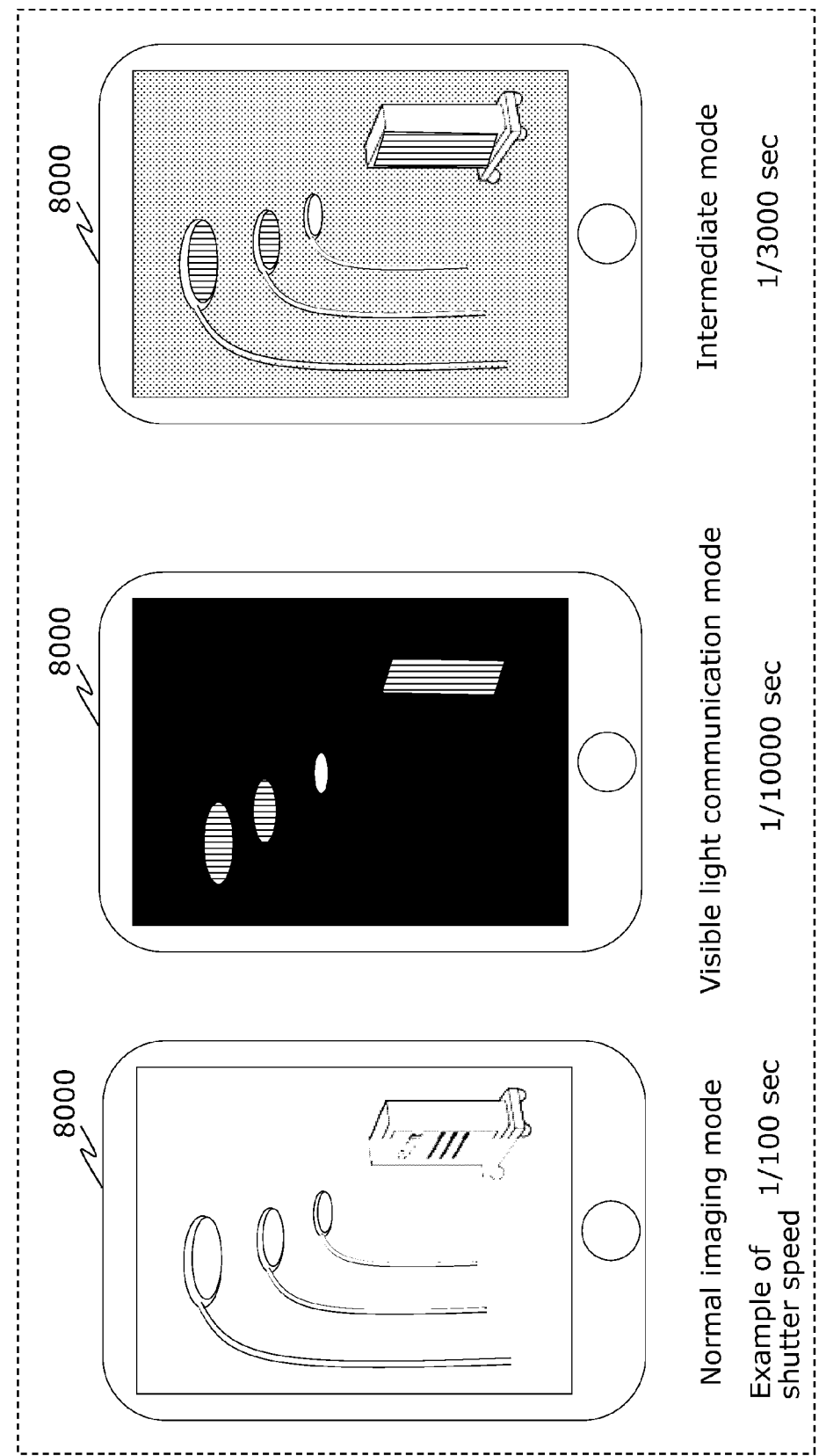
FIG. 31 illustrates an example of each mode of a reception device according to Embodiment 3.

FIG. 30 illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period $t_S$ by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507*c*, it increases again at 7507*d*, 7507*e*, and 7507*f*. Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 31.

Figure 32:
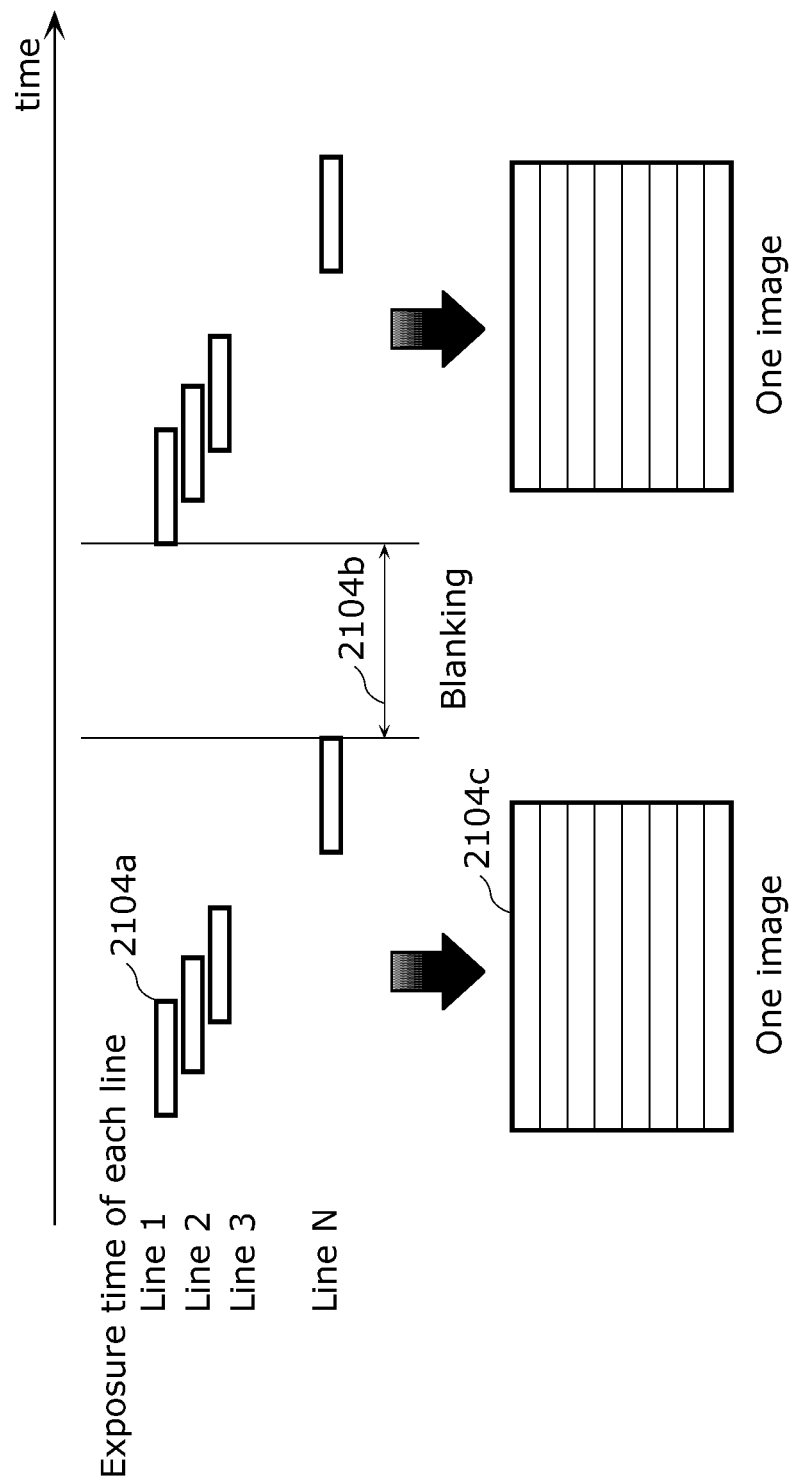
FIG. 32 illustrates an example of an observation method of luminance of a light emitting unit according to Embodiment 3.

Depending on imaging devices, there is a time (blanking) during which no exposure is performed, as illustrated in FIG. 32.

In the case where there is blanking, the luminance of the light emitting unit during the time cannot be observed.

A transmission loss caused by blanking can be prevented by the light emitting unit repeatedly transmitting the same signal two or more times or adding error correcting code.

To prevent the same signal from being transmitted during blanking every time, the light emitting unit transmits the signal in a period that is relatively prime to the period of image capture or a period that is shorter than the period of image capture.

Embodiment 4

Figure 33:
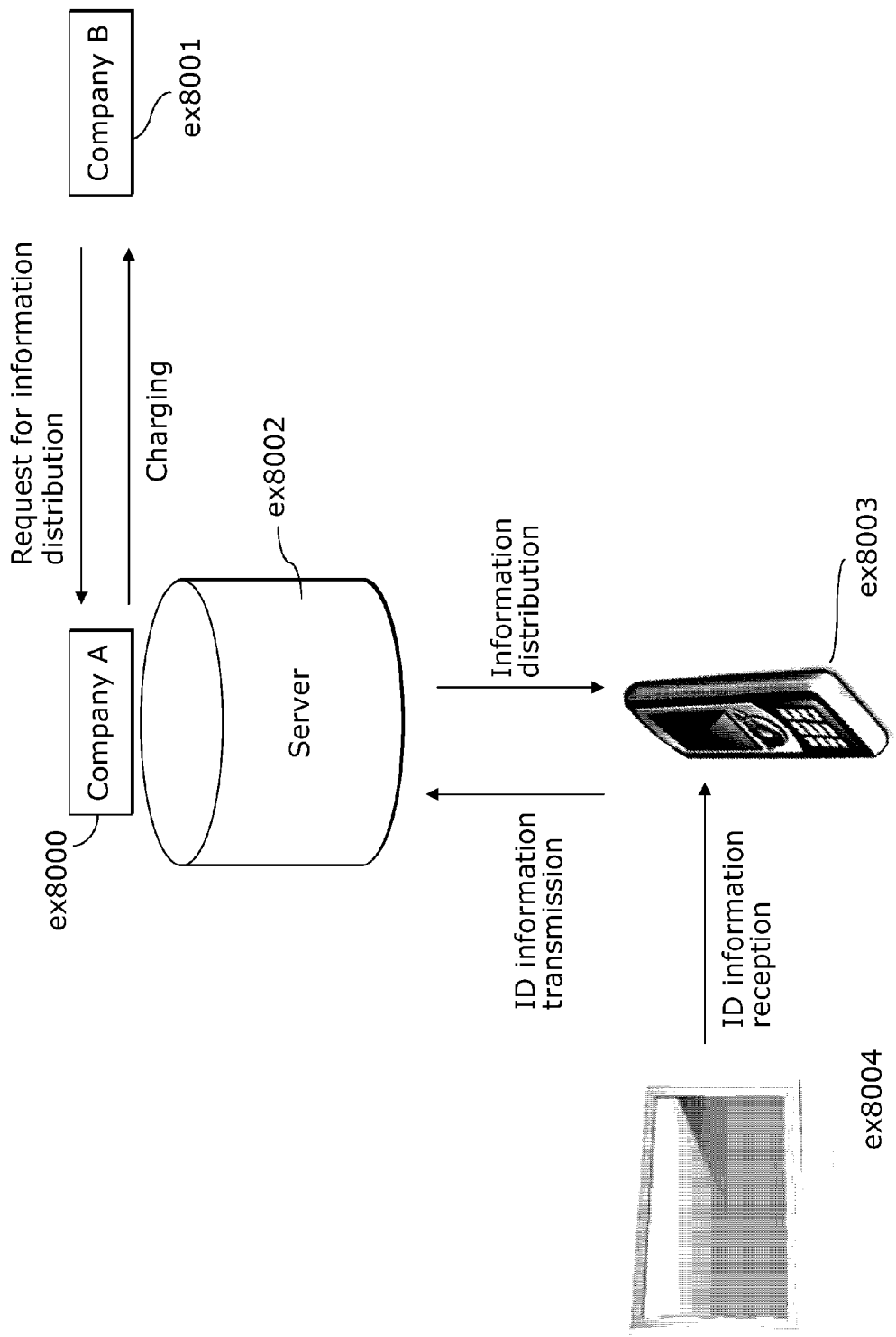
FIG. 33 illustrates a service provision system according to Embodiment 4.

FIG. 33 illustrates a service provision system using the reception method described in any of the foregoing embodiments.

First, a company A ex8000 managing a server ex8002 is requested to distribute information to a mobile terminal, by another company B or individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

Figure 34:
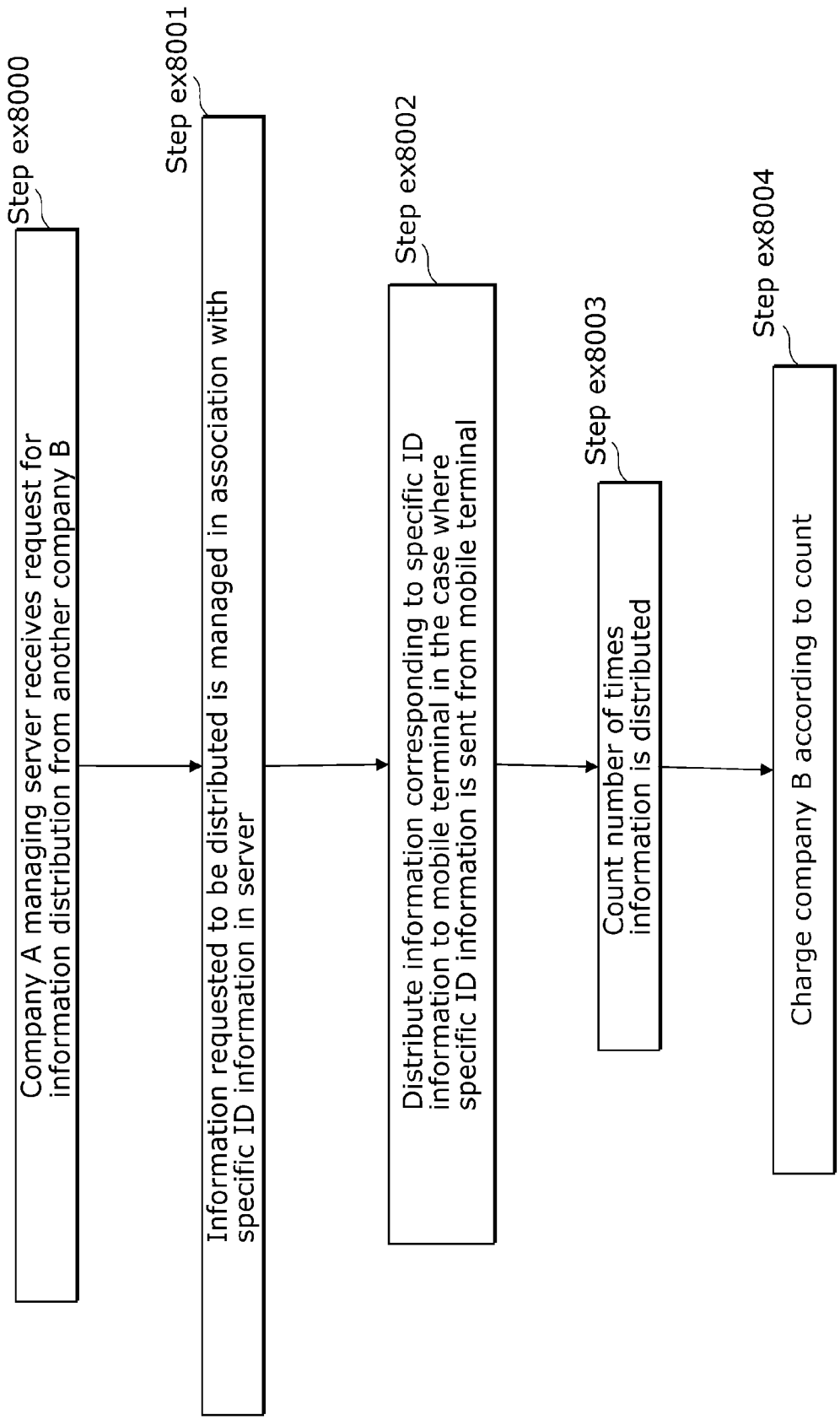
FIG. 34 illustrates flow of service provision according to Embodiment 4.

FIG. 34 illustrates service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

Figure 35:
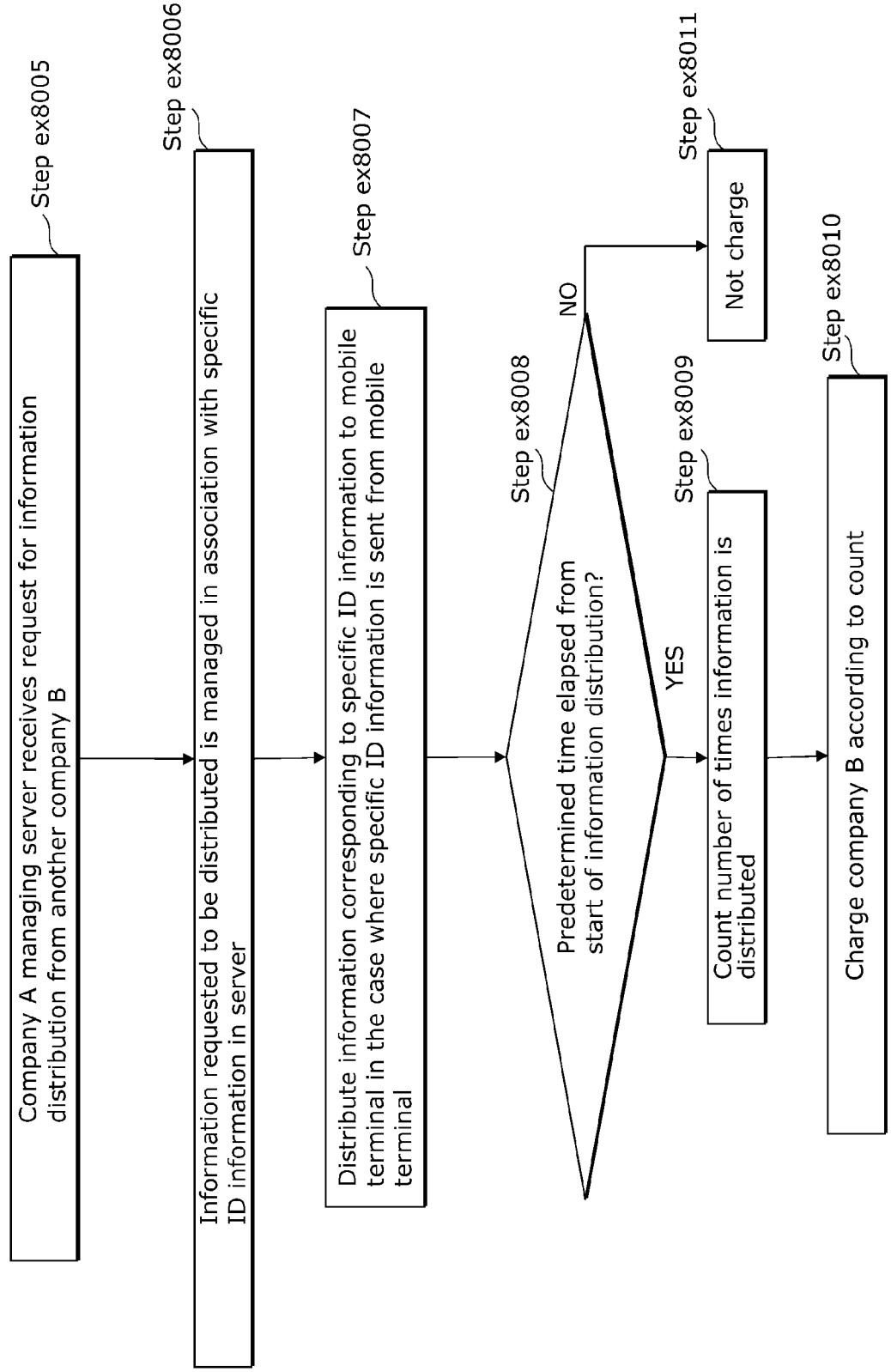
FIG. 35 illustrates flow of service provision in another example according to Embodiment 4.

FIG. 35 illustrates service provision flow in another example. The description of the same steps as those in FIG. 34 is omitted here.

In Step ex8008, whether or not a predetermined time has elapsed from the start of the information distribution is determined. In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

Figure 36:
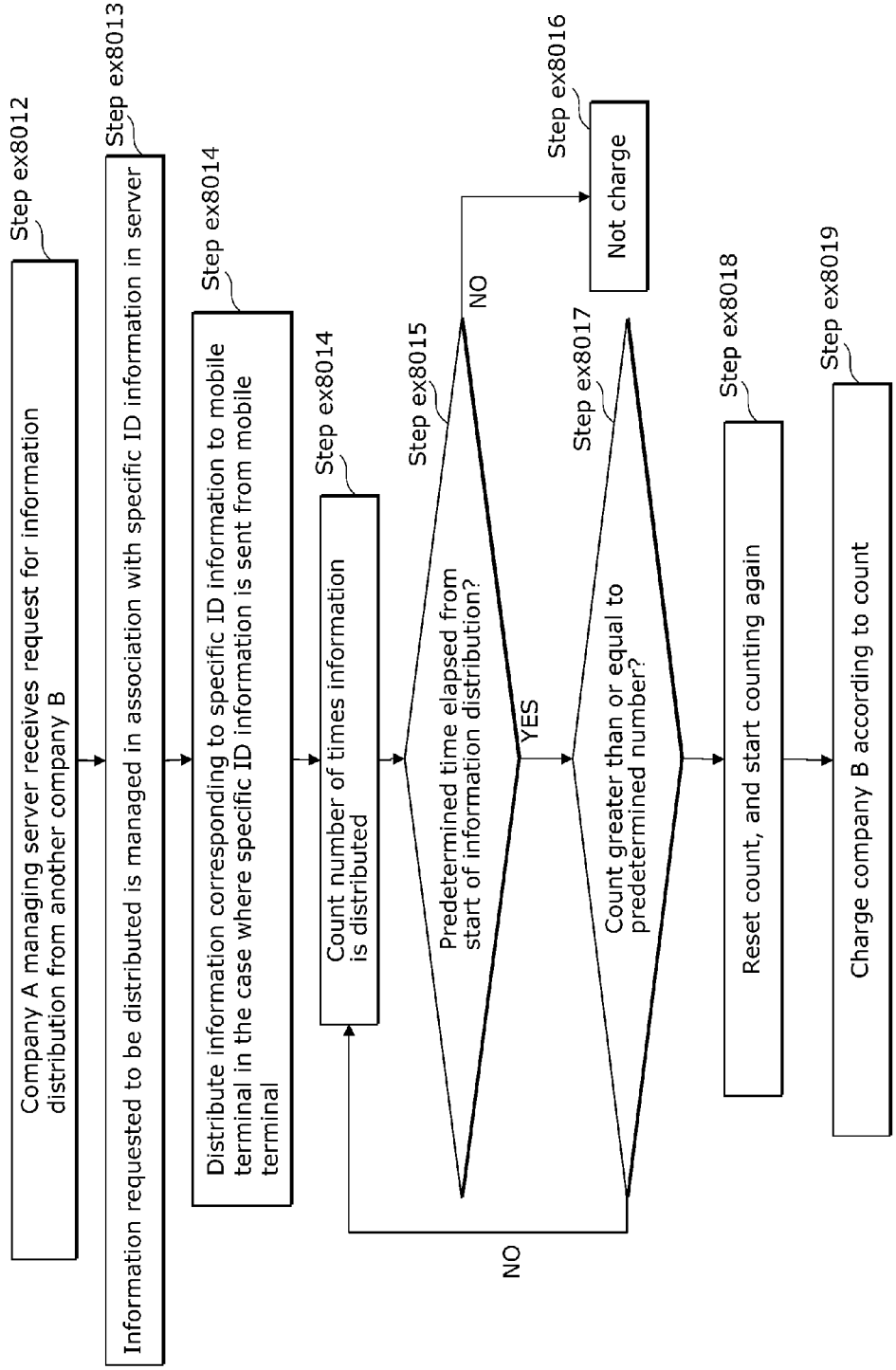
FIG. 36 illustrates flow of service provision in another example according to Embodiment 4.

FIG. 36 illustrates service provision flow in another example. The description of the same steps as those in FIG. 35 is omitted here.

In Step ex8014, the number of times the information is distributed is counted. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the count is charged to the company B. Thus, in the case where the count during the free distribution time is small, the free distribution time is provided again. This enables the company B to receive the accounting service at an appropriate time. Moreover, in the case where the count is small, the company A can analyze the information and, for example when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the information in association with the specific ID information, a management fee may be charged. By charging the management fee, it is possible to determine the fee upon requesting the information distribution.

As above, the embodiment which the Applicants contemplate as the best mode and other embodiments have been provided with reference to the appended drawings and the detailed descriptions. These are provided to illustrate the subject matter recited in the Claims to those skilled in the art with reference to the particular embodiments. Therefore, the structural elements recited in the appended drawings and the detailed descriptions may include not only structural elements indispensable for solving the problems but also other structural elements. Accordingly, just because these dispensable structural elements are stated in the appended drawings or the detailed descriptions, these dispensable structural elements should not be immediately acknowledged as being indispensable. Furthermore, within the scope of the Claims and a range equivalent thereto, the above-described embodiments may be subject to various modifications, replacement, addition, omission, etc.

Although the display method, the reception device, and the visible light communication system according to the embodiments in the present disclosure have been described above, these embodiments do not restrict the present disclosure.

Moreover, the respective processing units included in the display apparatus, the reception device, or the visible light communication system according to the above embodiments are each typically implemented as an LSI which is an integrated circuit. These processing units may be individually configured as single chips or may be configured so that a part or all of the processing units are included in a single chip.

Furthermore, the method of circuit integration is not limited to LSIs, and implementation through a dedicated circuit or a genera-purpose processor is also possible. A Field Programmable Gate Array (FPGA) which allows programming after LSI manufacturing or a reconfigurable processor which allows reconfiguration of the connections and settings of the circuit cells inside the LSI may also be used.

Furthermore, each of the structural elements in each of the above-described embodiments may be configured in the form of an exclusive hardware product, or may be realized by executing a software program suitable for the structural element. Each of the structural elements may be realized by means of a program executing unit, such as a CPU or a processor, reading and executing the software program recorded in a recording medium such as a hard disk or a semiconductor memory.

Moreover, the present disclosure may be implemented as the above program, or may be implemented as a non-transitory computer-readable recording medium on which the above program has been recorded. Furthermore, it goes without saying that the program can be distributed via a transmission medium such as the Internet.

Moreover, all numerical figures used in the forgoing description are exemplified for describing the present disclosure in specific terms, and thus the present disclosure is not limited to the exemplified numerical figures. Furthermore, the logic levels represented as HIGH and LOW or switching states represented as ON and OFF are exemplified for describing the present disclosure in specific terms; a different combination of the exemplified local levels or switching states can lead to the same or like result.

Furthermore, the separation of the functional blocks in the block diagrams is merely an example, and plural functional blocks may be implemented as a single functional block, a single functional block may be separated into plural functional blocks, or part of functions of a functional block may be transferred to another functional block. In addition, the functions of functional blocks having similar functions may be processed, in parallel or by time-division, by a single hardware or software product.

Moreover, the sequence in which the steps included in the visible light communication signal display method are executed is given as an example to describe the present disclosure in specific terms, and thus other sequences than the above are also possible. Furthermore, part of the steps may be executed simultaneously (in parallel) with another step.

Although the exemplary embodiments are described above, the Claims in this application are not limited to these embodiments. Those skilled in the art would readily appreciate that, without departing from the novel teachings and advantages of the subject matter recited in the appended Claims, various modifications may be made in the above-described embodiments and other embodiments may be obtained by arbitrarily combining structural elements in the above-described embodiments. Therefore, such modification examples and other embodiments are also included in the present disclosure.

INDUSTRIAL APPLICABILITY

The visible light communication signal display method and the display apparatus according to the present disclosure enable safe and active acquisition of information other than images and are, therefore, usable in various applications such as the transfer of image-attached information and information transmission in various scenes in a sense that such active properties allow necessary information to be safely obtained as much as needed from signage, information terminals, and information display devices outside, let alone devices such as televisions, personal computers, and tablets in homes.

The invention claimed is:
1. A visible light communication signal display method of displaying (i) an image represented by video signals and (ii) an image obtained by encoding visible light communication signals, the visible light communication signal display method comprising:

encoding at least part of the visible light communication signals to generate an encoded image;

generating a plurality of sub-images which correspond to respective partial images obtained by spatially dividing the encoded image and each of which (i) includes a corresponding one of the partial images and (ii) except for the corresponding one of the partial images, is an image having a substantially uniform luminance value lower than or equal to a predetermined luminance value; and displaying, in a video display period, the image represented by the video signals, and displaying the sub-images in time series in a communication period different from the video display period, wherein in the encoding, a pattern that corresponds to the at least part of the visible light communication signals is selected from a plurality of the patterns for displaying a timing of each the sub-images to encode the at least part of the visible light communication signals into the pattern.

2. The visible light communication signal display method according to claim 1, wherein in the encoding, part of the visible light communication signals is encoded to generate the encoded image, and other part of the visible light communication signals is encoded into timings at which the sub-images are displayed, and in the displaying, the sub-images are displayed in time series at the timings in the communication period.

3. The visible light communication signal display method according to claim 1, wherein in the generating, a plurality of reversed images which correspond to the respective partial images are further generated, the reversed images each (i) including a reversed partial image obtained by reversing luminance of a corresponding one of the partial images and (ii) being, except for the reversed partial image, an image having a substantially uniform luminance value lower than or equal to a predetermined luminance value, and in the displaying, the reversed images are further displayed in time series in the communication period.

4. The visible light communication signal display method according to claim 1, wherein in the encoding, part of the visible light communication signals is encoded to generate the encoded image, and other part of the visible light communication signals is encoded into a sequence in which the sub-images are displayed, and in the displaying, the sub-images are displayed in time series in the sequence in the communication period.

5. The visible light communication signal display method according to claim 1, wherein in the displaying, in the communication period, a black image having a substantially uniform luminance value lower than or equal to a predetermined luminance value is displayed between the sub-images, and a length of time that the black image is displayed is 30 microseconds or more.

6. The visible light communication signal display method according to claim 5, wherein the length of time that the black image is displayed is 100 microseconds or more.

7. The visible light communication signal display method according to claim 1, wherein in the displaying, a length of time that each one of the sub-images is displayed is 200 microseconds or less.

8. The visible light communication signal display method according to claim 1, wherein in the displaying, a length of time that each one of the sub-images is displayed is 10 microseconds or more.

9. A visible light communication signal display method of displaying (i) an image represented by video signals and (ii) an image for transmitting visible light communication signals, the visible light communication signal display method comprising:

encoding at least part of the visible light communication signals into a pattern for dividing a basic image;

dividing the basic image into a plurality of sub-images according to the pattern, the plurality of sub-images being displayed at different times, the pattern being presented by the plurality of sub-images; and displaying, in a video display period, the image represented by the video signals, and displaying, in time series in a communication period different from the video display period, a reversed image obtained by reversing luminance of the basic image, and the sub-images, wherein in the encoding, a pattern that corresponds to the at least part of the visible light communication signals is selected from a plurality of the patterns for dividing the basic image into a number of the sub-images to encode the at least part of the visible light communication signals into the pattern.

10. The visible light communication signal display method according to claim 9, wherein the image for transmitting the visible light communication signals includes the basic image and the sub-images.

11. The visible light communication signal display method according to claim 9, wherein in the encoding, part of the visible light communication signals is encoded to generate the pattern, and other part of the visible light communication signals is encoded into timings at which the sub-images are displayed, and in the displaying, the sub-images are displayed in time series at the timings in the communication period.

12. The visible light communication signal display method according to claim 9, wherein in the encoding, a pattern that corresponds to the at least part of the visible light communication signals is selected from a plurality of the patterns, each for dividing the basic image into a same number of the sub-images, to encode the at least part of the visible light communication signals into the pattern, and the patterns include a pattern in which the sub-images include an all-black image having a substantially uniform luminance value lower than or equal to a predetermined luminance value.

13. The visible light communication signal display method according to claim 9, wherein in the encoding, a pattern that corresponds to the at least part of the visible light communication signals is selected from a plurality of the patterns for dividing the basic image into a different number of the sub-images, to encode the at least part of the visible light communication signals into the pattern.

14. The visible light communication signal display method according to claim 9, wherein in the dividing, the sub-images which correspond to respective partial images obtained by dividing the basic image are generated, the sub-images each (i) including a corresponding one of the partial images and (ii) being, except for the corresponding one of the partial images, an image having a substantially uniform luminance value lower than or equal to a predetermined luminance value.

15. The visible light communication signal display method according to claim 9,
wherein in the encoding, part of the visible light communication signals is encoded to generate the pattern, and other part of the visible light communication signals is encoded into a sequence in which the sub-images are displayed, and
in the displaying, the sub-images are displayed in time series in the sequence in the communication period.

16. The visible light communication signal display method according to claim 9,
wherein in the encoding, part of the visible light communication signals is encoded to generate the pattern, and other part of the visible light communication signals is encoded into the basic image.

17. The visible light communication signal display method according to claim 9,
wherein in the displaying, in the communication period, a black image having a substantially uniform luminance value lower than or equal to a predetermined luminance value is displayed between the sub-images, and
a length of time that the black image is displayed is 30 microseconds or more.

18. The visible light communication signal display method according to claim 17,
wherein the length of time that the black image is displayed is 100 microseconds or more.

19. The visible light communication signal display method according to claim 9,
wherein in the displaying, a length of time that each one of the sub-images is displayed is 200 microseconds or less.

20. The visible light communication signal display method according to claim 9,
wherein in the displaying, a length of time that each one of the sub-images is displayed is 10 microseconds or more.

21. The visible light communication signal display method according to claim 9,
wherein in the encoding, the pattern that corresponds to the at least part of the visible light communication signals is selected from a plurality of the patterns for dividing the basic image into a different number of the sub-images.

22. A display apparatus which displays (i) an image represented by video signals and (ii) an image obtained by encoding visible light communication signals, the display apparatus comprising:
a processor; and
a memory having therein a computer program, wherein when the processor executes the computer program, the computer program causes the processor to execute operations comprising:
encoding at least part of the visible light communication signals to generate an encoded image;
generating a plurality of sub-images which correspond to respective partial images obtained by spatially dividing the encoded image and each of which (i) includes a corresponding one of the partial images and (ii) except for the corresponding one of the partial images, is an image having a substantially uniform luminance value lower than or equal to a predetermined luminance value; and
displaying, in a video display period, the image represented by the video signals, and display the sub-images in time series in a communication period different from the video display period,
wherein in the encoding, a pattern that corresponds to the at least part of the visible light communication signals is selected from a plurality of the patterns for displaying a timing of each the sub-images to encode the at least part of the visible light communication signals into the pattern.

23. A display apparatus which displays (i) an image represented by video signals and (ii) an image for transmitting visible light communication signals, the display apparatus comprising:
a processor; and
a memory having therein a computer program, wherein when the processor executes the computer program, the computer program causes the processor to execute operations comprising:
encoding at least part of the visible light communication signals into a pattern for dividing a basic image;
dividing the basic image into a plurality of sub-images according to the pattern, the plurality of sub-images being displayed at different times, the pattern being presented by the plurality of sub-images; and
displaying, in a video display period, the image represented by the video signals, and display, in time series in a communication period different from the video display period, a reversed image obtained by reversing luminance of the basic image, and the sub-images,
wherein in the encoding, a pattern that corresponds to the at least part of the visible light communication signals is selected from a plurality of the patterns for dividing the basic image into a number of the sub-images to encode the at least part of the visible light communication signals into the pattern.

* * * * *

UNITED STATES PATENT AND TRADEMARK OFFICE
CERTIFICATE OF CORRECTION

PATENT NO. : 9,262,954 B2
APPLICATION NO. : 14/141833
DATED : February 16, 2016
INVENTOR(S) : Mitsuaki Oshima et al.

Page 1 of 1

It is certified that error appears in the above-identified patent and that said Letters Patent is hereby corrected as shown below:

In the Claims
In column 43, line 18 (claim 1, line 23), "of each" should read -- of each of --.
In column 46, line 23 (claim 22, line 27), "of each" should read -- of each of --.

Signed and Sealed this
Twenty-fourth Day of May, 2016

Michelle K. Lee
*Director of the United States Patent and Trademark Office*